United States Patent [19]

de Prins

[11] Patent Number: 4,866,661

[45] Date of Patent: Sep. 12, 1989

[54] COMPUTER CONTROLLED RENTAL AND SALE SYSTEM AND METHOD FOR A SUPERMARKET AND THE LIKE

[76] Inventor: Maurits L. de Prins, Verhoevenlei, 15 Brasschaat 2130, Belgium

[21] Appl. No.: 844,164

[22] Filed: Mar. 26, 1986

[51] Int. Cl.⁴ .......................... G06F 15/21; G06F 7/10
[52] U.S. Cl. .................................... 364/900; 235/380;
235/381; 235/382; 235/383; 235/385; 414/273
[58] Field of Search ............... 235/380, 381, 382, 383,
235/385; 364/200 MF File, 900 MS File;
414/273

[56] References Cited

U.S. PATENT DOCUMENTS

| | | | |
|---|---|---|---|
| 2,905,926 | 9/1959 | Aid | 186/56 |
| 3,660,832 | 5/1972 | Hoshall | 186/56 |
| 3,716,697 | 2/1973 | Weir | 186/56 |
| 3,718,906 | 2/1973 | Lightner | 235/381 |
| 4,120,452 | 10/1978 | Kimura et al. | 235/487 |
| 4,300,040 | 11/1981 | Gould et al. | 381/ |
| 4,414,467 | 11/1983 | Gould et al. | 235/381 |
| 4,458,802 | 7/1984 | Maciver et al. | 235/381 |
| 4,519,522 | 5/1985 | McElwee | 314/479 |
| 4,533,211 | 11/1985 | Kawasaki et al. | 364/479 |
| 4,567,359 | 1/1986 | Lockwood | 235/381 |
| 4,598,810 | 7/1986 | Shore et al. | 235/381 |
| 4,635,053 | 1/1987 | Banks et al. | 221/2 |
| 4,677,565 | 6/1987 | Ogaki et al. | 364/479 |

FOREIGN PATENT DOCUMENTS

| | | |
|---|---|---|
| 3336619 | 4/1985 | Fed. Rep. of Germany . |
| 50-26597 | 3/1975 | Japan . |
| 50-106698 | 8/1975 | Japan . |
| 52-83286 | 7/1977 | Japan . |
| WO8501812 | 4/1985 | PCT Int'l Appl. . |
| 2143662 | 2/1985 | United Kingdom . |

OTHER PUBLICATIONS

"Video Vendor" brochure; Synopco, Inc.; 3 pages; Copyright 1985.
Term-Tronics brochure; 4 pages; Oct. 1985.

Primary Examiner—Gary V. Harkcom
Assistant Examiner—Randy W. Lacasse
Attorney, Agent, or Firm—Saidman, Sterne, Kessler & Goldstein

[57] ABSTRACT

A system and method for alloying a customer to purchase or rent items from a locked cabinet without the intervention of store personnel. The authorized customer first inputs a membership card and a secret number. If these are correct, the system unlocks the locked cabinets, and the customer is allowed to examine all of the contents in the unlocked cabinet at his or her leisure. The computer continuously monitors the removal of all items from the unlocked cabinet. The customer reads in identifying information from each of the selected items. When the number of items that have been removed equals the number of items that have been read in by the customer, the computer allows the doors of the cabinet to be relocked, and the customer is provided with a customer slip indicating the items that have been selected. The system utilizes a similar method for the return of previously rented items. In the rental context, return of rental items can be performed in parallel with rental of items. High security is achieved without employee monitoring since the customer is held responsible for all items removed during the time that the cabinet is unlocked.

37 Claims, 38 Drawing Sheets

ONE SYSTEM

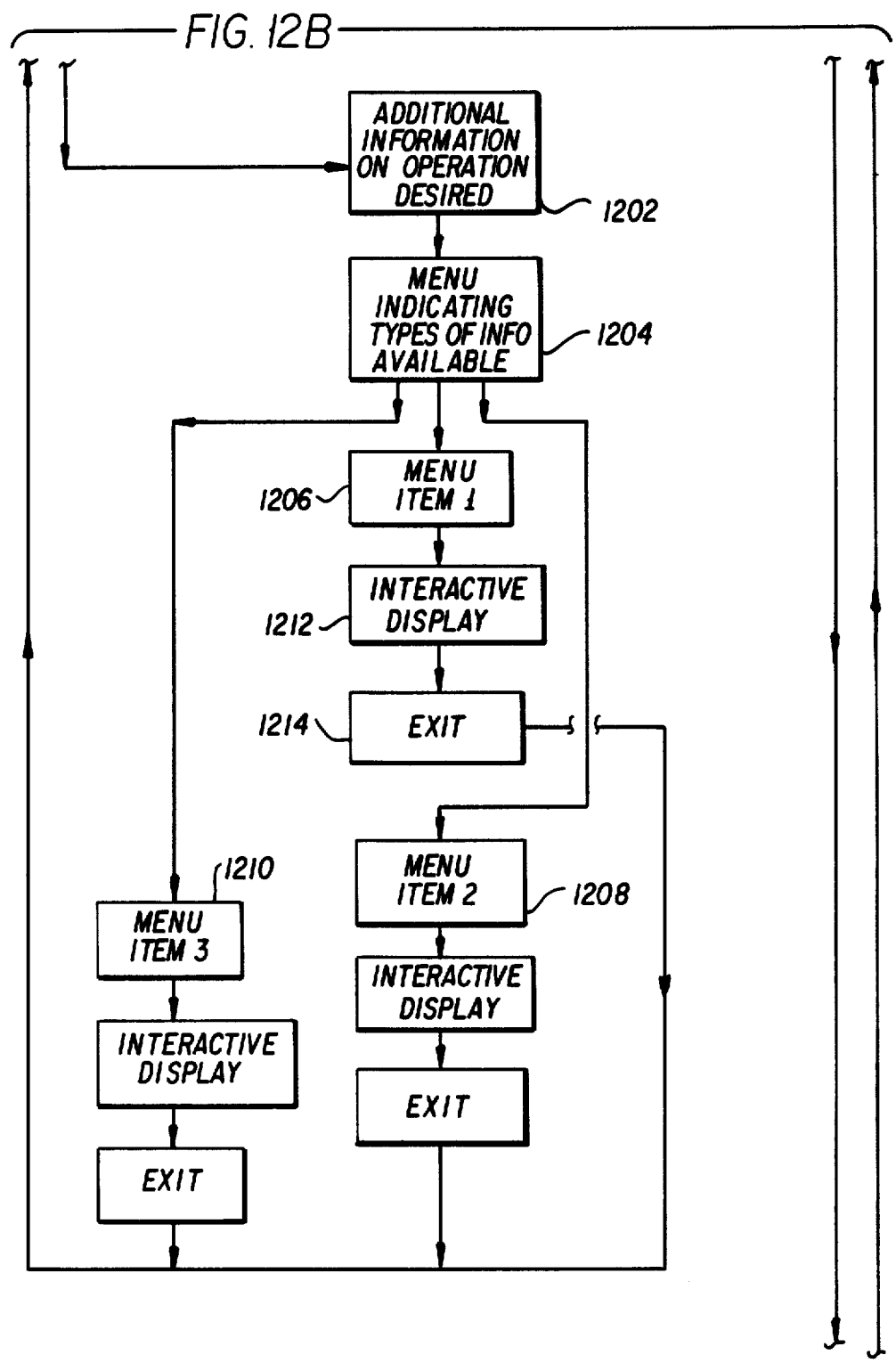

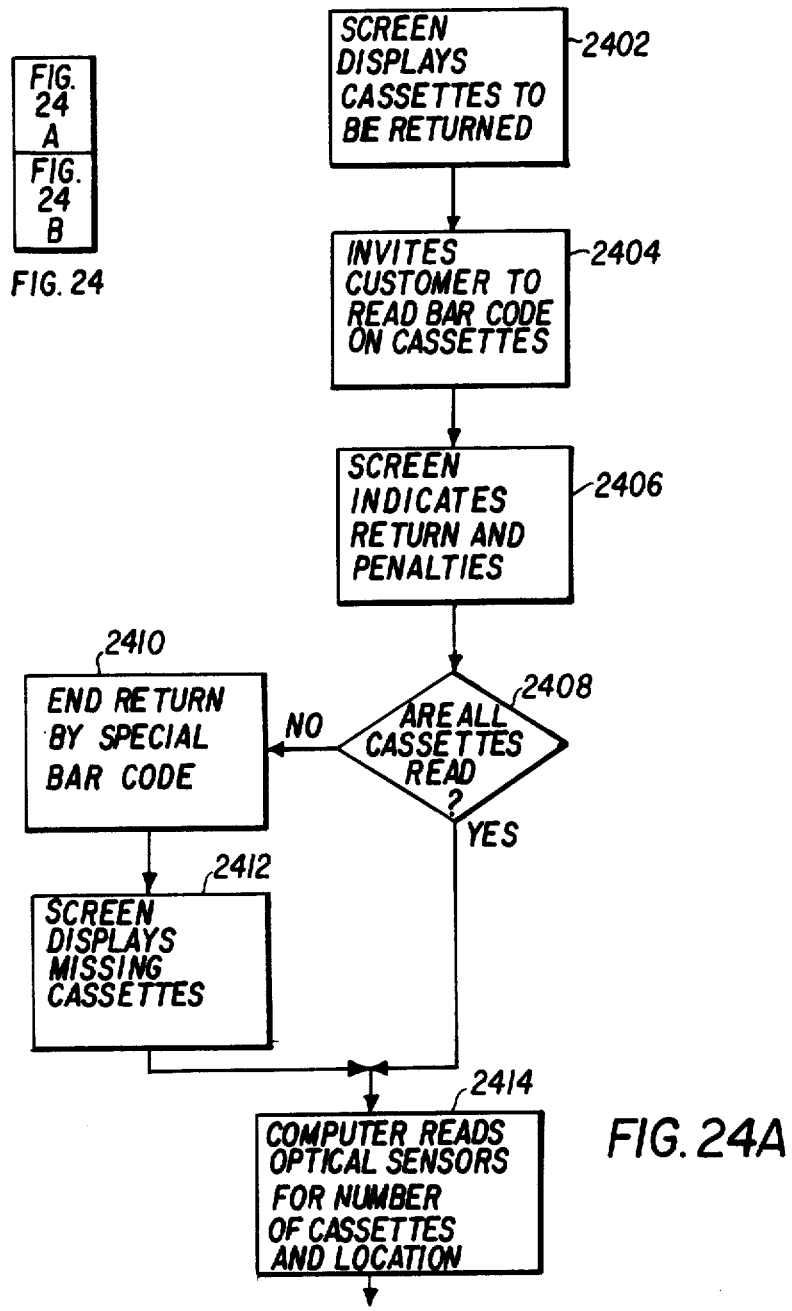

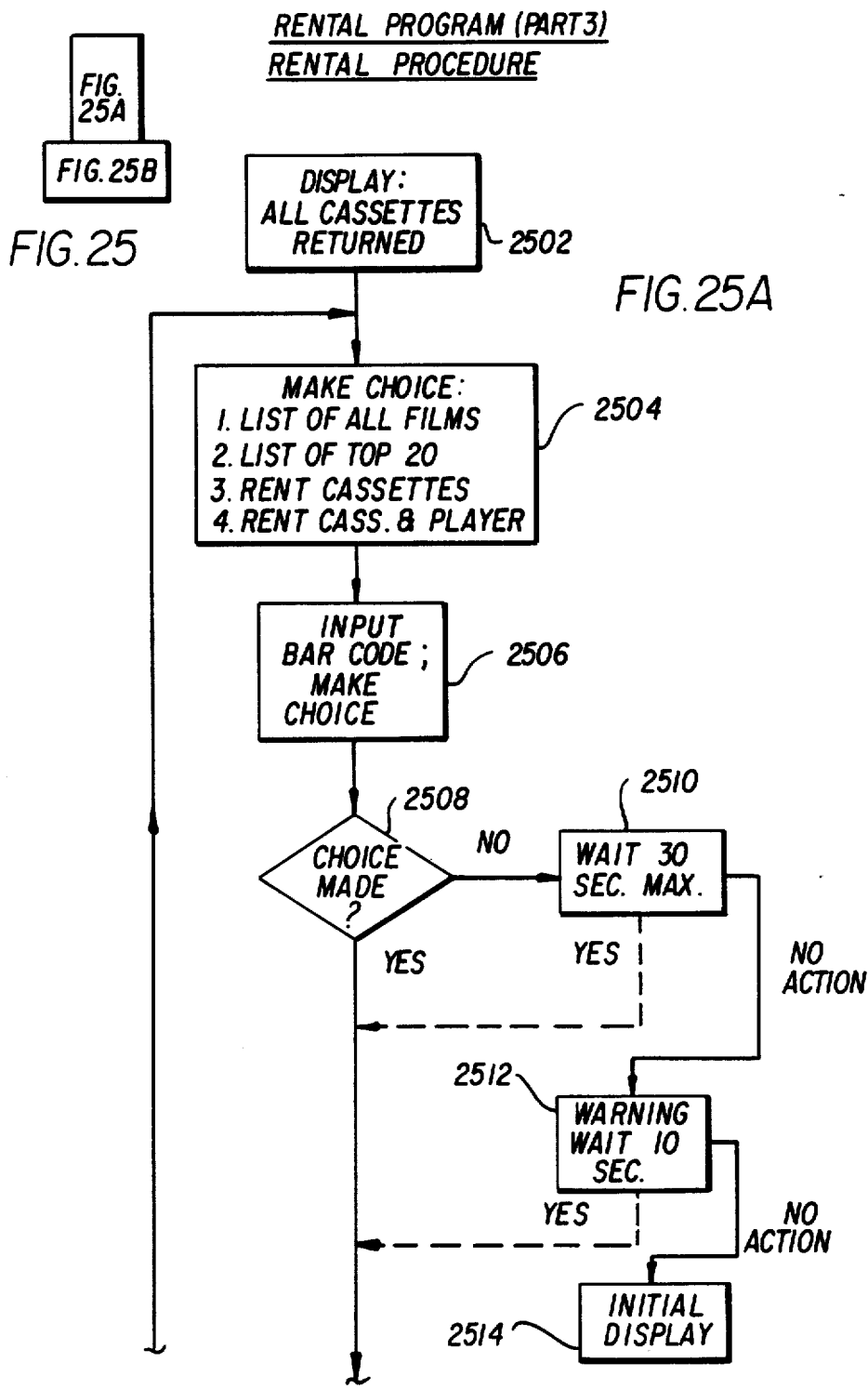

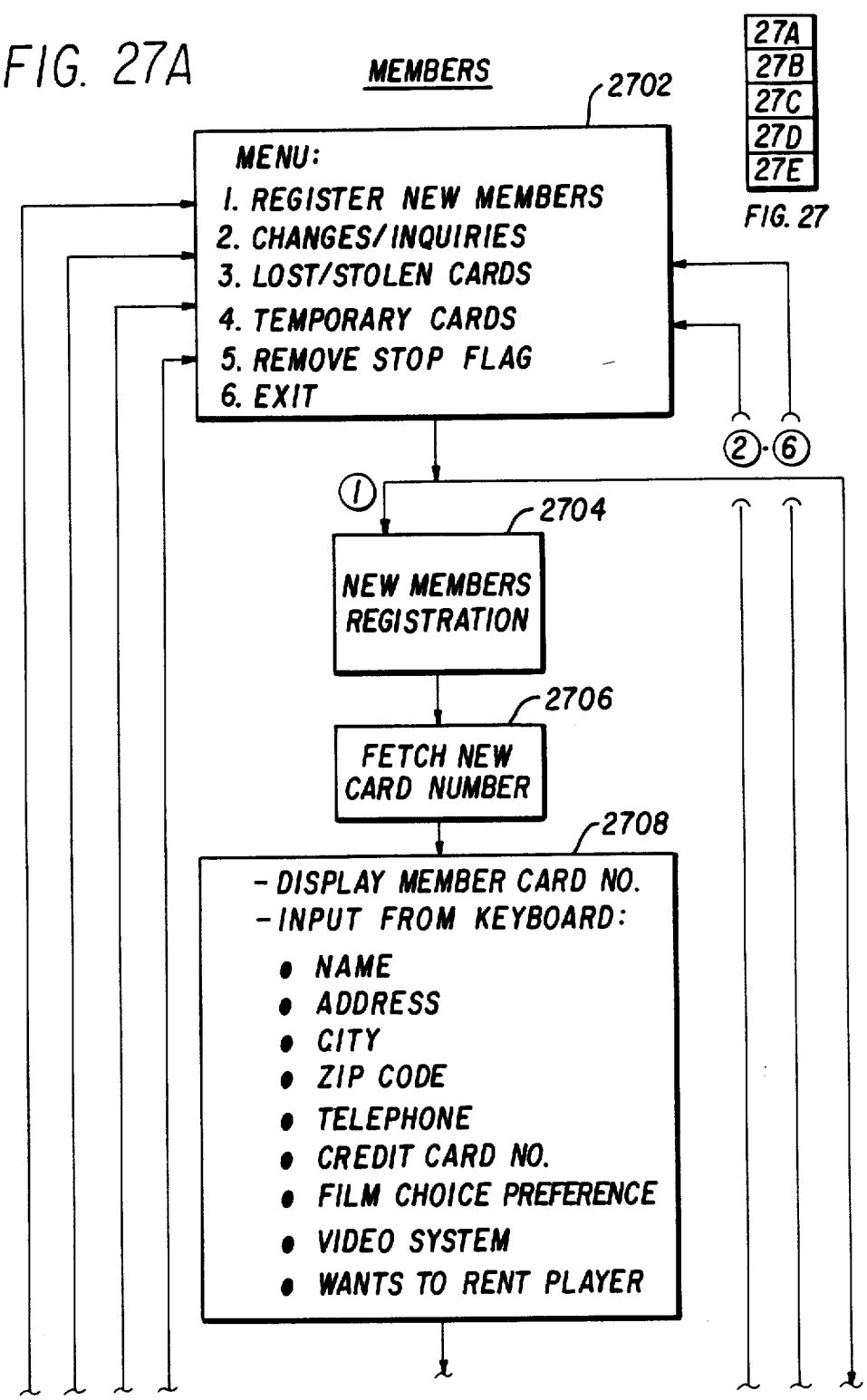

4,866,661

COMPUTER CONTROLLED RENTAL AND SALE SYSTEM AND METHOD FOR A SUPERMARKET AND THE LIKE

BACKGROUND OF THE INVENTION

1. Field of the Invention

The present invention relates generally to computer controlled rental and sale systems and methods for supermarkets and the like, and more particularly, to computer controlled rental and sale systems for video movies and video cassette players for supermarkets and the like.

2. Related Art

Automating the sale of products to customers has been a goal of many for many years. Vending machines have been in existence for more than 50 years. These mechanical devices allow a customer to purchase products by inserting money into an appropriate slot in the machine and by pulling a lever or pressing a button which causes a selection of the product to be made. The machine then provides the selected product to the customer through an opening or chute. The various selections that are available from the vending machine are either shown directly through a window or are represented pictorially through the use of pictures or other illustrations.

The selection of the various products that are available is accomplished in a number of ways. One typical approach that has been used for many years is to provide a mechanical handle or pull that allows the user to make the selection and also to provide the necessary physical power needed to cause the mechanical mechanism of the vending machine to go through the various steps needed to provide the selected item to the user. The mechanical vending machine, of course, has a mechanical mechanism which prevents the user from pulling the lever if the proper amount of money for the desired selection has not been deposited in the machine.

Another approach frequently used is that of a button or selection pad which allows the user to select the item desired. This approach has become commonplace in many industries, such as the dispensing of soft drinks from vending machines. Here, the user is provided with the various selections by illustrations that appear on or adjacent to the various selecting buttons or pads that are provided on the front of the machine. After the appropriate amount of money has been deposited in the slot (and after change has been given if too much money has been deposited, an added feature provided by many modern machines), the vending machine through an electromechanical system provides the user with the selected item through a chute or opening on the front or side of the machine. Here, the electromechanical system that is used does not require the customer to provide the necessary mechanical power needed to cause the machine to provide the selected item to the customer.

Another type of vending machine currently available is that which displays a series of items on shelves. The customer can view these items through a glass window or the like. At each location of the shelf is provided a row of a given item. Below the given item is provided an indicator or selection number/letter that the user must input into a selection pad of keys which are dedicated to the particular numbers and/or letters that are used to indicate given items. After having visually scanned the various items that are available at the various positions on the shelves, the customer deposits the appropriate amount of money into the coin slot on the front of the machine. Thereafter the customer selects the desired item by depressing the key or keys on the selection keypad indicative of the item that is sought. The machine then determines whether enough money has been deposited for the item that is selected. If this determination is positive, the machine then activates an electromechanical providing mechanism (such as a motor driven helical wire dispenser which moves the package out beyond the shelf through a complete rotation of the helical wire cage, causing the item to drop by gravity down to a chute which then causes the product to slide out to the customer for retrieval). The customer then pushes open a door mechanism which allows him or her to gain access to the item that has been selected and has been allowed to fall down the chute so as to be available to the customer.

Other conventional vending machines substitute credit card mechanisms for the change mechanisms. The credit card mechanisms allow the customer to pay for the selected item by credit card instead of with cash.

These and other types of vending machines are provided to customers in a myriad of physical locations. Typically, the vending machines are provided in areas that are open to all customers and are physically unguarded. They have particular applicability in areas of public convenience, such as airports, theaters, public buildings, gasoline stations, bus terminals, train stations, and the like. They are usually not provided in supermarkets and stores where there are employees and other personnel available to assist the customer In such store environments, vending machines are incongruous since the customer can select the needed items from the open shelves and pay for them at the cash register. The provision of a vending machine would defeat this process since the cashier would not know which items in the shopping basket had already been paid for by the customer through the insertion of money into the vending machine that dispensed that particular item.

Vending machines suffer from many deficiencies both in construction and operation. From the construction point of view, vending machines tend to be electromechanical in orientation. They include many moving parts that are required to move the selected item from the stored location to the chute where they can be retrieved by the customer. In addition, many vending machines utilize a mechanical selection mechanism in addition to the mechanical dispensing mechanism. While the art of electronics has been applied to vending machine technology, it is usually in the form of rudimentary application on the selection side of the system and electromechanical drives on the dispensing side of the system used to replace the physical power provided by the user through the pulling of the knob to make the selection or other approaches used in the conventional technology.

Vending machines can be jammed if one or more of the items that are dispensed become improperly placed. Such jamming prevents the entire system from functioning properly.

Vending machines typically are used in high-risk areas which subject them to vandalism, tampering, and theft. Typically, vending machines are in areas where there is no actual employee or guard protecting the machine. This is one of the attractions of vending machines on the part of retailers, since a vending machine can be put in a sales location which would not support a more conventional store or shop having employees. The penalty paid, however, for being able to put vending machines in such unmanned locations is that they are subjected to vandalism, tampering and theft.

In order to overcome the vandalism, tampering and theft problems that are encountered, vending machines must be fabricated so as to be able to withstand such invasive action. Heavy duty locks and enclosures are typically used. The money supply in the machine has to receive extensive fabrication considerations in order to make sure that the ultimate design will thwart if not prevent such theft or tampering. With regard to vandalism, the selection and arrangement of materials must be very carefully chosen so as to make the machine able to withstand a vandal's abuse with minimum damage. This results in machines having enclosures that are almost fortress-like in appearance since they must be able to withstand the abuse to which they are subjected.

The vandalism, theft and tampering problems encountered by vending machines is on the rise in many countries. This is due to a general rise in crime in such countries. Vending machines offer an easy target to petty criminals who are interested in the small amounts of money contained in them and the products that have not been dispensed. Consequently, there is a constant improvement that must be made to such machines as such petty criminals figure out how to overcome the previous approaches that have been used. All of this leads to added cost, complexity, weight and size of such vending machines.

Another problem associated with vending machines is that they are not attractive to retailers interested in vending high priced items, such as watches, perfume, compact discs, expensive pens or pencils, and other items having small sizes and high prices. The reason for this reluctance is that retailers have learned that the more valuable the merchandise contained in the vending machine, the higher the likelihood that petty criminals will attack the machine. Some retailers who have attempted to dispense more expensive items in vending machines have gone as far as to enclose them in special rooms that are monitored by TV cameras and the like. The approach here is to try to intimidate the petty criminal from tampering with the machines by making it apparent that the machines are guarded and that such tampering will be noted and possible action taken. However, this approach is not that effective in many situations since the retailer cannot get to the vending location before the petty criminal has committed the crime and has left quickly.

Another problem associated with selling higher ticket items through vending machines is that there is a certain social stigma associated with vending machines. The general public associates vending machines with low price consumables such as soft drinks, candy bars, and other food items. They do not associate vending machines with more expensive items of the type listed above. Moreover, the areas in which vending machines are provided do not provide the type of retailing atmosphere that customers want when making a selection and purchase of such higher ticket items.

As stated above, the customer using a vending machine oftentimes is provided with an opportunity to visually inspect the item being selected prior to making the selection. This is accomplished through a window or the like. However, once the selection has been made, the customer has n way of returning the selected item if it in any way is improper or undesired. Consequently, the customer after making the selection must keep the item that is selected. There is no way to return the item in a cost effective way. Thus, in a situation where a higher priced item is involved, the risk associated with such selection is greater and thus produces customer anxiety in the event that the item selected is not the desired one.

Vending machines also do not provide the capability of automatic inventory control or data acquisition usable for statistical analysis of customer purchasing habits or the like. The reason for this is that vending machines typically are not dispensing items of enough profit to cost justify the addition of the electronics necessary to provide such capability. Moreover, the limited number of items that are provided by vending machines would mean that such capabilities would not be thus justified or warranted.

Conventional vending machines which allow a customer to rent items are shown in the following patents: U.S. Pat. Nos. 4,458,802 to Maciver et al; 4,414,467 to Gould et al; and U.K. Pat. No. 2,123,662A to Essex Engineering Company. Each of these conventional systems supplies the selected rental item to the customer via electromechanical means. Thus, jamming is a significant problem. The customer returns the rented item by inserting it into a chute or into a specific location in the cabinet. None of these systems allows the customer to physically examine an item before renting it. In addition, a rental transaction cannot take place during a return transaction or vice versa.

In a supermarket or shop environment, vending machines sometimes are provided to sell to the customer consumables such as coffee and soft drinks that are consumed during the act of shopping. This allows the supermarket to provide these additional products that are consumed by the customer during the shopping exercise but which do not have to be accounted for for purchase at the checkout counter. As stated above, the use of a vending machine in a supermarket or the like would subject the employees at the checkout counter to great difficulties, since those employees would have to constantly determine whether the item that had been selected by the customer had already been paid for at the vending machine. Moreover, the vending machine would not allow the customer to examine the item, a service that is provided in open shelf supermarkets. This is one of the main attractions of a self-service store, since the customer is allowed to examine the item for purchase prior to payment at the checkout counter. If the item for whatever reason does not meet the customer's requirements, the customer can put the item back up on the shelf without having to involve any of the store personnel. This is one reason why mass merchandising in supermarkets and the like has been such a business success in the last several decades.

In conventional supermarkets and the like, small, expensive items, which offer a high profit to the retailer, cannot be effectively marketed due to theft problems. Such small items, such as watches,.compact discs, lighters, and the like, and medium size items, such as video cameras, pocket TV sets, and other valuable electronic equipment, can be easily concealed by a customer walking past the check out counter. If such small or medium items cost a lot of money, the potential for theft is greatly increased as compared to more bulky items or items having a lower price. It is for this reason that many retailers have shied away from selling such high profit items, even though they know that their customers would be interested in purchasing them if they were provided at their location.

The problem associated with such high priced items is that they must be put on an open shelf in the same manner as are the more mundane or lower priced items that are sold in the supermarket or the like. The open shelf approach, which is one of the main attractions for supermarket retailing and the like, allows the customer to examine these higher priced items and thus create the possibility for the items being concealed in the customer's clothing or person so that the theft can occur.

Many supermarkets and the like, in an attempt to make such items a part of their retail inventory, have created a "store within a store", which is manned by a store employee. In such a situation, the higher priced items, such as perfume, cosmetics and the like, are maintained in cabinets and are only provided to the customer for inspection by the store employee. During the transaction, the store employee watches over the items to make sure that a theft does not occur. Oftentimes, the particular transaction is conducted at the store within the store, so that the customer arrives at the checkout counter with a bag and receipt indicating to the checkout counter that the purchase of the higher priced item has already been accomplished. Stores have also resorted to locking away in display cases such desirable items, thereby requiring the customer who would desire to examine or purchase such an item to go searching for a store employee, in order to allow him physical examination of the item. Such a search for a store employee to unlock the display case poses two main problems for the customer: (a) it is often time consuming as store employees are not always readily available and (b) this way of buying an item creates a psychological "barrier" with a customer as it breaks with the successful principle of the supermarket "open shelving", and often makes the consumer feel an unwanted sense of pre-commitment towards buying the item (because he had to bother a store employee to unlock the case, and such employee is required to stand in attendance while the customer is examining the item). The "unlocking" feels he is committed to purchase, which he does not want to be.

The store within the store concept, of course, has been used by department stores and the like for many years. However, as stores become larger, the line of demarcation in terms of products between various types of stores is blurring and breaking down. Thus, it is not uncommon to see a supermarket which in years past would only sell food, now selling other types of items such as those found in drug stores and other specialty shops. The trend towards larger and more versified stores appears in no way to be diminishing. The economies of scale that ca be achieved in such large stores drive this marketing trend.

A problem with the store within a store concept is that it requires additional personnel to man it. Therefore, the profit obtained by mass market retailing where store employees are not required to assist the customer in the selection and examination of the products cannot be achieved. Another problem is that it requires the customer to go through two purchases, since for inventory control purposes, the store within the store must complete the transaction and get the customer's payment prior to providing the higher priced unit to the customer. Thereafter, the second checkout counter, where normal items are paid for, must be alert to the fact that the more expensive item has been purchased.

SUMMARY OF THE INVENTION

The present invention, in its broadest sense, is a computer controlled rental and sale system and stock or inventory control for a supermarket and the like. It allows such a supermarket to sell or lease high priced items without the use of store personnel to guard the items being sold or leased to the customer. Broadly speaking, it comprises the following steps. The customer must be screened so as to be authorized to utilize the particular computerized system. Such authorization typically takes the form of an access card containing a code which is read by the computer controlled system so as to determine whether the customer is authorized. In addition, the customer must key into the computer controlled apparatus a personal identification number or other identifier that is correlated with the information obtained from the access card so as to allow the computerized system to check its computerized records to complete the access step. The system works with electronically computer controlled locking doors, which can also automatically be closed.

After the customer has been authorized access to the system, the system automatically opens the transparent doors that are on the front of the cabinet enclosures which store the various items that can be purchased or rented by the customer. The items are arranged in these cabinets on shelves, where the presence of an item at a given shelf location can be determined by the system through optical or electronic sensors means or the like. In this way, the computer system knows at all times whether an item is present at a particular location on the shelves in the cabinet. When the cabinet doors are opened, the customer knows that he or she is responsible for the contents of the cabinet for the time period beginning when the cabinet doors open and until the ending of the time period which occurs when the cabinet doors are closed. At any given time, in order to provide the required control needed by the present invention, the access to a given cabinet or cabinets is provided to only one customer. In this way, the customer can be certain that he or she will not be charged for items that he or she did not purchase or rent. Thus, the present invention allows a store to rent items without having to use the "store within a store" concept.

The customer is then given the opportunity to examine each of the items present in the cabinets whose doors are opened for as long as the customer desires to do so. The items can be removed from the shelf location, and examined in any way deemed fit by the customer. The computer controlled system monitors which items are removed from the shelf by determining the location of items that are removed. As an optional control measure, the removal of an item from a slot may initiate computer-controlled videotaping of the transaction. This, as well as all other data involving the transaction is stored electronically by the computer for record keeping purposes and for determining patterns of customer behavior, activities relating to lost or stolen items, and inventory control purposes and the like. In other words, the computerized control system keeps an entire record of each transaction, which can be used for a multiplicity of purposes.

After the customer has made all of the desired selections, he or she reads these selections into the computerized control system through an appropriate reader. One suitable example is a bar code reader pen which is scanned across the bar code placed on each item in the system. This allows the computer to determine the particular item that has been selected, which is stored electronically and used to produce a check to determine whether the number of items that have been read in by the user equals the number of items that have been removed from the shelf. If this coincidence between the number of items read in and the number of items removed occurs, the computer system then automatically locks the doors of the cabinets and then provides to the customer a customer slip.

The customer slip itemizes the number of items that have been selected, and also can indicate the actual description of the items as well. It may also indicate the price of the items. In one embodiment of the system, the purchase of the items is accomplished using a credit card approach, whereby the computer system automatically debits the credit card account of the customer in accordance with the items that have been selected. This first approach does not require the customer to pay any cash for the particular transaction, and results in automatic payment for the transaction.

In the alternate approach, which will be used in many supermarket and similar locations, the customer then takes the customer slip along with the items selected to the checkout counter. These can be carried with the other items that are normally purchased by the customer at the supermarket. At the checkout counter, the employee checks the customer slip to determine whether the number of items presented by the customer equals the number of items on the slip. If the customer slip also indicates some kind of identification of the items selected, the checkout person also will check this to determine whether the items presented by the customer are the same as those indicated on the slip. Thereafter, the checkout person rings up the purchase and charges the customer for the items that have been purchased or rented.

An additional aspect of the present invention that can be provided is that the computer notifies the checkout counter (or a selected check-out counter or a control unit) that a purchase in the "compu-shelving cabinets" has been made, on a terminal monitor by the checkout counter whereby the name and the photo of the customer appear on the monitor together with item particulars. This information is stored. The checkout counter can access and display all data relating to items obtained from the cabinets for which a customer has not yet paid along with the names and photos of such customers. This information can be displayed at the check out counter during the payment transaction to add visual verification by the check out counter.

An additional aspect of the present invention that can be provided is to have the customer slip presented at the checkout counter provided back to the computer system to complete the loop of the transaction. In this way, the computer system can know that the particular customer slip was presented at the checkout counter and that the checkout counter received money for the particular transaction. This introduces an added check to the system and method of the present invention.

This method of providing sale and rentals in a supermarket provides an upgraded rental and sales method which is new and novel. In short, even in a "discount" store involved in mass retailing, the present invention can turn such a store into an "Upgrade Store", allowing higher profit margin products to be sold or leased. Previously, such higher profit products were available only within the "store within a store" or at specialized shops having employees in attendance.

The present invention has been designed specifically for the rental of video tapes of all types and video cassette recorders or VCR players, (called "movie boxes") which only allow movies to be played and not recorded. The present invention allows the rental of such items to be performed without the use of store personnel in a supermarket environment. Since the customer is allowed to remove and examine items before rental, the large number of wrong selections that normally occur if only a vending machine approach was used are eliminated. Moreover, the machine can be performing the particular rental operation for one customer and still be usable by other customers that are returning items that have been previously rented. In this way, a steady stream of customers returning rented items can be accommodated by the system and method of the present invention while another customer is in the act of renting new items. The economics of the system are extremely favorable and offer a very large return to the operator of the supermarket while at the same time allowing the supermarket operator to be able to rent or lease items that previously could not be economically done due to the theft or the personnel problems that are created.

In a preferred embodiment, the present invention comprises a stand alone system and a modular arrangement having a computer console and one or more cabinets storing the items to be sold or rented. With respect to the computer cabinet, which is the controller of the entire system, it can include a central processing unit (CPU) with associated storage devices, such as floppy disk drives, hard disks, optical memory, and the like. The hard disk or other storage device is used to store all of the transactions that occur. The floppy disk is used to store the transactions for a given day, which are taken back to a central site by personnel who visit the unit on a daily basis.

The computer console also includes an input device for reading in the customer's membership card (such as a bar code pen reader, optical scanner, laser scanner, extra key pad or the like), a key pad, which allows the user to make selections in addition to those that can be accomplished using the bar code reader pen, and a display (such as a cathode ray tube or video projection device) screen utilized to display information to the user during the course of the transaction or relating to membership or inventory that is present in the machine. A printer is provided so that the CPU can provide the customer's slip at the end of the transaction. The computer console also can include a video display and associated video recorder containing tapes with streamers (also called trailers) or other advertisements. These visual advertisements are provided to potential customers on the TV screen to attract them to the system. In addition to these types of advertisements, the TV monitor can also display information relating to specials provided on the machine. Specials associated with other products and services in the supermarket or the like can also be provided on the television screen. In this way, the television screen acts as an additional advertisement mechanism with respect to the system itself and to other goods and services provided by the supermarket.

The cabinets contain shelves where items that are available for lease or purchase are placed at specified locations. The cabinets include sensors at each location for indicating to the computer system the presence of an item at such location. A preferred form for such sensor is an optical system. In this way, the computer system can constantly scan the cabinet locations to determine at a given time whether an item has been removed by a customer. In addition, it can read information contained on a product at a given shelf location if a reader is used in lieu of a mere detection device.

The cabinets also include doors that can be locked electronically under control of the computer cabinet. These electronic locks allow the computer system to lock and unlock the cabinets during the transaction. The doors of the cabinets include electromechanical means which cause the doors to be unlocked at the beginning of the transaction, so they can be opened by the customer, and to be locked at the end of the transaction period. These mechanisms also are controlled by the computer system.

Typically, only one item to be purchased or sold is located at any given shelf location. In other words, additional items of the same type are not placed behind the first item at the front of the shelf. This must be done in order to allow the system to determine whether an item is present at a given shelf location.

The cabinet can be divided up into one or more regions, the doors of each region being separately controlled by the computer system. This allows the present system to be able to limit the access of the customer to a specific set of items. It also allows the system to accommodate more than one customer for a rental or sale transaction at a time, since each customer can be limited to specific cabinet sets during a specific time frame. This results in a given customer being responsible for a given cabinet during a particular time frame, while allowing the other cabinets that are not being used by that particular customer to be under the responsibility of another customer also engaged in a rental or purchase transaction. This multi-user capability can be provided by having a separate screen, card reader and terminal for the second customer.

The machine also allows potential customers to obtain information about membership in the system. The screening of members who have access to the system is an important control function of the system and method of the present invention. This screening capability results in only a select group of customers being given access to the system. In a normal supermarket situation, all customers who enter the store are provided access to all of the goods on the shelves. This screening process results in the control of the customers which are provided access to the more expensive items contained in the store.

The computer system can provide information on its screen to potential customers to assist them in making application for membership to the system. Moreover, forms can be provided which must be filled out by the potential customer in order to obtain access card. These forms can be put through a slot on the front of the machine for retrieval by the system personnel, discussed below.

The system also is extremely user-friendly and provides prompts to the customer during these various stages of the transaction. In addition, it can keep a complete inventory of all items that are present in the system at a given time, and even all items that are presently rented by the system. In this way, the user can get any number of different types of listings of items that are either present or possibly available from the system. Various categorizations of rental items can be provided to the user, such as the ten most frequently rented items, the ten most frequently rented items in a given category (such as westerns or comedies), the various items in a particular category that are presently in the machine, the most popular items nationwide for a given week, and the like. In this way, the customer is provided with a multitude of different types of information that can assist him or her in the selection process.

All of the transaction information is stored on the hard disk (or a floppy disk with high density storage capability), and the transaction information for a given day is stored on another floppy disk. System personnel visit the system on a daily basis. One of their tasks is to inventory each of the items in the system, so that the system inventory is kept current. The system personnel causes the system to display on its screen the presence of items at each of the shelf locations. He or she then correlates this visually with the items that are actually on the shelves. This inventory in process allows the system personnel to determine whether the sensor at a given shelf location has begun to malfunction. The computer itself will provide the details of which faults or malfunctions are presently occurring. It also allows the system personnel to make a visual check to make sure that items that are on the shelves are of the proper type.

System personnel are also available to assist potential customers in making membership to the system. System personnel also take back the floppy disk having recorded on it the transactions for a given date. This information is provided to a central host computer for inventory accounting control, as well as for statistical purposes. The various systems can be networked to the host computer over telephone lines or other communication links, if desired. The floppy disk can also be used to update the records in the given system. Such updating can include the change of access information, indicating that certain access numbers are for stolen, lost or expired cards. In this way, the system cannot thereafter be accessed by such cards without the customer being provided with visual prompts.

Additional anti-theft devices can be provided, such as video cameras which record the customer transaction for record keeping purposes. The system is extremely theft-proof since each of the various activities that occur in a given transaction is recorded electronically. Since a particular access card is the only way that a person can gain access to the system, the system is able to correlate who took a particular item that may be missing even to the extent that the computer records and keeps for system personnel examination and statistical purposes all examinations and replacing of items which have occurred before the customer finally makes his choice of product. This recording is detailed also by time of day, to the very second. The provision of the customer slip acts to also provide an additional level of control.

BRIEF DESCRIPTION OF THE DRAWINGS

The invention will be better understood if reference is made to the accompanying drawings in which.

DETAILED DESCRIPTION OF THE PREFERRED EMBODIMENTS

General Overview

A. The Generalized System and Method

Broadly, the system and method of the present invention allows a customer to purchase or rent one or more items stored in a locked cabinet without the aid of store personnel. The computer controls the transaction, permits access to the cabinet to only those customers having proper access numbers, keeps track of all the activities during the transaction, and provides the customer with a customer slip at the end of the transaction if the number of items removed from the cabinet by the customer equal the number of items that are read into the computer system by the customer. Thereafter, the customer goes to the checkout counter at the supermarket with the selected items and the customer slip. The employee at the checkout counter determines whether the number of items the customer has equals the number of items indicated on the customer slip. The checkout personnel may also check the title of the items listed in the customer slip with the actual items presented to provide additional control. The customer then pays for the items that are on the customer slip. The computer system may also receive the customer slip back so as to provide additional control.

Figure 1:
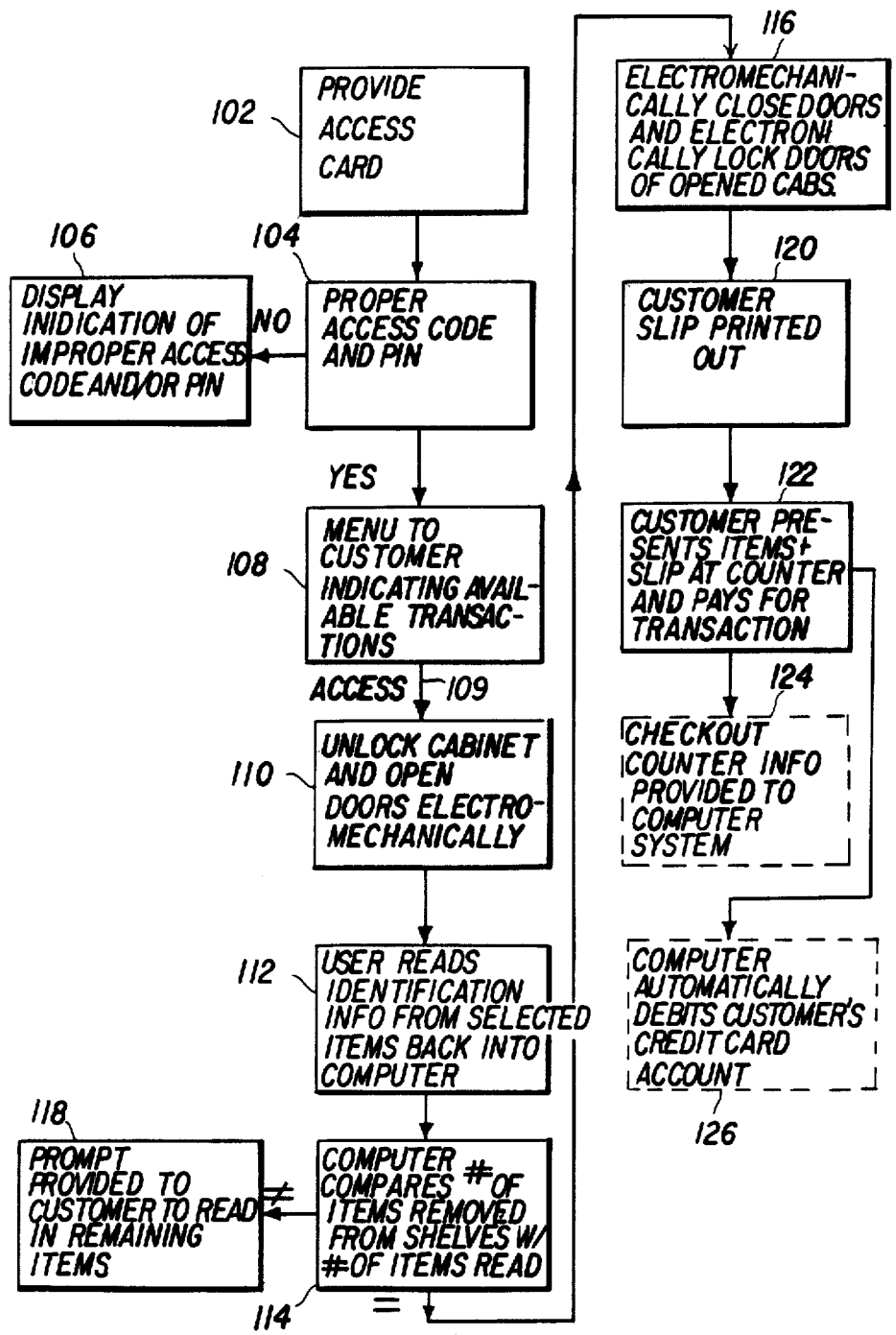
FIG. 1 is a block diagram of the generalized method of the present invention.

Referring now to FIG. 1, a block diagram is shown of the representative steps that occur using the generalized method of the present invention. It should be understood that the present invention can be utilized for the sale or rental of any type of high priced item that can be contained in the locked cabinets. For example, the present invention can be utilized to sell or lease high priced items such as perfume, watches, jewelry, and other items of small size. It can be used to sell or lease items such as video tapes, compact discs, video recorders, video cameras, or the like. As used herein, the term "movie" includes any type of item that can be sold or leased by the system. The term "movie boxes" includes video cassette recorders and any type of other item different from the movie that can be sold or leased by the present invention.

As shown in FIG. 1, the first step in the system and method of the present invention is for the user to provide an access card and personal identification code to the computer. This step is indicated by the reference numeral 102. The computer then determines whether a proper access card and code has been provided, as indicated by a block 104. If the answer to this inquiry is NO, the computer then provides a display on the computer screen to the customer indicating that an improper access card and/or personal identification number has been inputed, as indicated by a block 106.

If the answer to the inquiry of block 104, is YES, the computer then asks the customer what type of transaction or what additional information is desired, as indicated by a block 108. The customer can get additional data from the computer system displayed on the display terminal (not shown) which provides an inventory of the available items or specific categories of available items, as desired. The customer also can select whether it wishes to purchase or rent items in a given cabinet or cabinets.

If the customer indicates that it wishes to gain access to one or more of the cabinets, as indicated by the line 109, the computer then causes the doors of the selected cabinets to be unlocked electronically and the doors to be opened electromechanically, as indicated by a block 110. The customer now has free rein to examine any of the items on the shelves in the unlocked cabinets. The customer can take as much time as desired in making any type of inspection and/or selection of such items. The computer constantly monitors the location of any item removed from the shelves. This information is stored on the hard disk (not shown) of the computer system for archival purposes. In this way, the computer system keeps track of all of the activities that occur during the time period from when the cabinet doors are first opened until the cabinet doors are electronically locked. This information is critical for control in the present invention, since the customer is legally responsible for all of the items in the cabinet during the time frame when he or she has access to the interior of the cabinet.

After the user has selected the desired items from the cabinets, he or she then reads identification information on these units back into the computer system, as indicated by a block 112. One suitable way to accomplish this is to utilize a bar code reader pen which the user scans across bar codes placed on the items that are selected. Other suitable approaches can be used. This step allows the computer to identify the items that have been selected, and to correlate the number of items that have been read in with the number of items that have been removed from the shelves so as to determine whether all of the items that have been removed from the shelves have been read back into the computer system. This is an additional level of control that is provided by the present invention. The information, relating to the items that are read in, is stored by the computer on the hard disk.

After the computer system has determined that all of the items which have been removed from the shelves have been read into the system, it causes the doors of the open cabinets to be electromechanically closed and to be electronically locked as indicated by a block 116.

If the number of items that have been removed from the shelves is determined not to be equal to the number of items that are read in, the computer system causes a prompt to be displayed to the user, as indicated by a block 118, stating that the user should continue to read in the remaining items. Note that the doors on the cabinets that have been opened will not be closed until the user has read in a number of items equal to the number of items that have been removed from the shelves. In this way, the responsibility of the user who has been provided access to the locked cabinets is not relinquished until the user has read in a number of items equal to the number of items removed from the shelves. This acts as an added level of control for the present invention.

After the doors of the opened cabinets have been electronically locked, the responsibility for the contents of these cabinets is no longer that of the customer who had had access to these cabinets. The computer system then puts out a customer slip, as indicated by a block 120, which at a minimum contains the number of items that have been selected by the user. The customer slip can also contain additional information, such as the price owed by the user for the purchase or rental, and identifiers indicating the items that have been selected by the user.

The customer then can go about other shopping in the supermarket or the like. The items that have been selected can be put into the customer's basket or other device used by the customer to contain the items that are being purchased or rented at the store. After the customer has completed all of his or her shopping activities, he or she then goes to the checkout counter at the front of the store. The customer then presents the customer's slip to the checkout counter operator. The checkout counter operator checks to make sure that the number of controlled items that the customer has in his or her basket equals the number of items indicated on the customer slip. The amount of money can then be calculated by the checkout counter operator independently, or can be taken from the customer slip if such information is provided. The customer then pays for the items that are indicated on the customer slip, as indicated by a block 122. The customer is then allowed to leave the store with the purchased or rented items.

An optional step for the present invention is to provide the information relating to the payment at the checkout counter back to the computer system so as to provide an additional element of control. This is indicated by the dashed block 124.

It can be seen that the present invention can be used to sell or lease high priced items in a larger store environment. The theft problem encountered with open shelf sales of such items is eliminated since customer access to the system of the present invention is controlled. Moreover, the computer system keeps complete records of all of the activities that occur during the time frame when the cabinet is first opened for the accessed customer until the time when the cabinet is closed. The customer who obtains access of the cabinets is legally responsible for the contents of the cabinets during the time frame when that customer has access to the cabinets. This is an essential part of the application rules that the customer agrees to in order to and prior to being given access to the system. In this way, the present invention has an accurate record of the customers who are given possession of the controlled items that are being leased or sold by the present invention.

Moreover, the present invention removes the requirement of personnel required by the "store within the store" approach. As can be seen, the present invention is entirely automated and does not require the presence of any system personnel for use of the system by the customer at any stage of the transaction. Moreover a customer cannot fool the personnel, since each of the transaction steps is recorded by the computer. Thus, in the case where you have a "store within the store", a thief cannot fool the store personnel by distracting them and then taking the item during the distraction period.

The present invention also provides an additional level of control since it will not relinquish the legal responsibility of access to the system until the customer has inputted in a number of items equal to the number of items that have been removed from the shelves. Moreover, the present invention can make a video recording (not shown) of the entire transaction which can be stored for archival purposes.

Another advantage provided by the present invention is that the user need not have to pay for the transaction at the present invention. Instead, the transaction is paid for by the customer at the checkout counter along with all of the other purchases or rentals that are made by the customer during the course of his or her visit to the store. This should be distinguished from the store within the store concept where the purchase of the particular control items must occur separately from the larger purchase of the uncontrolled items.

As shown in FIG. 1 by the dashed block 126, a credit card capability can be provided with the present invention. Here, the user presents the customer slip to the person at the check out counter who determines whether the number of items indicated on the customer's slip is equal to the number of items presented by the customer. However, the actual payment for the items that are either purchased or rented is performed by the computer using a credit card debit procedure. Here, the computer automatically debits the credit card account of the user when the customer slip is printed. In this way, the user only needs to provide the customer or control slip at the control point in order to be able to leave the store.

The present invention is particularly useful in the rental area, since it can allow the user to return a rented item directly to the present invention. Referring to the block diagram in FIG. 1A, the user brings back the rented items to the store having the present invention. The user then inserts his or her access card and his or her personal identification number, which the computer system reads and correlates with its stored information so as to determine whether a proper customer is returning rented items, as indicated by blocks 150 and 152. If the user does not input a proper access card and/or personal identification number, the present invention provides a display prompt indicating the same, as indicated by a block 154.

After proper access has occurred, the renter then reads into the computer the identifying information of the rented items using the read in device (such as the bar code reader pen). This reading in operation accounts for the items that are being returned by the renter. This step is indicated by a block 156.

The computer then opens the doors of the cabinets, as indicated by a block 158, and allows the renter to place the units that have been returned in open locations on the shelves. The computer then determines the location of the shelf position where the returned items are placed. The computer system keeps track of all of these activities and stores them electronically on the hard disk. The computer system will not allow the cabinet doors to be locked until there is a correlation between the number of items read in and the number of items placed on the shelf, as indicated by a block 160.

The customer then has completed the return transaction of the rented items. As indicated by a dashed line box 162, in the event that the rented items have been returned late, a late charge can be debited to the customer's account, which will be charged to the customer when the customer next makes a rental transaction. In other words, the late fee is put on the customer account. The late fee is then put on the customer slip for the next rental transaction, so that the customer will have to pay at the checkout counter this late fee when he next rents an item or items. Also note that this late fee can be debited to the customer's credit card account by the computer, as indicated by the dashed line box 164.

Figure 1A:
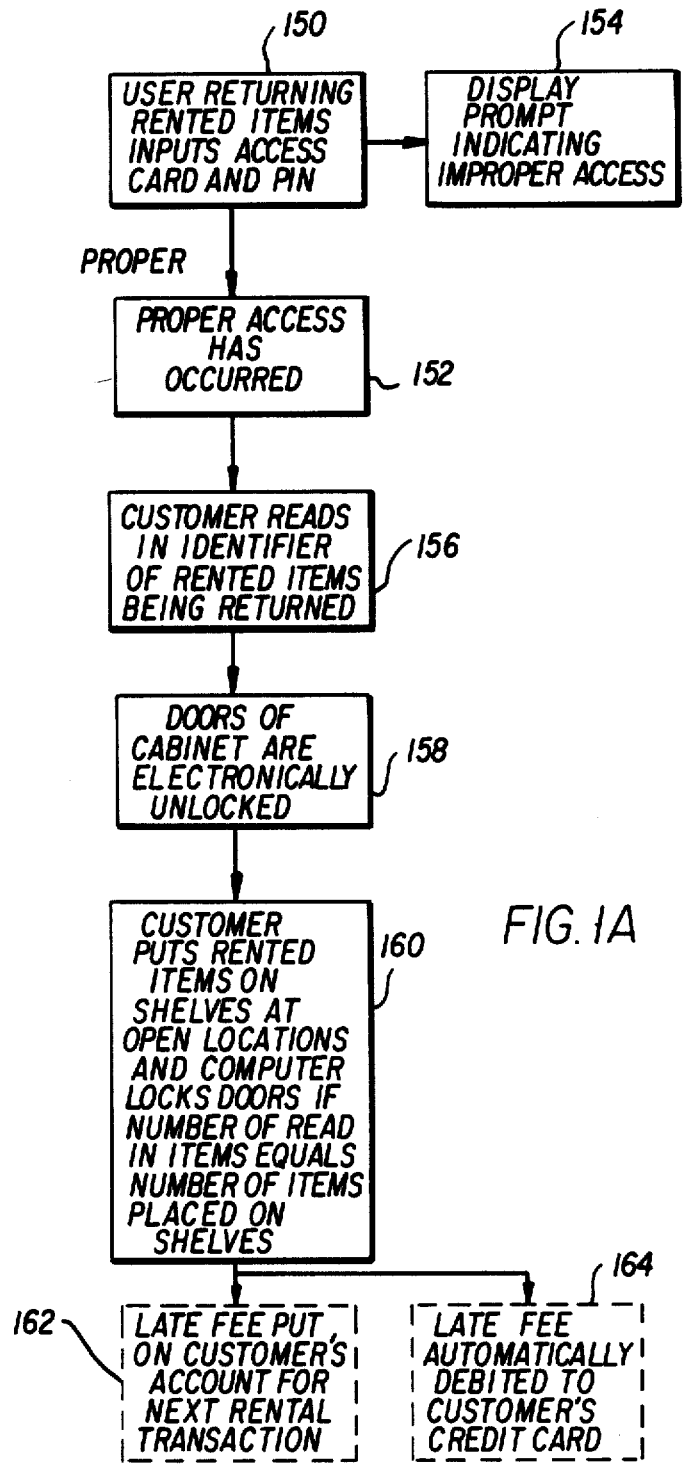
FIG. 1A is a block diagram of the rental return aspect of the present invention.
Figure 1B:
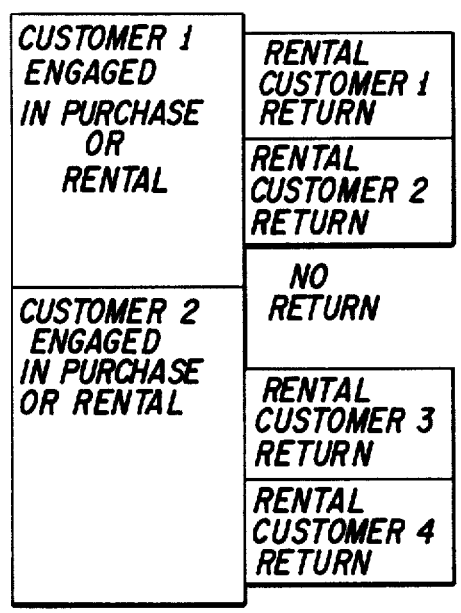
FIG. 1B diagrammatically shows how rental and return transactions can be processed in parallel by the present invention.

The present invention can accommodate at one time one customer who is involved in the selection and purchase/rental of items, and a stream of rental customers who sequentially are returning rented items in the fashion indicated in FIG. 1A. This is shown in block diagram form in FIG. 1B. As seen in FIG. 1B, only one customer at a time can be engaged in the purchase and/or rental of items from the locked cabinets. The reason for this is that the customer who has access to the locked cabinets and who is engaged in the purchase or rental is legally responsible for the contents of the locked cabinets during the time frame when the cabinets are unlocked for that customer. Thus, if one were to allow more than one customer access to a given locked cabinet at a time, it would be impossible to determine legally which customer was responsible for the contents of that locked cabinet.

However, as shown in FIG. 1B, a steady stream of customers can return rented items to the system at the same time that another customer is engaged in the rental or purchase of items from the locked cabinet. The procedure for returning these rental items is discussed above in connection with FIG. 1A. However, it should be noted that the customer who is legally responsible for the contents of the locked cabinet must make sure that the party who is in the process of returning a rented item does not improperly remove an item from the open cabinet when this customer who is involved in the return is putting items back up on the shelf. Thus, there must be some cooperation between the customer who is in the process of renting and/or purchasing items from the unlocked cabinet and the customer who is in the process of returning a rented item and putting it back on the shelf of the unlocked cabinet.

Note that the return of rental items immediately puts back into circulation the rented items so that they can be rented again by a subsequent customer. In other words, the rented items are not put in a bin or separate area to be processed at a later time by the system personnel. This would introduce a delay in the making the returned items available for subsequent rental. It would also introduce the requirement of additional personnel handling of returned items. Note that the return of rented items in the present invention does not require any interaction of the system personnel. In other words, there is no personnel requirement in connection with the rented items, and there is no delay in making the returned rental items available to subsequent customers.

Figure 1C:
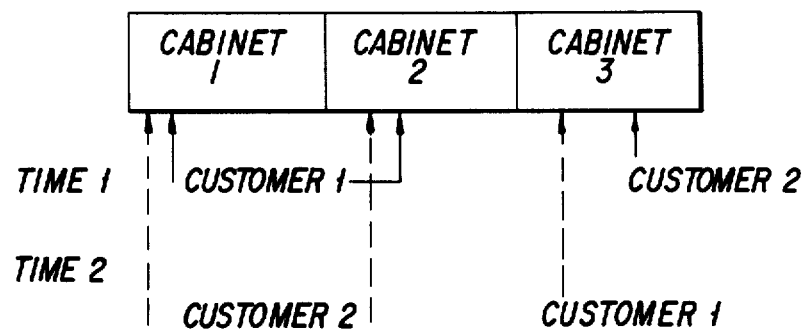
FIG. 1C is a block diagram illustrating the multiuser approach of the present invention.

A multiuser approach for the present invention is shown in block diagram form in FIG. 1C. As shown diagrammatically, there are three locked cabinets available to customers having proper access cards and personal identification numbers. FIG. 1C shows diagrammatically a version of the present invention having three separate locked cabinets, designated cabinets 1, 2, and 3. There are two time frames: time 1 and time 2. During time 1, customer 1 is given access by the computer system to cabinets 1 and 2. Customer 2, during time 1 is given access to cabinet 3. In this way, the control feature of the present invention, which makes an individual customer legally liable for the contents of a cabinet during his or her selection time period is preserved. Customer 1 can operate the system using a first terminal (not shown), while customer 2 can operate the system using a second terminal (not shown).

After customer 1 has completed his or her selection in cabinets 1 and 2, customer 2 has completed his or her selections in cabinet 3, the first time frame (time 1) has been completed. Hereafter, the computer system locks the cabinets 1, 2 and 3. Then, customers 1 and 2 effectively switch places. During time 2, the computer system allows customer 2 access to cabinets 1 and 2, while allowing customer 1 access to cabinet 3. Note that in time 2 the two customers are given exclusive access to a particular set of cabinets. This preserves the control that is required by making the particular customer legally responsible for the contents of a cabinet or cabinets during a particular time frame. However, this arrangement allows more than one customer to utilize the entire system where the entire system comprises a plurality of cabinets, the contents of certain ones of which may not be of interest to a particular customer at a given time.

Figure 2:
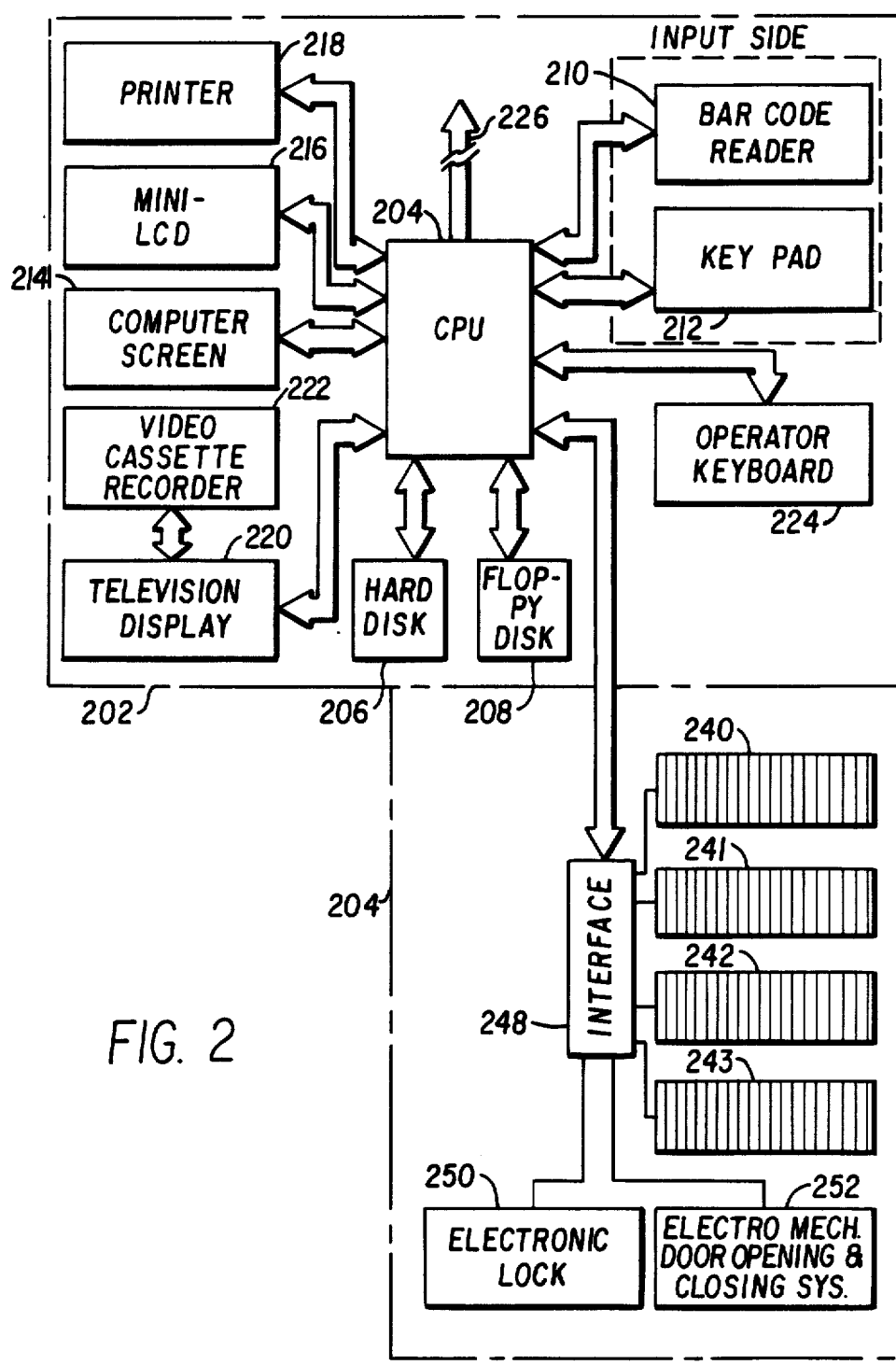
FIG. 2 is a block diagram of a generalized version of the system of the present invention.

A generalized version of the system of the present invention is shown in broad block diagram form in FIG. 2. As shown, the system comprises a computer console, designated generally by a reference numeral 202 and one or more cabinet units designated generally by reference numerals 204', 204", etc.

Referring now to the computer control console 202, the heart of it is a central processing unit (CPU) 204. Storage devices, such as a hard disk 206 and a floppy disk 208 are connected to CPU 204 to provide for data storage and data input.

On the input side of the system, input devices such as a bar code reader 210 and a keyboard 212 are provided. The bar code reader 210 is the input device used by the customer (not shown) to have read the access card that the customer is provided for access to the system. In a preferred embodiment, the access card can include a bar code which can be read by the bar code reader 210. The bar code reader 210 can be in the form of a bar code pen or a holographic scanner. Alternatively, the reader may be responsive to a smart card.

In addition to the access card, the customer is provided with a personal identification number (PIN) which allows the system to determine whether the person having possession of the access card is indeed a customer who is allowed to have access to the system. This acts as an added level of protection for misplaced or stolen cards. The customer inputs his or her PIN (typically 3 digits) into the system via the keypad 212. The CPU 204 then compares the access card data and the inputted PIN with stored data contained on the hard disk 206 to determine whether the customer is a customer who should be provided with access to the system.

The key pad 212 and the bar code reader 210 also can be used by the customer for controlling the operation of the computer console once access has been gained. These two input devices allow the customer to obtain user information (such as inventory lists) as well as to control the operation of the computer console.

The output side of the computer console includes the computer screen 214 which provides the user with visually displayed data indicative of the operation of the system and of information relating to the system. A "touch" screen can be employed which combines a computered screen display function with the input function provided by the keypad 212.

A minidisplay in the form of a mini liquid crystal display (LCD) is also provided in addition to the computer screen 214. The mini LCD 216 is under control of the CPU 204.

The mini LCD 216 typically is placed in a cabinet to provide the customer with specific information. It also acts as a visual indication of an alarm condition (such as a stolen card or break in) which will indicate that a certain mode of operation has occurred.

A printer 218 is connected to the CPU 204 via a bus. Printer 218 provides the customer slip at the end of a transaction. Printer 218 also can be used to output other types of data, such as inventory control data generated when the system personnel visit the unit at the designated time each day.

The computer console also can include a television display 220 which is provided with video and audio data for display from a video casette recorder 222 under control of the CPU 204. The television display 220 can display streamers and other advertisements recorded on the continuous loop of the video cassette recorder 222. The advertisements can be either for the system itself or for other goods or services provided by the supermarket or the like in which the system is located. In addition, the television display can display specific information generated by the CPU 204 for viewing by the customer and potential customers. In this way, the present invention can also act as an advertisement for itself and for other goods and services provided by the store in which it is located.

Units 214, 216, 218, 220 and 222 comprise the output side of the computer console, as indicated by the dashed box.

There is also provided an operator keyboard 224 which is connected to the CPU 204. At a designated time during each business day, operating personnel from the owner of the system visit the system to take inventory and to perform other diagnostic and customer matters. In order to be able to perform these various tasks, an operator keyboard 224 is provided within the computer console so as only to be accessible by the operator who has keys to open the console. The operator keyboard allows the system personnel to be able to have the computer system do certain tasks that are not available to the customer. These tasks include performing an inventory check of all of the purchases or rental units are in the locked cabinets. It also allows for diagnostics of the system operation to be performed. It also permits the system personnel to obtain the data of all of the transactions that have occurred for the given day.

Also shown is a telephone or communications link 226 which allows the CPU to be connected directly to a central host computer (not shown). This allows the system to be connected with a host computer at a central site. It also provides the possibility of networking of various systems through a common communications network.

Turning now to one of the cabinets that is controlled by the computer console 202, cabinet 204' includes a bank of sensors, 240, 241, 242, and 243, etc., for each of the shelves in the cabinet 204' For purposes of explanation, refer now to the bank of sensors 240. This bank of sensors is for the first shelf in the cabinet. A sensor is provided for each of the position locations on this shelf. The sensor provides an electrical signal indicative of the presence or absence of an item at this particular shelf location. This data is provided over a bus to an interface unit 248. This data is then sent by the interface unit 248 to the CPU 204 via a bus. Note that each of the shelves in the cabinet 204 has a bank of presence detectors. In this way, the presence or absence of the items at the designated locations in the cabinet can be determined on a continuous basis.

In addition to the position presence detectors for the banks 240 to 243, cabinet 204' includes an electronic lock system 250 and an electromechanical door opening and closing subsystem 252. Note that the system also contemplates a system where the electromechanical door opening and closing subsystem 252 is eliminated so that the customer manually opens the various doors of the cabinets which have been unlocked electronically by the CPU 204 and the associated electronic locks 250, etc. The electronic lock 250 keeps the doors of the cabinet locked unless the CPU 204 indicates otherwise. In this way, access to the cabinet 204' is controlled by the CPU 204.

Note that the CPU 204 can accommodate a plurality of other cabinets 204", 204'", etc. There is no limit to the number of cabinets that can be controlled by the CPU 204. However, marketing considerations indicate that the present invention typically is most cost-effective when there is only a few cabinets 204', 204", etc. for a given computer console.

B. The Supermarket Application

Figure 3:
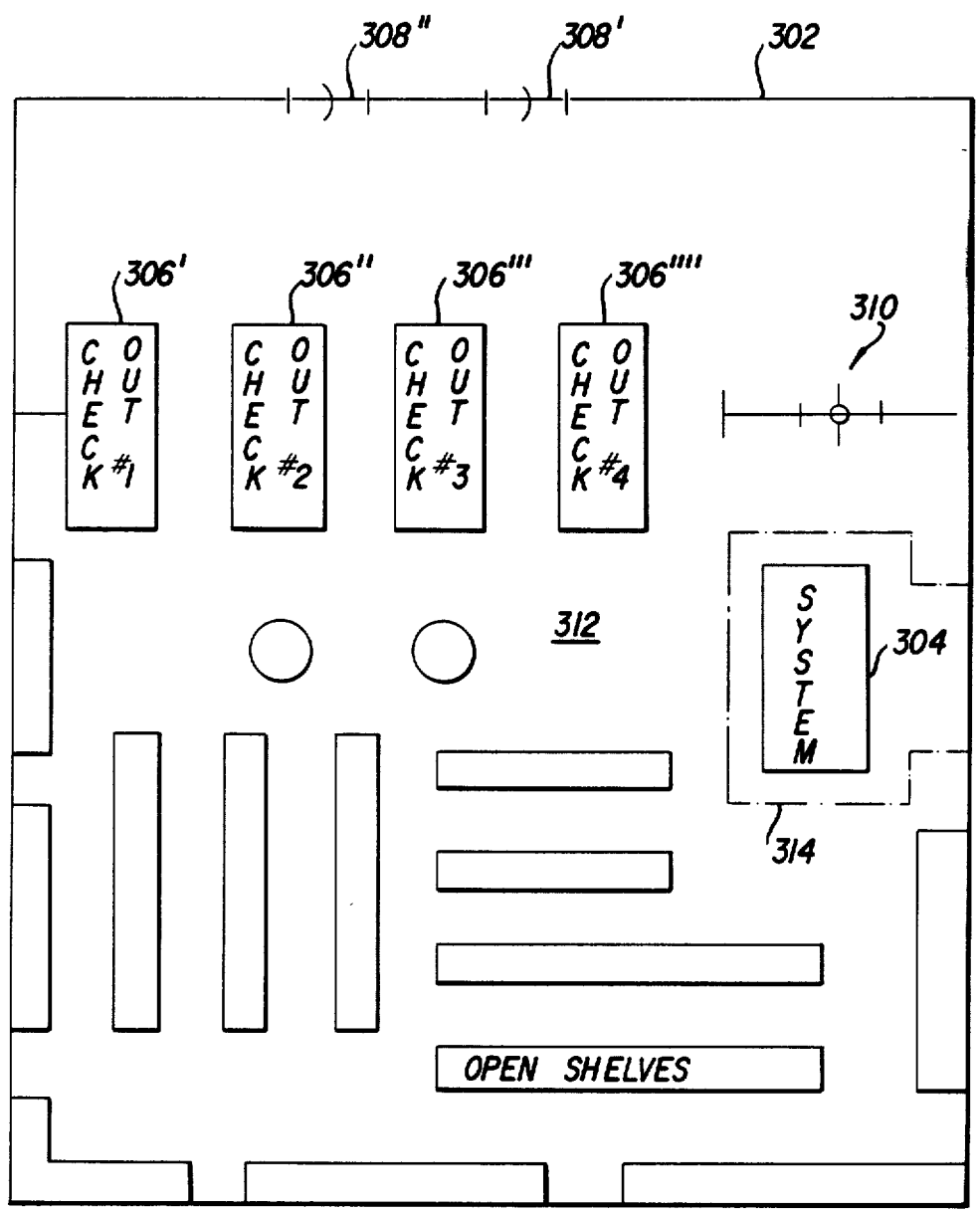
FIG. 3 is a block diagram of a representative arrangement of the system and method in the present invention in a supermarket environment.

FIG. 3 shows a block diagram representing the location of one of the systems of the present invention in a conventional supermarket. Note that the use of the term supermarket in this application contemplates any kind of store situation where there is a checkpoint which will prevent the customer from leaving the store where the customer slip contains information which is different from that which the customer presents at the control point in order to be allowed to leave. The present invention thus eliminates the need for the store within the store approach that is used in some conventional supermarkets and the like.

As shown in FIG. 3, the present system is located in the interior of the supermarket so that the customer must pass the checkout counter or other suitable control point in order to be allowed to exit the supermarket with items obtained from the system. Reference 304 indicates the system located within the supermarket 302. There are four checkout counters 306' to 306''''. The customer (not shown) enters the store 302 through doors 308' and 308" Customer then passes through a one-way turnstile designated by reference numeral 310, which puts him in a portion of the store 302 behind the checkout counters, as indicated by reference numeral 312.

The customer then can do conventional shopping by selecting items from the open shelves (unnumbered) and the other display counters that are found within the region 312 of the supermarket. He or she also can purchase or rent items from the system 304. After having completed such a purchase or rental transaction using the system 304, the customer is provided with the customer slip along with the items that have been purchased or rented from system 304. The customer presents the customer slip at one of the checkout counters 306' to 306'''' in order to be allowed to leave the area 312 of the store and 90 out of the store through doors 308' or 308".

Note that the system 304 can be provided in a special location in the supermarket 302 so that access is limited to the system 304. This is shown by the dashed lines 314. Thus, additional physical security can be provided so as to allow only authorized customers to gain access to the area in which the system 304 is located.

As discussed above, the checkout counter acts as the control point to make sure that the customer does not leave the store unless the number of units indicated on the customer slip equals the number of units that the customer has. Typically, where cash is the mode of payment, the customer pays for the units that have been purchased or rented at the checkout counter. However, in the situation where a credit card arrangement has been provided so that the control console automatically debits the customer's credit card account at the completion of the transaction, the checkout counter only acts as a control point. It can be appreciated that in such a situation, the checkout counter can be substituted by a control point where an employee of the store is stationed so as to check only the customers slips and not to receive any payment from the customer.

II. The Movie Rental Specific Embodiment

Figure 4:
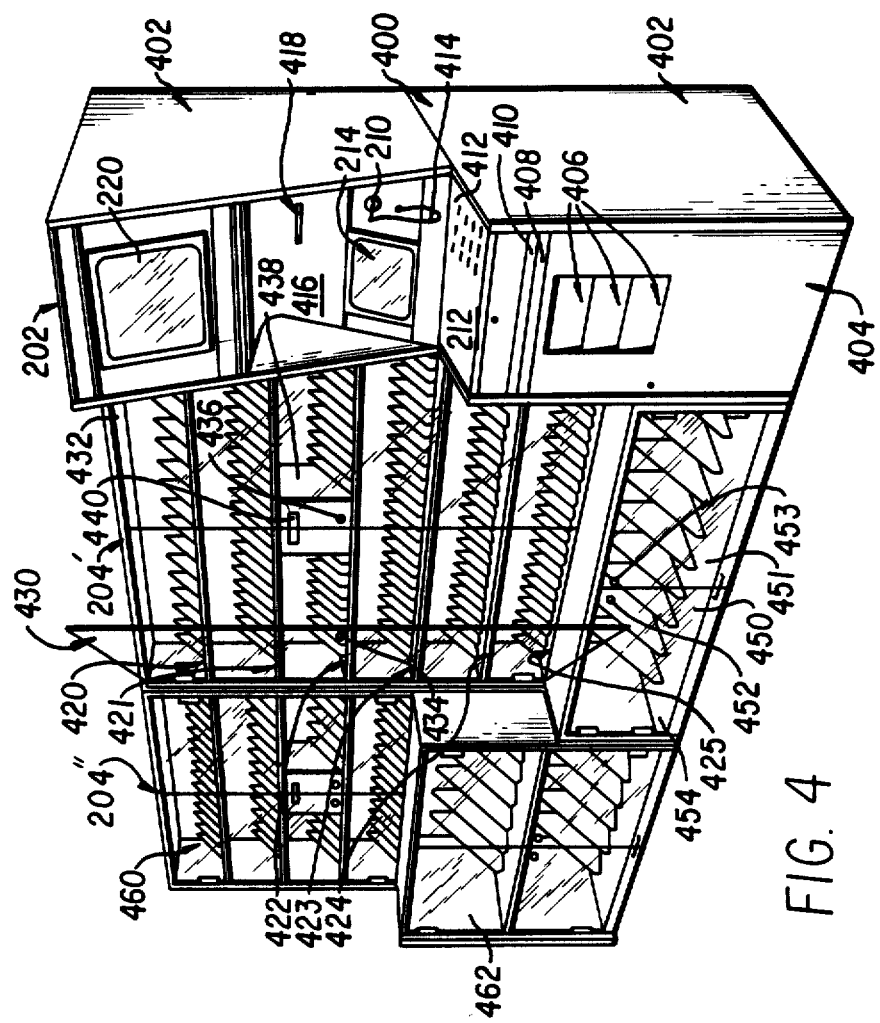
FIG. 4 is a perspective view of the enclosure of a representative example of a movie rental machine utilizing the system and method of the present invention.

FIG. 4 shows a perspective view of the enclosure of a representative example of a movie rental machine utilizing the system and method of the present invention. Referring now to FIG. 4, the representative embodiment of the movie rental version of the system and method of the present invention includes a computer console 202 and two cabinets, the first designated 204' and the second designated 204". The units, which are modular in form, stand adjacent to each other so as to create a visual impression on the user of a single unit. The interconnecting wires between the various three modules that make up this version of the system are hidden from the customer.

Referring first to the computer console 202, it is seen that it includes an enclosure designated generally by reference numeral 400 having side portions 402 and front portions 404. The top and back, which are not shown, are enclosed. Referring to the front portion 404, application forms and written material relating to the operation and the inventory of the unit are placed in slots 406 positioned on the front bottom portion of the front 404. The customer or potential customer can gain access to these written materials without having access to the actual operation of the system. There is provided a document slot 408 above the slots 406 which act as a type of "mailbox" for the system. The customer can insert a completed application form or a customer complaint or refund request into this slot 408. The service personnel during their daily visit to the system will obtain the contents of the mailbox that lies behind the slot 408. In this way, the customer can provide written communication to the system personnel, and also can apply for membership to the system when the system personnel are not present. If a request for a refund resulted from a valid cause, the company's staff can, during their daily visit, program the computer to grant said refund to the customer to be deducted from his next payment.

A tray table which can be pulled out by the user to provide a writing surface is also included in the front portion 404 of the enclosure. Normally, this tray portion is in its retracted position so as to not prevent the customer from being able to position him or herself directly against the operating surface of the console 412.

As shown on the operating surface of the console 412, there is provided the key pad 212, having a plurality of keys. Also, present on the key pad are bar codes that can be read by the bar code reader pen 210 which is connected to the computer console by a wire or flex 414 so as to provide an electronic bus between the bar code reader pin and the electronics contained in the computer console 202. The display screen 214 connected to the computer is provided in an inclined back surface 416 of the enclosure. A slot 218 is provided on the surface 416 to allow the printer which is contained within the interior of the computer console 202 to provide the user with the printed customer slip.

The television display 220 is located in an upper portion of the computer console 202. Note that the videocassette recorder 222 is not shown since it is within the computer console 202. The location of the television 220 allows parties other than the customer to view what is being displayed even when the customer is blocking the view of screen 214, which typically occurs when the customer is operating the computer console 202.

Referring now to the first modular cabinet 204', it is seen that it includes an upper portion having six shelves 420, 421, 422, 423, 424, and 425. Triangular shaped dividers are provided along each of the shelves 420–425 so as to define locations where video tapes (not shown) of either the VHS, Beta, or 8 mm format or the like can be placed. Each of these shelves 420–425 also includes the presence detectors which indicate electronically to the computer console 202 the presence or absence of an item at that particular shelf location.

Doors 430 (shown in the open position) and 432 (shown in the closed position) allow the computer console 202 to prevent customer access to the contents of cabinet 204'. Electronic locks including elements 434 and 436 shown on doors 430 and 432, respectively, operate in conjunction with associated electronic lock elements contained in an enclosure 438 which is based midway along the shelf 422. The enclosure 438, in addition to containing the electronic lock subsystem 250 (not shown) also includes the mini LCD 216 as indicated by reference numeral 440. The mini LCD 216 can display specific customer information under control of the computer console 202. The LCD 216 can provide the customer with any desired intended message. Representative are messages such as "the door is open", "welcome", "the following is a special today", etc. Note that the LCD 216 allows the computer console 202 to provide a message that will be seen by the customer when the customer is examining the contents of the cabinet and no longer can directly view the computer display 214.

A cabinet 204' also includes a lower section having doors 450 and 451. Electronic lock components 452 and 453 are provided on doors 450 and 451, respectively, so as to allow the computer console 202 to control customer access to the items contained in this lower section. Note that the lower section is larger in size. The lower section is designed to accommodate video cassette recorders which can display, but not records video programs (also called "movie boxes"). Thus, the customer ca rent the machine needed to display the video tape that can be rented from the upper portion of the cabinet 204'. A plurality of triangular shaped dividers are provided along the shelf 454 contained at the bottom of the section enclosed by doors 450 and 451. There is provided a presence detector (not shown) for each of the locations defined by these triangular shaped dividers. Triangular shaped dividers require that the movie machines be stacked vertically when they are placed within the cabinet 204'. However, note that the movie machine could equally be stacked in a horizontal relationship if additional subshelves were provided.

A second cabinet 204" is also provided. Since the representative embodiment shown in FIG. 4 is drawn to scale, it can be seen that it is approximately 50% smaller in width than the cabinet 204'. It has an upper section 460 and a lower section 462. The upper section is enclosed by a pair of doors, as is the lower section 462. Customer access to these portions of the cabinet 204" are thus controlled by these doors and the electric locks that are controlled by the computer console 202.

The upper section 460 is used to store movies, while the lower section 462 is used to store movie boxes. Note that in this example of the cabinets there are four shelves in the upper section for movies, and two shelves in the lower section 462 for movie boxes.

Figure 5:
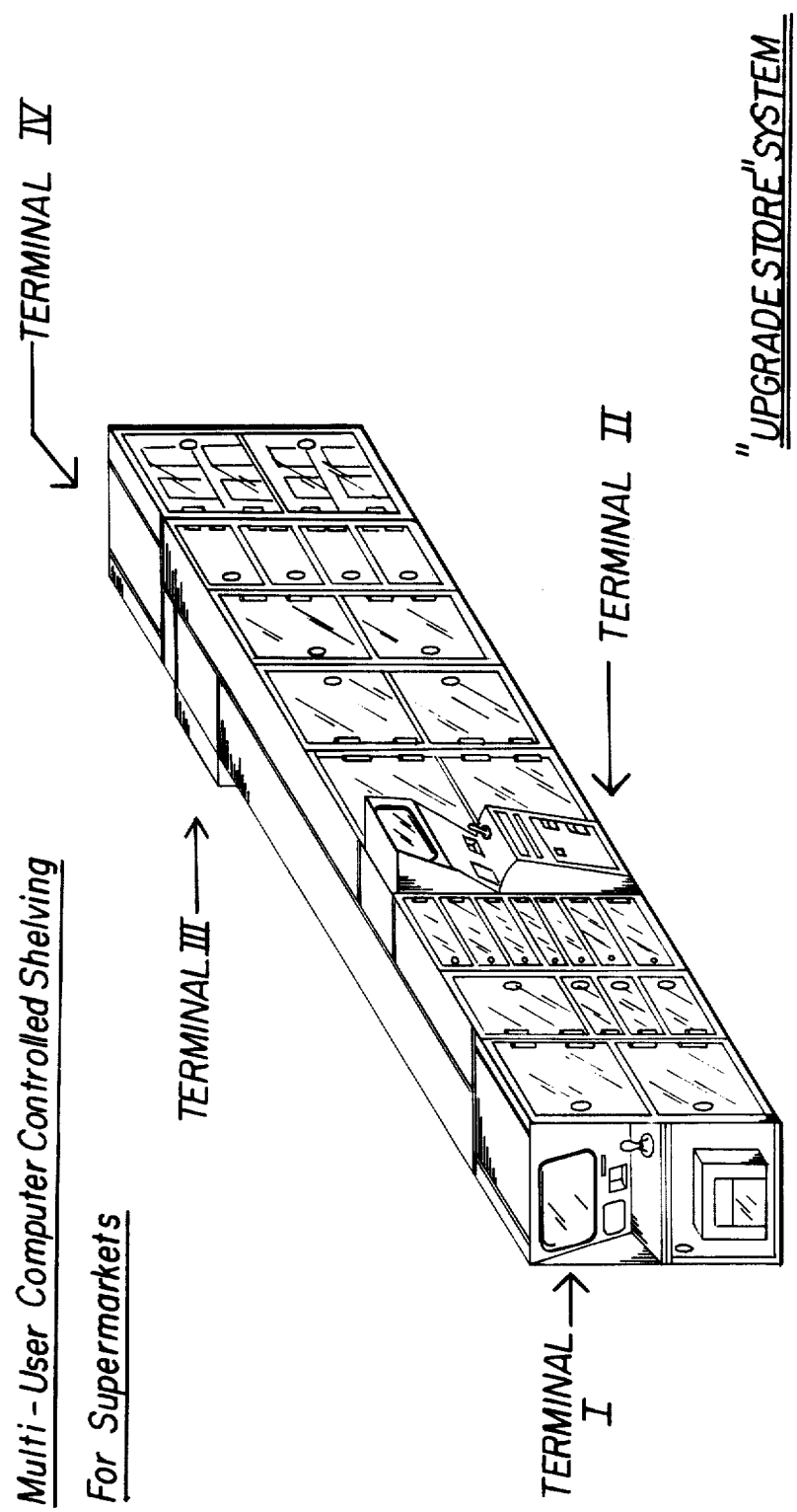
FIG. 5 is a a perspective view of a multiuser controlled shelving system for a supermarket using the system and method of the present invention.

The modular representation of the present invention shown in FIG. 4 is only for purposes of illustration. The present invention in no way is limited to the particular example shown, and includes any particular arrangement that can be used to provide the method and system of the present invention. In this regard, reference is made to FIG. 5, which shows a perspective view of a multi-user controlled shelving system for a supermarket. This pictorial illustration of the application of the present invention to the supermarket environment is shown to illustrate the fact that the present invention can be utilized for a highly automated supermarket or part thereof. As shown, there are provided four computer consoles or terminals (labeled terminals I, II, III, and IV). Each of these terminals controls all cabinets or bays having doors, which doors will be descriptively labeled or numbered. The control over a particular bay and door remains with the same terminal as long as a particular customer has gained access to the particular bay, until such time as the computer is able to close the doors again. The customer can request opening of any specified compartment door, even on the other side of the console and shelving. The computer will release the electronic locks and the customer will manually open the door once he has arrived at the particular compartment. Since the doors do not swing open automatically, no attention is drawn to the fact that the locks are off, so as not to create a security risk in the brief time the consumer takes to arrive at the particular compartment door which is unlocked at his request. In this way, a customer cannot gain access to the contents contained behind these doors unless the customer is able to access the appropriate terminal and receives permission by the terminal to open the doors Note that there ar cabinets on either side of the row that is defined by this embodiment. In this way, this long row arrangement could be substituted for a conventional open shelving row that is found in a typical supermarket. Other arrangements of the present invention are contemplated.

FIG. 2 shows a block diagram of the system of the present invention. This block diagram can be utilized in the movie rental machine embodiment that is being described. Note that an additional microprocessor (not shown) can be provided for each of the cabinets 204', etc. These additional microprocessors will distribute the data processing requirements of the CPU 204 down to a lower level in the system. This will allow processing to occur in the cabinets 204', etc. This processing will reduce the processing load that is placed on the CPU 204. The processed data may then can be supplied to the CPU 204 via the interface 248 and the associated bus.

Figure 6:
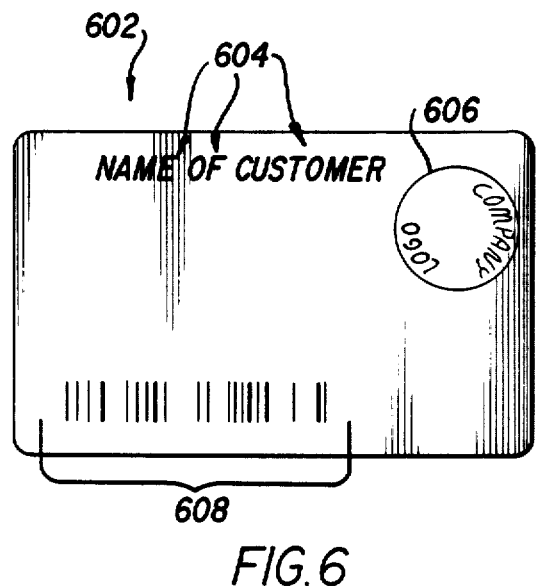
FIG. 6 shows a representative access card having bar code information recorded thereon.

FIG. 6 shows a preferred embodiment of the access card used by the customer to gain access to the operation of the computer console 202. As shown in FIG. 6, the card 602 includes specified data. This data can include the name of the customer as indicated by a reference numeral 604, and the company logo as indicated by the reference numeral 606. In addition, the access number on the card is included. In the example shown in FIG. 6, the access number is in the form of a bar coded number as indicated by brackets 608. Note that the magnetic strip could be substituted for the bar code.

The user inputs the bar code number from the access card by moving the scanning portion of the bar code scanner pen 210 across the bar code region 608 of card 602. This scanning operation causes the bar code scanning pen 210 to produce an electronic signal indicative of the bar code that is scanned.

The bar code number can be any number that is desired to allow the user to present the first piece of information to the system that will result in access. Note as discussed above, that the user will also have to key in his or her personal identification number in order for the access procedure to be completed. The bar code number can include several digits indicative of the particular machine for which the card is authorized to be used. It can also include additional digits indicative of particular cabinets that the user will be allowed access to. It can also include an individual access number that has been assigned to the user. Additional types of data can be provided. Since an automatic scanning device is utilized, the bar code can have 10 to 20 digits if high security is required.

Figure 7:
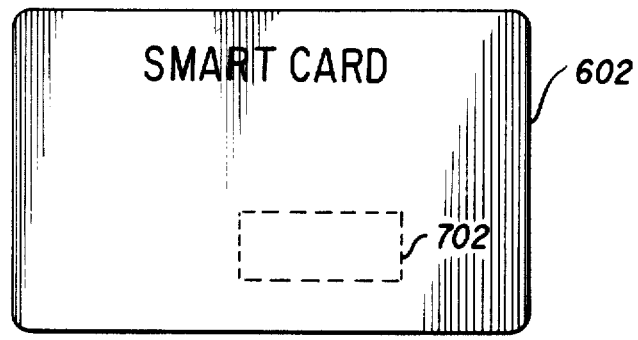
FIG. 7 shows a representative smart card having a semiconductor element contained therein.

FIG. 7 shows an alternative embodiment for the access card 602 of the present invention. As shown in FIG. 7, the access card is in the form of a so-called "smart card" which contains a semi-conductor element embedded therein which stores additional identification information and/or data that can be used interactively by the computer console 202. Referring now to FIG. 7, it is seen that the "smart card" version of access card 602 includes the embedded semiconductor element as indicated by the dash box 702. The semiconductor element not only can contain permanently embedded information but can be read out by the computer console 202, but it may also contain information that can be modified through an interaction between the card 602 and the computer console 202. For example, the "smart card" can include the amount of money that the user has already paid into the system. This amount will automatically be reduced by each transaction that the user makes. In this way, the present invention would not require the user to pay the cashier, since the payment would occur by the debiting of the account contained in the "smart card".

Since access to the system is a very important component to prevent theft, other protection schemes can be utilized as well. For example, the computer can include a scanner which requires a customer to place his or her hand on a plate which will result in positive identification based on fingerprints or the like. The eye of the user can be scanned by a sensor to indicate a unique signature that is provided by the blood vessel structure of the eye. Also, it is possible that voice identification procedures can be utilized. Any of these approaches can result in the elimination of the access card 606.

Figure 8:
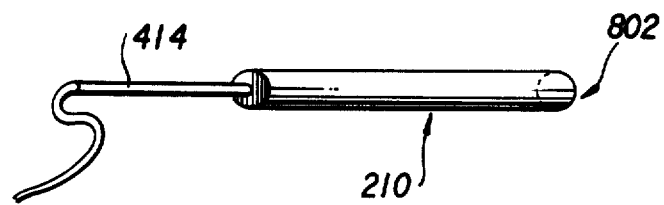
FIG. 8 shows a representative bar code reader pen.
Figure 9:
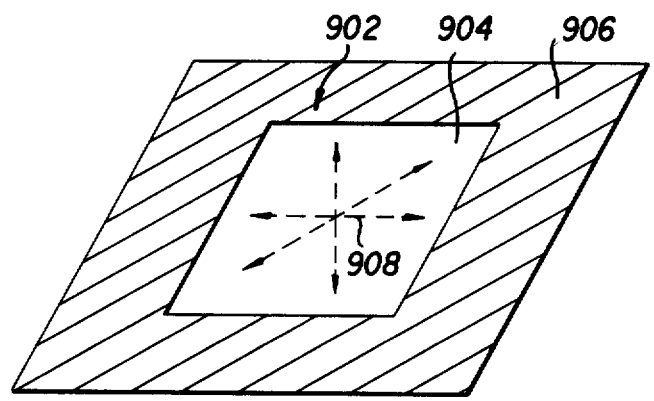
FIG. 9 shows a representative holographic reader mechanism for bar codes.

A representative bar code reader pen 210 is shown in FIG. 8. The wire 414, which connects the pen 210 to the computer console 202 allows the electronic signal indicative of the bar codes that have been scanned to be transmitted. The scanning portion of the pen 210 is at the reading end indicated generally by reference numeral 802. This end of the pen 210 includes a window through which light can be received. When the user physically moves the pen across the bar code portion of the access card 602, the pattern corresponding to the bar code 608 causes changes in the voltage level of a transducer contained in the pen 210 which is amplified by electronics contained in the computer controlled console 202 to produce a digital signal indicative of the bar code that is being scanned. Note that in this arrangement, the user must physically move the bar code reading pen across the bar code portion of the access card 602 in order for the proper reading of the bar code code to occur.

Figure 10:
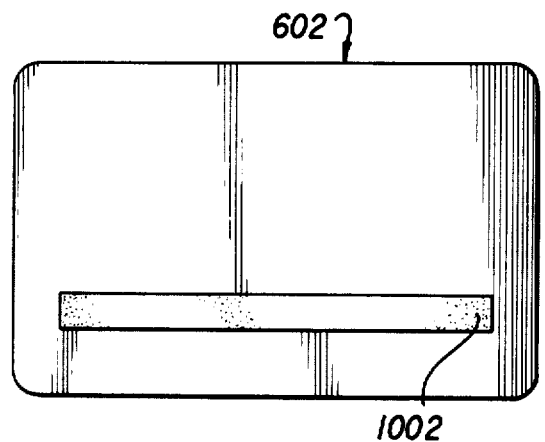
FIG. 10 shows a representative access card having a magnetic strip for storing the information found in the bar code of the card of FIG. 6.

The bar code reader pen 210 shown in FIG. 8 can be replaced by a holographic scanner shown diagramatically in FIG. 10. The scanner indicated generally by reference numeral 902 has a scanning window 904 that is disposed in a mounting surface 906. The user physically wipes or runs the access card 602 across the scanning window 904 in any desired direction, as indicated by arrows 908. The holographic optical system contained in the scanner 902 allows the holographic image to be picked up from the card 602 regardless of the direction that the card is wiped across the scanning window 904. This results in fewer problems hence it allows for greater variation in customer operation to produce the desired scanning operation of the code.

In addition to these versions of the bar code reader 210, the present invention contemplates magnetic scanners. Magnetic strips are provided either on the front or the back of the access card, as shown by the magnetic strip 1002 shown in FIG. 10. The magnetic strip 1,002 can contain a magnetic version of the access code. The magnetic strip can be read by any suitable type of reader commonly employed with credit cards and the like. In this way, the customer would physically insert the card in the reader. The reader would then read the magnetic code contained in the magnetic strip 1,002. After this process had been completed, the magnetic reader would then physically push the card out so that the reader could take it back into his or her possession.

Figure 11:
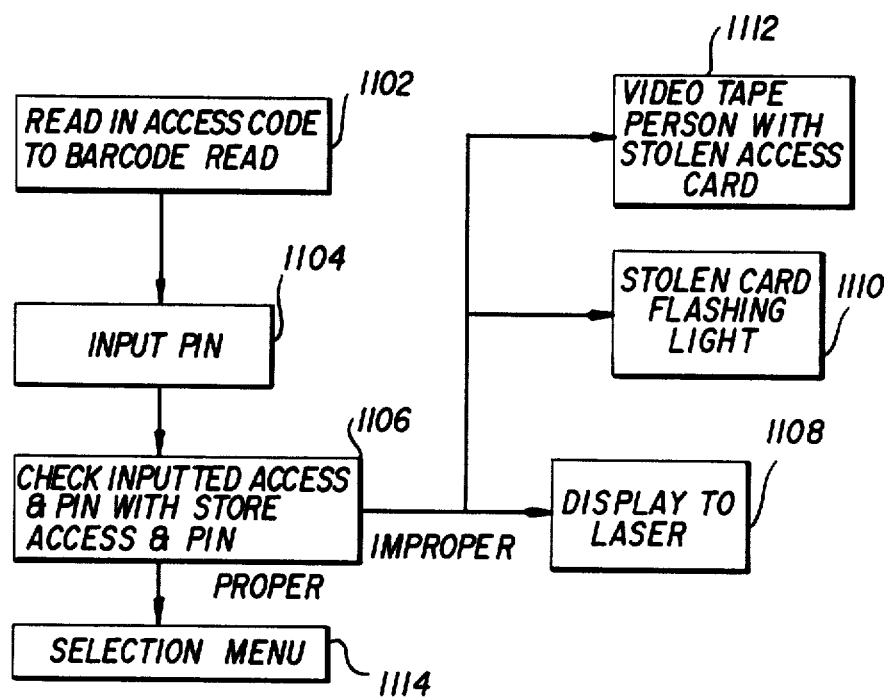
FIG. 11 is a flow chart of the basic steps taken by the system during the access mode portion of the transaction.

The access mode of the present invention is now described in detail. Referring now to FIG. 11, which is a flow chart of the access mode of operation, it is seen that the user first reads in the access code from the access card 602 into the bar code reader 210, as indicated by a block 1102. Hereafter, the user inputs his or her personal identification number (PIN) via the key pad 212 or by using the bar code reader 210 in conjunction with bar code symbols that are present near the key pad that allow the user to indicate specific letters and numbers by running the pen across these particular symbols, as indicated by a block 1104. The. CPU 204, which has caused the access number and the PIN number that have been inputted to be stored in a register (not shown) then accesses the particular customer information indicated by this access code and PIN number that is stored on the hard disk 206, as indicated by a block 1106.

If the check performed in block 1106 indicates that an improper access number has been inputted or that the stored information relating to the access number indicates that the card is stolen or lost, an appropriate display is provided to the user on the computer screen 214, as indicated by a block 1108. Moreover, the CPU 204 may also cause an additional display to occur. For example, as indicated by box 1110, the CPU 204 may cause a stolen card flashing light that is provided on the computer console 202 or at a remote location to be activated so as to alert store personnel that the customer trying to gain access to the system has a stolen access card. In addition, the improper access can cause a television camera and associated VCR to be activated so as to film the individual who is trying to gain access to the system with a stolen access card, as indicated by a block 1112.

Assuming that a proper access and PIN card number were inputted and that the information stored in the hard disk 206 did not indicate that any other action should be taken, the CPU then displays a selection menu, as indicated by a block 1114. This selection menu allows the customer to either start the process of purchasing or renting items. It also allows the customer to take additional information from the system concerning what the available items are, or information regarding the operation of the system. At this stage, the customer has gained access to the system. The customer will continue to have access to the system until the customer indicates otherwise.

Now that the customer has gained access to the system, he or she is now in the position to do one of three things: (1) indicate to the customer that access to one or more of the cabinets is desired; (2) obtain information from the system relating to the inventory of items available or information relating to aspects of the items that are available; and (3) obtain information or user friendly guidance concerning the operation of the system.

Figure 12A:
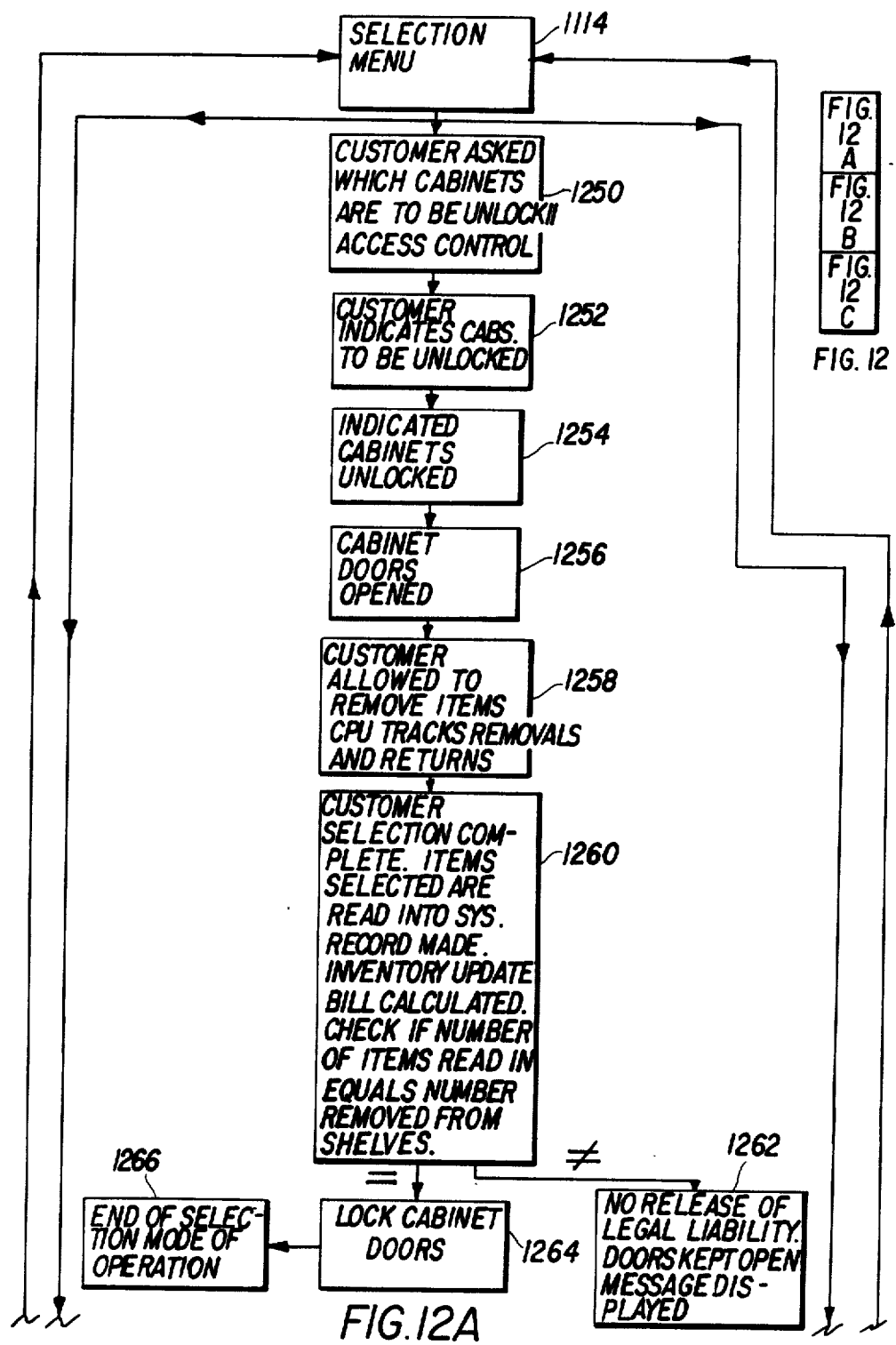
FIG. 12 (comprising FIGS. 12A, 12B and 12C) is a flow chart of the basic steps taken by the system of the present invention during the customer selection portion of the transaction.
Figure 12C:
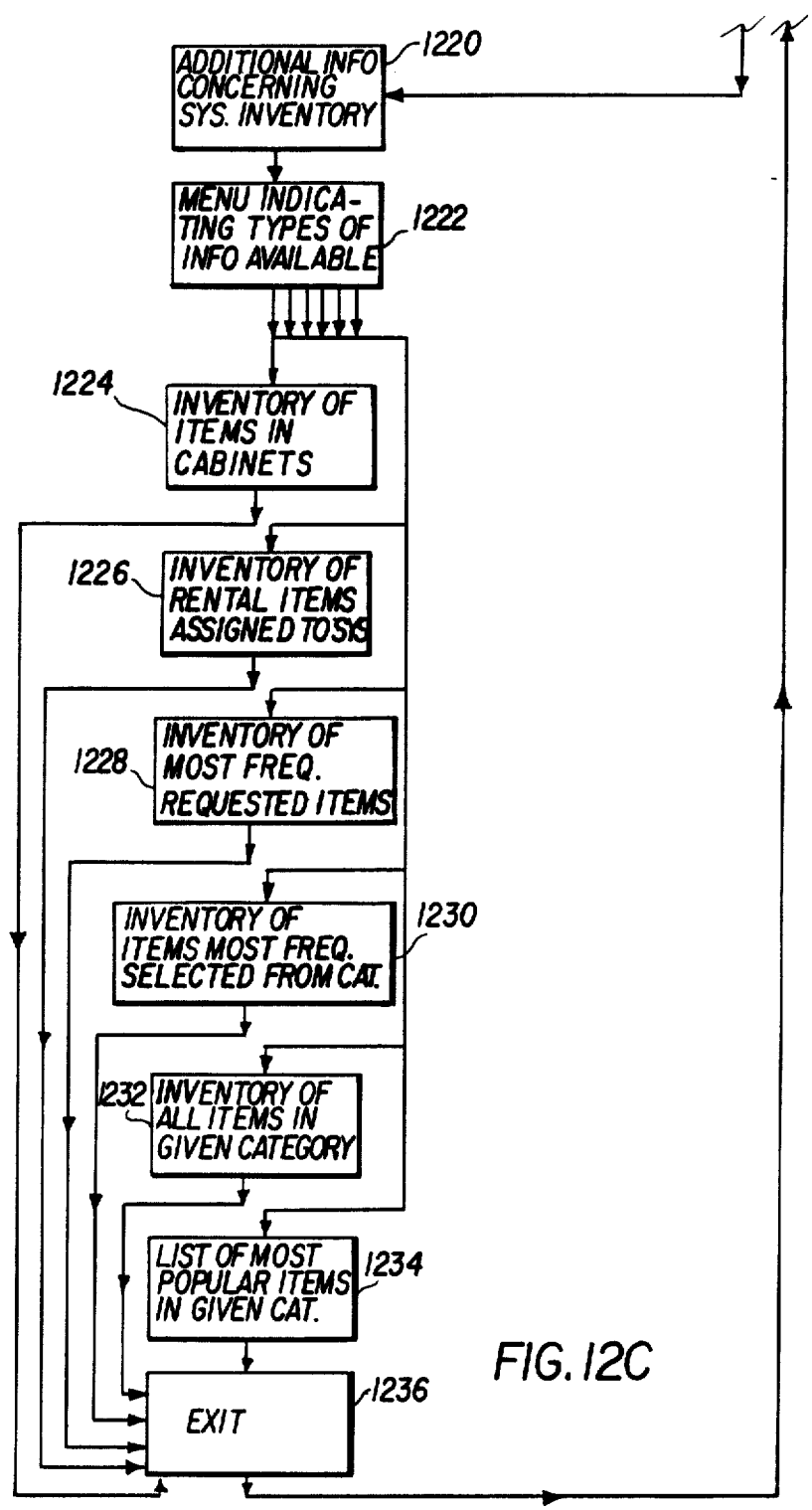

Referring now to FIG. 12, which shows a block diagram of the customer selection mode of the operation of the present invention, the user is provided with the selection menu, as indicated by block 1114. The selection menu can allow the user to select one of the three modes of operation discussed above.

Referring first to the mode which provides the user with additional information concerning the operation of the system of the present invention, the user indicates that such additional information is desired, as indicated by a block 1202. The CPU then provides a customer with a menu indicating the various additional types of information that can be provided, as indicated by a block 1204. The user then selects one of the menu items, as indicated by blocks 1206, 1208 and 1210.

Referring first to the menu item 1206, the user then enters an interactive display sequence, as indicated by a block 1212 which provides the user with a "user friendly" tutorial on the particular aspect of the system operation about which the user wishes to obtain additional information. This interactive teaching sequence can utilize text and video generated graphics to explain the operation to the user. Both monochrome and color displays can be provided to the user. The user proceeds through the instruction at a self-paced mode, allowing the instruction to proceed only as fast as the user is comfortable. In addition, the tutorial can be set up in such a way as to respond to user errors by modifying the order of presentation of information based thereon. In this way, the operation of the present invention can be taught to the user in the most effective manner possible, since it will be able to respond to commonly occurring problems that may occur in user understanding based on responses from the user. The user can exit the tutorial program, at any time, as indicated by the exit block 1214. Alternatively, the exit block 1214 comes up at the end of the tutorial causing the customer automatically to return to the selection menu 1114, as shown in FIG. 12.

A second menu item 1208 and the third menu item 1210 can operate in the same manner. Note, that the presentation of information does not have to occur in a tutorial approach. In other words, the information can be displayed to the user in a straight graphic way so that the user can just read the information and then exit the program.

The present invention contemplates utilizing teaching software to allow a customer to obtain maximum understanding of the operation of the present invention in the minimum amount of learning time. The various programs that are provided can be updated and can be customized for a given operating environment. Obviously, any type of language can be used so that the system can be customized for a particular country and/or culture.

A second mode that can be selected by the user is that relating to the inventory of the system. As indicated by a block 1220, the user can obtain from the CPU 204 additional information concerning the available inventory of the system. Once this additional information is requested, a menu is provided to the customer indicating the various types of inventory information that can be obtained, as indicated by a block 1222.

Since the present invention constantly keeps track of the status of each of the items that is in the cabinet, and also keeps track of each of the items that has been sold or rented, at a given moment in time it can provide to the user a complete inventory of items that are present in the cabinets and in the rental situation, items that are assigned to that particular system for rental (and also whether they are presently in the cabinet or are out on rental). These two available inventory lists are indicated, respectively, by blocks 1224 and 1226. Obviously, each of these inventory lists is extremely useful to the customer and makes the system very user friendly, since it does not require the customer to look through all of the cabinets to determine whether a given item is present. Moreover, this inventory list can be provided with the ability to indicate the location in a particular cabinet where a particular inventory item can be found. Another feature available in the rental situation is to provide an indication of when a particular rented item is scheduled to be returned. In this way, the customer can reserve a rental item up to 10 days in advance, and will be charged when he makes his reservation.

The present invention also provides additional types of inventory lists which are extremely user friendly and helpful to the customer. For example, as indicated by a block 1228, an inventory of the most frequently sold or rented items over a given period of time can be provided to the customer. This inventory list lists these items from the most popular on down.

Other types of inventory lists based on other customer purchasing or rental habits on the given system can be provided to the customer. For example, the customer can be provided with an inventory of the most frequently selected item from a particular category (for movies, such categories include westerns, comedies, science fiction, etc.). This is indicated by a block 1230.

With regard to inventories for specific categories, the present invention can provide inventory lists for specific categories. For example, as indicated by a block 1232, the present invention can provide an inventory of all items that are presently in the system for a given category. Alternately, this inventory list could be an indication of all items for this given category that are assigned to this particular unit (not shown) in the case where the unit is acting in a rental as opposed to a sales mode.

Note that since the present invention keeps a constant inventory, these inventory lists that are available to the user are constantly being updated as rental units are returned or as the system is being restocked by the system personnel. Thus, these inventory lists are dynamic based on the present state of the system. Note that this does not require that the system be in communications with the host computer to be able to provide such updated inventory lists.

Customer purchasing or rental patterns that go beyond the system involved can also be utilized to generate inventory lists. Specifically, such lists indicating the ten most frequently purchased or viewed movies in a given locale or region can be provided to the customer upon request as indicated by the block 1234. These inventories can be broken down according to certain product categories or can be broken down according to particular types of customers, such as by age groups, family size, etc. In this way, the customer can utilize these inventory lists to assist in the selection of items for either purchase or sale. These lists will provide the customer with up-to-date market information that usually is not available to a customer. In this way, the present invention assists the customer in the selection process by providing the customer with information that is normally not available to him or her.

After the customer has utilized all of the inventory information that is desired, he or she exits the program, as indicated by a block 1236. Thereafter, the program returns to the selection menu 1114. The customer now can enter one of the other modes of operation or can exit the system.

The third mode of operation that can be selected by a customer using the selection menu 1114 is that of actual selection of items contained in the locked cabinets 204', etc. As is shown in FIG. 12, the first step in this mode of operation involves the CPU 204 asking the user which cabinets should be unlocked so as to allow inspection and selection to occur. Note as indicated by block 1250, that certain cabinets may be off limits to the user based on access code information or information stored on the hard disk based on prior transactions or the like. As indicated by a block 1252, the user then indicates which cabinets are to be unlocked. The CPU 204 then sends an electronic signal over the bus to the interface 248 of the various cabinets involved so as to cause the respective electronic locks 250 to unlock the cabinet doors for the particular cabinets that have been selected. The user then can open the doors of the locked cabinets either manually or through the aid of the electromechanical door opening and closing system 252 (if present). This is indicated by blocks 1254 and 1256.

With the cabinet doors of the desired cabinets unlocked, the customer now is able to examine and remove any of the items stored in these cabinets. As indicated by block 1258, the CPU 1204 continually monitors the removal of items from the cabinet, and stores electronically the sequence of removals by the locations of the items that were removed from the shelves. Since the user is allowed to remove the items from the cabinet without purchasing or renting them, the user is free to examine them in the same fashion that he or she is able to examine them in an open shelf situation. This is particularly important in the video tape rental business, since users oftentimes mistakenly select a film that they do not want. With the multitude of film titles that are available, it is extremely common for a customer to select a film mistakenly, only to find out later that it was in fact another film that the customer wanted. Since the present invention allows the customer to remove the film and to examine it prior to renting or purchasing it, the customer's mistakes are voided, resulting in significantly less customers dissatisfaction and loss associated with returning items that were rented or purchased that were not desired.

After the customer has completed the selection and inspection process, he or she now must read into the computer console the items that have been selected. As indicated by a block 1260, this is accomplished by the user reading in the bar code legends that appear on the items that are selected using the bar code reading pen 210. This bar code reading operation is similar to that used with the access card. The computer system stores the identification material that is read into the system. It uses this information to calculate the amount of money owed by the customer. It also uses this to modify the inventory list that is present. Finally, it correlates whether the number of items that have been removed from the shelves during the inspection and selection process is equal to the number of items that have been read into the system. All of these steps are indicated by the block 1260.

If the number of items that are read in does not equal the number of items that have been removed from the shelves, the program moves to a block 1262. Block 1262 prevents the user from releasing its legal liability for the contents of the cabinet. Moreover, the cabinet will not be electronically locked until the user has fed in all of the items that have been removed from the shelves. A visual display prompt is provided to the user. This display prompt can either be on the screen 214 or on the LCD display 216, or both.

In the event that a check of the number of items that have been read in equals the number of items that have been removed from the shelves, the CPU 204 then is allowed to lock the cabinet doors using the electronic locks 250, as indicated by a block 1264. At this time, the user is no longer legally liable for the contents of the cabinets which had previously been unlocked. Moreover, this completes the selection mode of operation of the present invention, as indicated by a block 1266.

Figure 13:
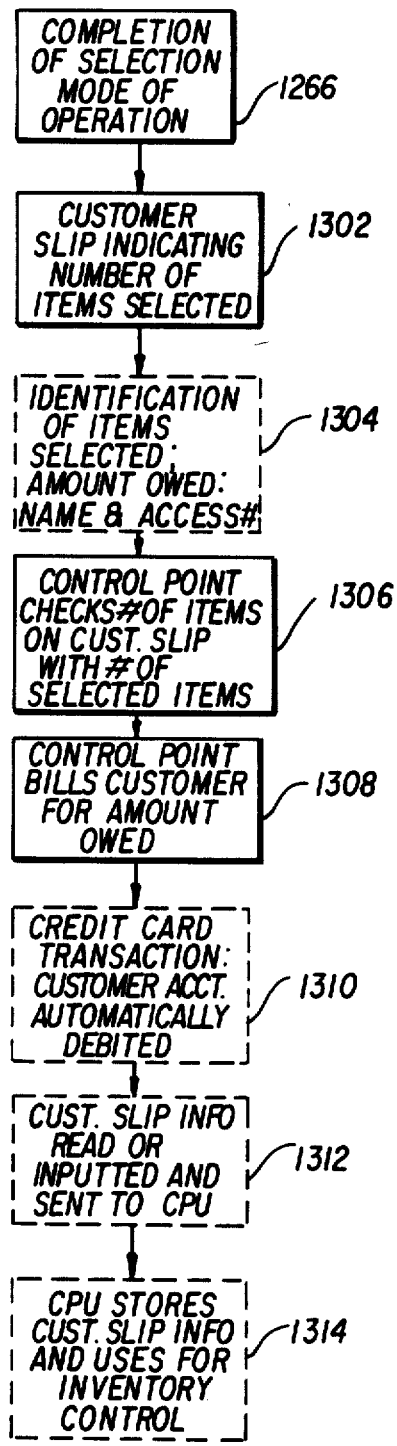
FIG. 13 is a flow chart of the basic steps taken by the system of the present invention during the customer slip portion of the transaction.

The preparation of the customer slip mode of operation is now described. Referring now to FIG. 13, which is a block diagram of the customer's slip mode of the present invention, the first step is step 1266, indicating the completion of the selection mode of operation. The CPU 204 then produces a customer slip indicating the number of items that have been obtained by the customer from the system, as indicated by a block 1302. This is the minimum amount of information that can be provided on the customer slip since the control point will need to know this information in order to allow the user to exit the supermarket.

However, as indicated by a dash block 1304, the present invention can also provide the additional information on the customer slip as follows: A description of the items that have been selected by the user; the amount owed by the customer for the items selected; or the name and identification number of the user.

At the control point, the customer presents the customer slip to the store employee for checking purposes. At a minimum, the store employee checks the number of items indicated on the customer slip with the number of controlled items that the customer has in his possession. Only if this check is positive, does the control point person allow the customer to pass, as indicated by block 1306. In a cash based transaction or where the payment by the customer occurs at the control point (or checkout counter), the store employee must also calculate the amount of money owed by the customer. As indicated by a block 1308, this can be accomplished either by providing this amount owed information on the customer slip, or by having the store employee calculate the amount owed at the checkout counter. In situations where particular items fall into particular price categories, the latter is not a problem. However, one of the capabilities of the present invention is to adjust the price of a particular item being purchased or leased depending on the time of day or the day of the week or the existence of a sale. Consequently, it is contemplated that the preferred mode will be to have the price information indicated on the customer slip.

The present invention also can accommodate a credit card system. Here, the system, as indicated by the dashed block 1310, automatically debits the customer's credit card account based on the amount owed for the particular transaction involved. This automatic debiting reduces the possibility that the customer will not pay at the control point (checkout counter). This also may be of an advantage in the situation where the party owning the system is separate from the party owning the supermarket, and the supermarket does not want to be financially responsible for collecting the money owed to the customer's slips, but only wants to be responsible for checking to make sure that the number of items removed from the store equals the number of items indicated on the customer's slip. In any event, the present invention can accommodate credit cards using the approach just indicated.

The present invention also includes a feedback loop from the control point (checkout counter) back to the system relating to the customer slips as follows. As indicated by a dash line block 1312, the checkout counter operator can input the information from the customer slip during the course of ringing up the customer's other transactions. Alternatively, this information can be read into a scanner (not shown), which provides this information through the CPU 204. In either situation, the customer slip information is sent back to the CPU 204. The CPU 204 then stores this information for record keeping purposes. It also utilizes this information to perform a check to complete the inventory control process, as indicated by a dashed line block 1314. In this way, an additional level of control is provided to the system of the present invention.

The return of rental units has been discussed above with respect to FIG. 1A. The same approach as outlined in FIG. 1A is utilized in this specific embodiment of the present invention used for renting movies and movie boxes.

Figure 14:
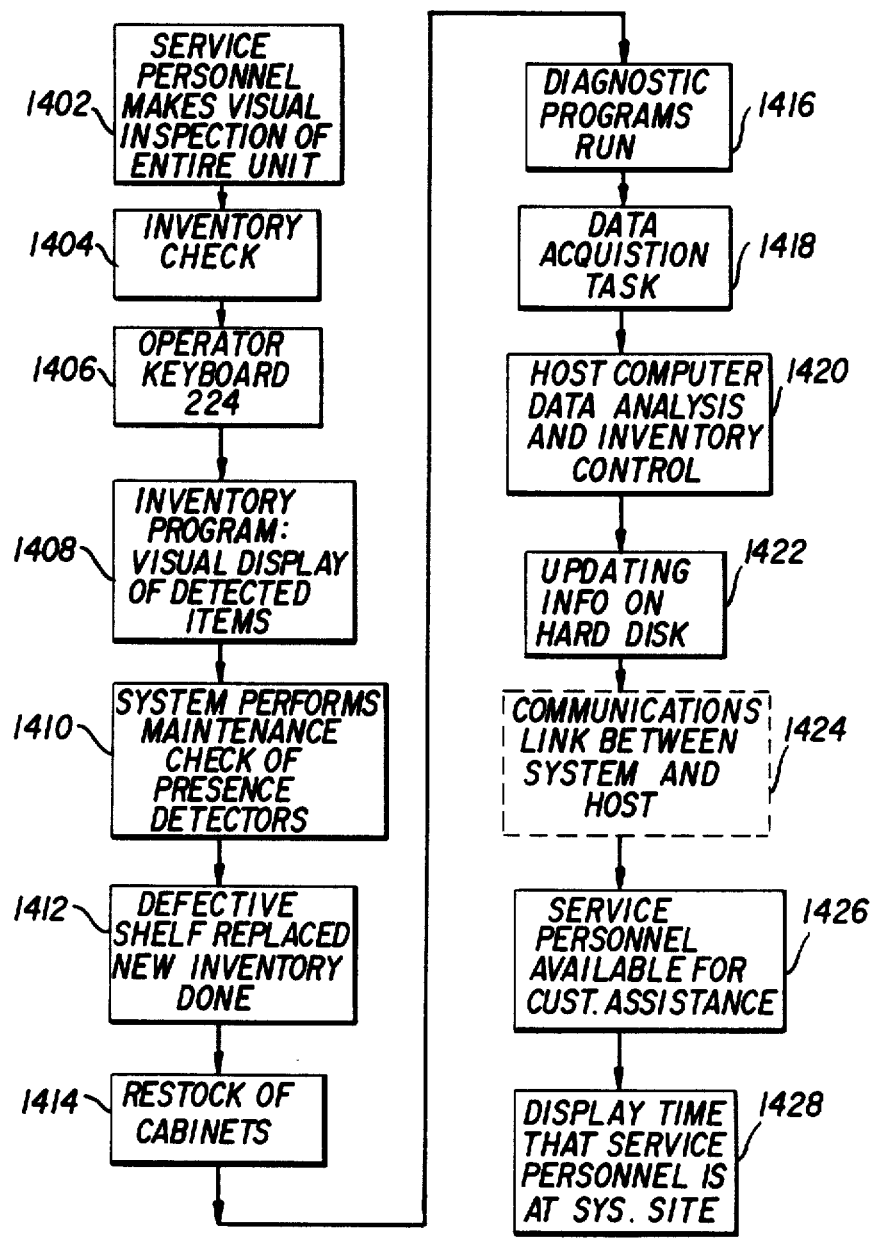
FIG. 14 is a flow chart of the basic steps taken by the system during an inventory procedure performed by the system personnel.

FIG. 14 shows in block diagram form various steps taken by the system personnel during their daily visit to the site of the system of the present invention. Referring now to FIG. 14, the system personnel visit the system on a periodic basis. In the case of the specific embodiment of the present invention used to rent movies, this usually occurs on a daily basis. Note that the customer is not allowed to gain access to the unit except when the store is open for business. Consequently, the service personnel do not have to visit the system on those days when the store is closed.

The first task of the system personnel is to perform a visual inspection of the entire system to make sure that there has been no damage to it and that everything appears to be in working order, as indicated by a block 1402. Thereafter, the service personnel can perform any one of the following functions. These functions are shown as occurring in a sequential order. Note, however, that the order in which they appear is purely for explanation purposes, and that these particular tasks can be reoriented depending on the given circumstances that the service personnel encounters.

First, as indicated by a block 1404, the service personnel performs an inventory check of the system. This inventory check involves requesting such an inventory check on the operator keyboard 224, as indicated by a block 1406. The CPU 204 then brings up an inventory control application subroutine which causes a display to be provided on the computer screen 214 indicating the shelf locations at which items are presently in place. The occupied positions are indicated by appropriate symbols, such as X, in a two dimensional pattern corresponding to the shelf locations in a given cabinet being inventoried.

As indicated by a block 1410, the service personnel then makes a visual correspondence between the units actually on the shelves in the given cabinet being inventoried and the check marks that are displayed on the computer screen 214. The service personnel is immediately able to tell which of the presence detectors is malfunctioning by determining the presence or absence of a unit on the two-dimensional display on computer screen 214 which is in disagreement with the presence or absence of a unit at the actual shelf location in question. This test is extremely important, since it insures that the inventory information being kept by the computer for a given time period is accurate. As noted above, the CPU 204 of the present invention is constantly keeping track of all of the changes or movements of items in the cases, along with all of the other aspects relating to the activities that occur in the system. If the CPU 204 is not provided with accurate information concerning the presence or absence of items at a particular shelf location, it is obvious that the information that is being stored by the CPU 204 does not accurately reflect what has occurred. This is why an inventory must be made on a daily basis since the data for the time period in question would be suspect if a longer inventory period was performed.

In the event that the service personnel detects that one of the presence detectors is malfunctioning (see also FIG. 17), he or she then removes the back of the cabinet in question. (The items from the particular shelf are then removed.) The computer keeps track of this removal. Thereafter, the shelf 1750 is removed. A new shelf 1750 is fitted into the cabinet. This modular construction is useful since it allows for the repair to actually occur back at the shop and not at the location where the system is located. It also decreases the amount of time required for such maintenance. After the shelf 1750 ("electro-plank") has been inserted and tested to be certain that it is functioning properly, thereafter, the computer can redo its inventory so as to update the present inventory that exists, as is indicated by a block 1412.

The service personnel performs each of these cabinet inventories on the cabinets that are present in the system. In addition, in a situation where the system is being used to sell as opposed to rent units, the service personnel can restock the unit and have the CPU redo its inventory for this restocking operation. This restocking step is indicated by a block 1414.

The service personnel then can perform diagnostics on the system by running a diagnostic program to determine if there are any other faults in the operation of the system. This diagnostic testing is indicated by a block 1416. The diagnostic programs can be written so as to interrogate the various control lines and busses in the system to determine whether accurate communications and control are occurring. It can also be used to interrogate any communications links that link the system of the present invention with the host terminal or with checkout terminals, or the like. What is important here is that the diagnostic programs can be used to assist the service personnel in performing various test functions.

After having performed the diagnostic programs as indicated by block 1416, the service personnel then must perform the data acquisition task as indicated by a block 1418. The data acquisition task involves having all of the data relating to the present day's transactions loaded onto the floppy disk contained in the floppy disk drive 208. The information loaded on this floppy disk can then be transported by the physical transport of the floppy disk magnetic media from the system to the host computer site or by sending the info along a telephone or computer link line (the computer can also be programmed to perform "unload" daily at a certain time automatically). The information stored on the floppy disk then is used at the host computer site as indicated by a block 1420, to update the information that is contained on the host computer (not shown). Information contained on the host computer can be used to perform statistical analysis of the trends that are occurring at the particular system in question. It can also be used for inventory control purposes, so that the service personnel will know what additional items should be taken out to the system during the next visit for inventory replenishment. In addition, it provides the mechanism whereby the service personnel can update the files contained on the hard disk 206. As has been discussed above, the information contained on the hard disk is an archival copy of all the transactions and all of the customer information and inventory information relating to that particular system. Hence the information relating to the customers is constantly changing, the floppy disk can be used as a data transmission mechanism so as to update customer information from the host computer to the hard disk 206 present at the system. Alternately, a communications link can be provided between the system and the host computer so as to *eliminate the need for the floppy disk drive* 208. The updating of the hard disk information using the floppy disk approach is indicated by a block 1422, whereas the use of a communications link between the system and the host computer is indicated by the dashed line block 1424. Another function of the service personnel is to provide instruction to potential customers relating to obtaining access cards to the system of the present invention. As indicated by a block 1426, the computer display 214 periodically and/or on request displays the time of day the system personnel will be present at the system to answer potential customer questions relating to obtaining access cards and to filling out membership applications. It should be understood that the potential customer also can fill out an application form and put it into the slot contained in the computer console when the service personnel is not present; however, in order to make the system as user friendly as possible, a particular time of day is set aside where the service personnel is available to assist the potential customer with filling out the application form and with teaching the potential customer how to operate the system. As indicated by a block 1428, the computer system also can have a program that can be accessed by the potential customer so that the potential customer can be provided with information relating to filling out the form and with relating to operation of the system. This sales program can be provided to the customer via the computer display or can be provided periodically over the television monitor so as to attract potential customers to become members of the system.

Figure 15:
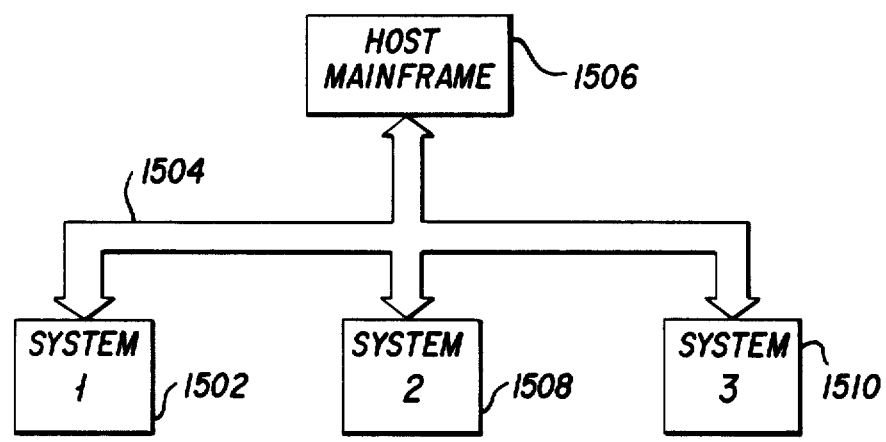
FIG. 15 shows a generalized block diagram of a networked version of the system and method of the present invention.

As stated previously, the system of the present invention can be connected to a host mainframe computer via a communications link. It can also be connected to other systems via a communications network. This is shown in diagrammatic form in FIG. 15. Referring to FIG. 15, a system 1 as indicated by reference numeral 1502 is connected via a common bus 1504 to a host mainframe computer 1506. A system 2 indicated by a reference numeral 1508 is also connected to the host mainframe computer 1506 via bus 1504. A system 3 designated by a reference numeral 1510 is also connected to the host mainframe computer 1506 via bus 1504. In this way, the host mainframe computer 1506 can communicate directly to each of the systems 1 through 3 in this network system. Moreover, in certain applications the systems can communicate with each other by the common bus 1504.

It should be understood that this networking arrangement contemplates the use of other types of networking approaches, such as star networks, circle networks, and tree networks. This allows the host mainframe computer 1506 to maintain a constant inventory of the activities that are occurring at the various systems 1502. If the customer wishes to receive automatic billing for the items that are purchased or sold, the host mainframe computer 1506 could also provide the billing capability. In this way, the credit card function could be integrated into the system of the present invention.

Figure 16:
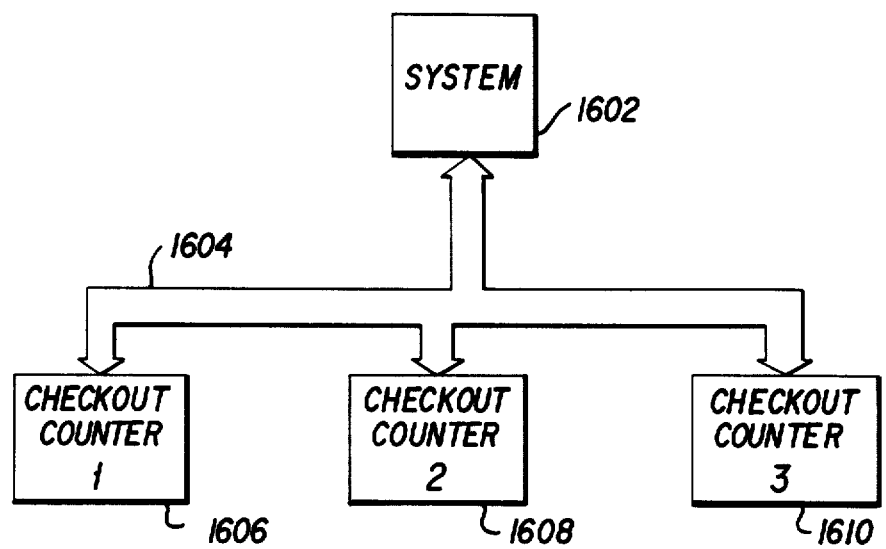
FIG. 16 is a block diagram of a variation of the present invention where the checkout counters are networked with the computer console of the present invention.

A system in a given store also can be networked with the various checkout counters so that the information relating to the customer slips can automatically be provided to the system for inventory and control purposes. Referring now to FIG. 16, such an arrangement is shown in block diagram form. A system designated by reference numeral 1602 is connected via a common bus 1604 to a plurality of checkout counters, comprising checkout counter 1, 2, and 3. Checkout counter 1 is indicated by a reference numeral 1606, checkout counter 2 by reference numeral 1608, and checkout terminal 3 by reference numeral 1610.

The checkout counters obtain the information contained on the customer slips that are turned in at their locations. This information can be batched (stored for transmission in a block format), or can be provided in a serial stream to the system 1602 over the bus 1604. Under either approach, system 1604 receives information indicative of the customer slips that are received at the control points and also receives additional information concerning the actual amount paid by the customer and the like. In this way, an added level of control is provided to the system of the present invention, since a customer who tries to avoid payment for an item selected will be detected. Note that under the present invention, such a customer would have his transaction indicated on the system. If the customer was able to return the tape without the checkout counter knowing, however, he may be able to avoid payment even though the system knew that he had actually removed the tape from the system. Thus, it may be possible for the customer to cheat the system, but it is impossible for the customer to steal any items from the system.

The system shown in FIG. 16 also could allow the system of the present invention to be electronically integrated into the electronic inventory control systems that are used in some supermarkets today. These electronic inventory control systems automatically allow the inventory of the store to be kept current based on the purchasing habits of the customers. It also allows the places for the given items on the shelves to be changed at the central computer site. This could allow the system of the present invention to be integrated into such systems through the use of such a networking approach.

Figure 17:
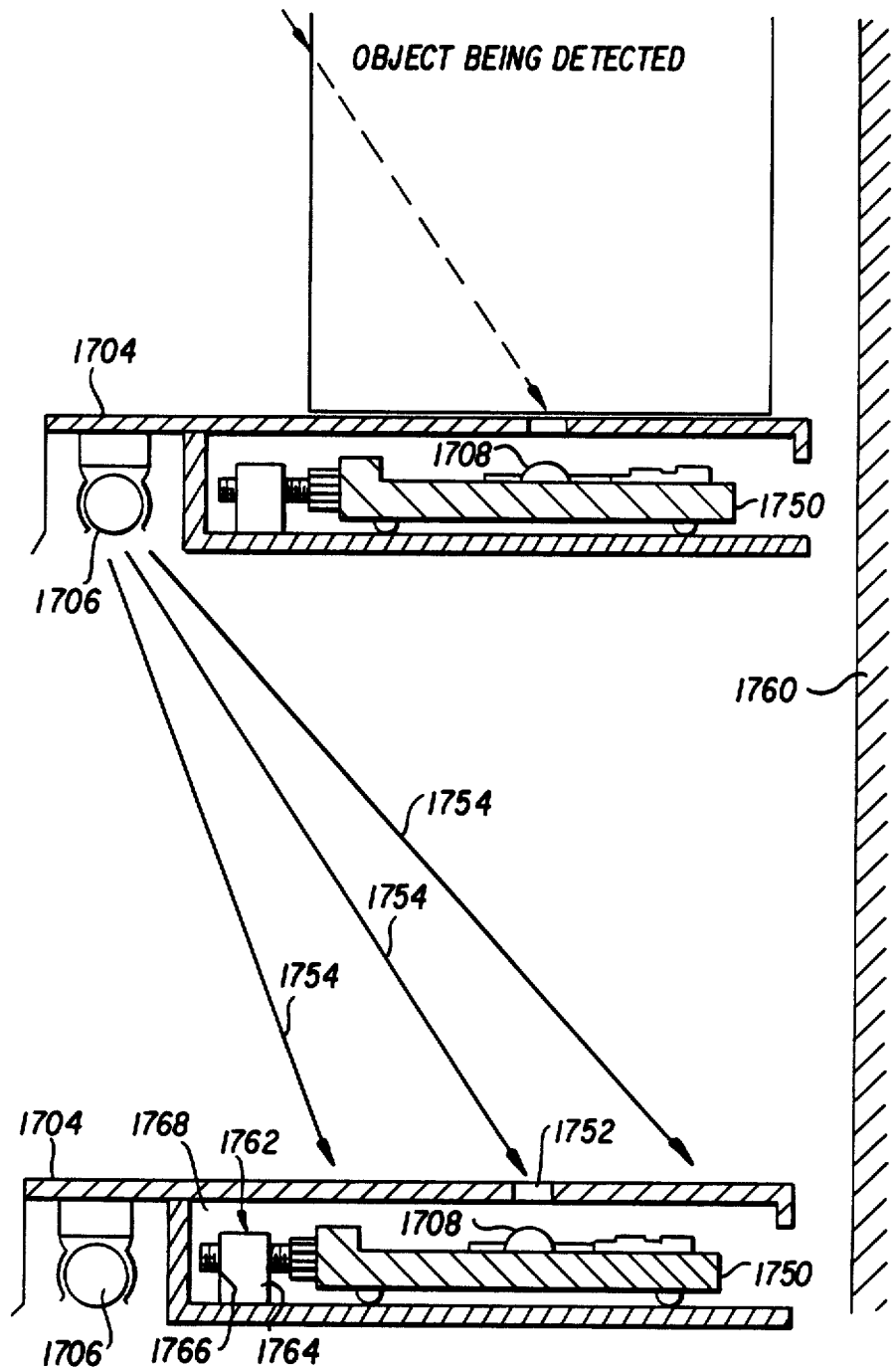
FIG. 17 is a side cross sectional view of a representative presence detector mechanism.

The presence detector that is used to determine whether an item is present or absent at a given shelf location is shown in one embodiment in FIG. 17. FIG. 17 is a side view of one of the shelf locations. As can be seen, an upper shelf 1704 has disposed on its lower surface an illumination lamp 1706. The illumination lamp 1706 typically is mounted so as to be not visible to the customer who is standing in front of the cabinet and who is selecting items from the cabinet. The purpose of the lamp 1706 is two-fold. First, it acts to illuminate the items that are in the cabinet. Second of all, it provides a source of light which is detected by an optical detector 1708 on a shelf 1750 that is positioned in the lower shelf 1706 in cavity 1768 in the "detecting" position so that optical detector 1708 is disposed below and properly registered with an opening 1752 for passing light energy.

The light rays 1754 from lamp 1706 are projected onto the lower shelf 1704. When an object whose presence is to be detected is not present at the shelf location defined by light opening 1752 and optical detector 1708, the light rays 1754 are not blocked by the object to be detected. Consequently, the light rays 1754 are allowed to pass through opening 1752 and illuminate optical detector 1708. The illumination drives optical detector 1706 to a first or "detection" state. However, it can be appreciated that the placement of an item at this shelf location on lower shelf 1704 blocks the light from the optical detector 1708. This blocking of the light results in a change of state of the output of the signal from the detector 1708 to the second or "absence" state. In this way, optical detection techniques are utilized in the present invention to detect the presence or absence of an item at a given shelf location.

Note that shelf 1750 having optical detector 1708 is removably disposed within lower shelf 1704. Shelf 1750 has disposed thereon (not shown in FIG. 17) corresponding optical detectors for the other shelf position locations of lower shelf 1704. For servicing, shelf 1750 is readily removable by the system personnel through the back door 1760 on the cabinet. A register assembly 1762 comprising an adjustable screw 1766 and a tapped post 1764 is provided in cavity 1768 so that shelf 1750 can be properly positioned so that optical detector 1708 is properly registered with respect to opening 1752

It should be understood, however, that the presence detector is not limited to an optical approach. Alternatively, a pressure or capacitance detector could be utilized. The pressure detector would detect the physical weight of the unit at the given shelf location. A capacitance detector, on the other hand, would detect the presence of the mass due to the change in the capacitance that would result. Capacitance detectors typically are utilized with elevators whereby the user need not have to press the button on the elevator in order for the elevator to detect the presence of the person's finger. Alternatively a "contact" activated microswitch could also be utilized, this microswitch becoming activated when an item is placed at, on, or in a predetermined area.

Moreover, a weight detector could be used to detect the presence of an object to be detected. It would perform the presence detection function. In addition, it would also detect whether an object whose presence is detected is of proper (within a defined weight range) weight. This is important since a cassette box without a cassette could be detected.

The presence detector could also incorporate an information reader which could read information off of the object whose presence is being detected. The information could be present on the object in any suitable way, such as barcode or holographic formats. In addition to detecting the presence of an object, the identity of the object could also be determined. This would allow the computer to provide an additional inventory check beyond mere presence detection. The identity information could be used for an suitable purpose.

II. Video Cassette and VCR Rental Embodiment

FIGS. 18 through 28 relate to a specific video cassette and VCR rental system and method embodiment of the present invention. These figures present specific aspects of this embodiment. Reference is also made to FIGS. 1 through 17. FIGS. 18 through 28 set out specific details and/or differences that are present in this embodiment as compared to that presented in the generalized system and method of the present invention disclosed with reference to FIGS. 1 through 17.

Figure 18:
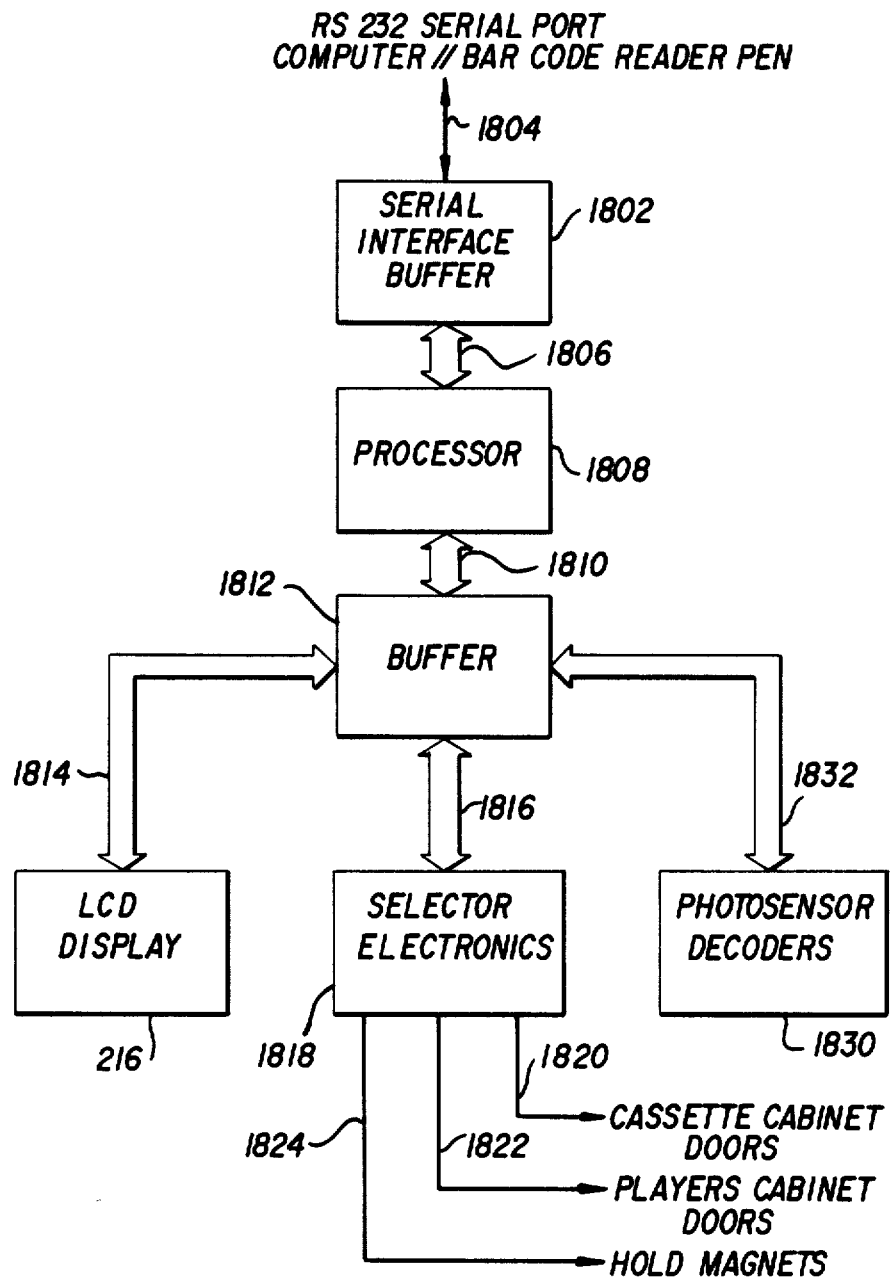
FIG. 18 is a general block diagram of an embodiment of the interface 248 of FIG. 2.

FIG. 18 is a general block diagram of the interface 248 of this embodiment. It should be understood that FIG. 18, in effect, sets out in more specific detail certain aspects of the interface 248 of the present invention shown in FIG. 2 and discussed above. The purpose of FIG. 18 is to illustrate these particular aspects of interface 248.

Referring now to FIG. 18, a serial interface buffer 1802 having a RS 232 format serial port 1804 is connected to CPU 204 and provides data on a bus 1806 to processor 1808. CPU 2304 sends commands and data to interface 248 and receives data from interface 248. The serial data on bus 1804 is buffered by the serial interface buffer 1802, and is provided on demand to processor 1808 via bus 1806. A bidirectional bus 1810 connects processor 1808 with a buffer 1812. Buffer 1812 acts to buffer data between processor 1808 and the input and output devices connected to buffer 1812. Specifically, buffer 1812 buffers data received from processor 1808 to be supplied via a bus 1814 to LCD display 216. Similarly, a bus 1816 supplies data from buffer 1812 to selector electronics 1818. Selector electronics stage 1818 is used for a plurality of control functions, such as locking the cassette cabinet doors via a bus 1820, locking the VCR or "movie machine" player cabinet doors via a bus 1822, or controlling via a bus 1824 the hold magnets or electromagnets used to keep the cabinet doors open when the customer has access to the contents of the cabinet (not shown).

Buffer stage 1812 also serves to buffer polling commands from processor 1808 being sent via a bus 1832 to the photosensor decoders 1830 (which polling provides presence data) in the various cabinet areas (see cabinet 204' of FIG. 2) that are inventoried by the present invention. Discussed above in connection with FIG. 17, the photosensor decoders 1830 at to determine the presence of an object (such as a cassette, VCR player, compact disk and the like) at a particular shelf location. This allows the present invention to conduct an inventory of the contents of each cabinet under its control.

Figure 19:
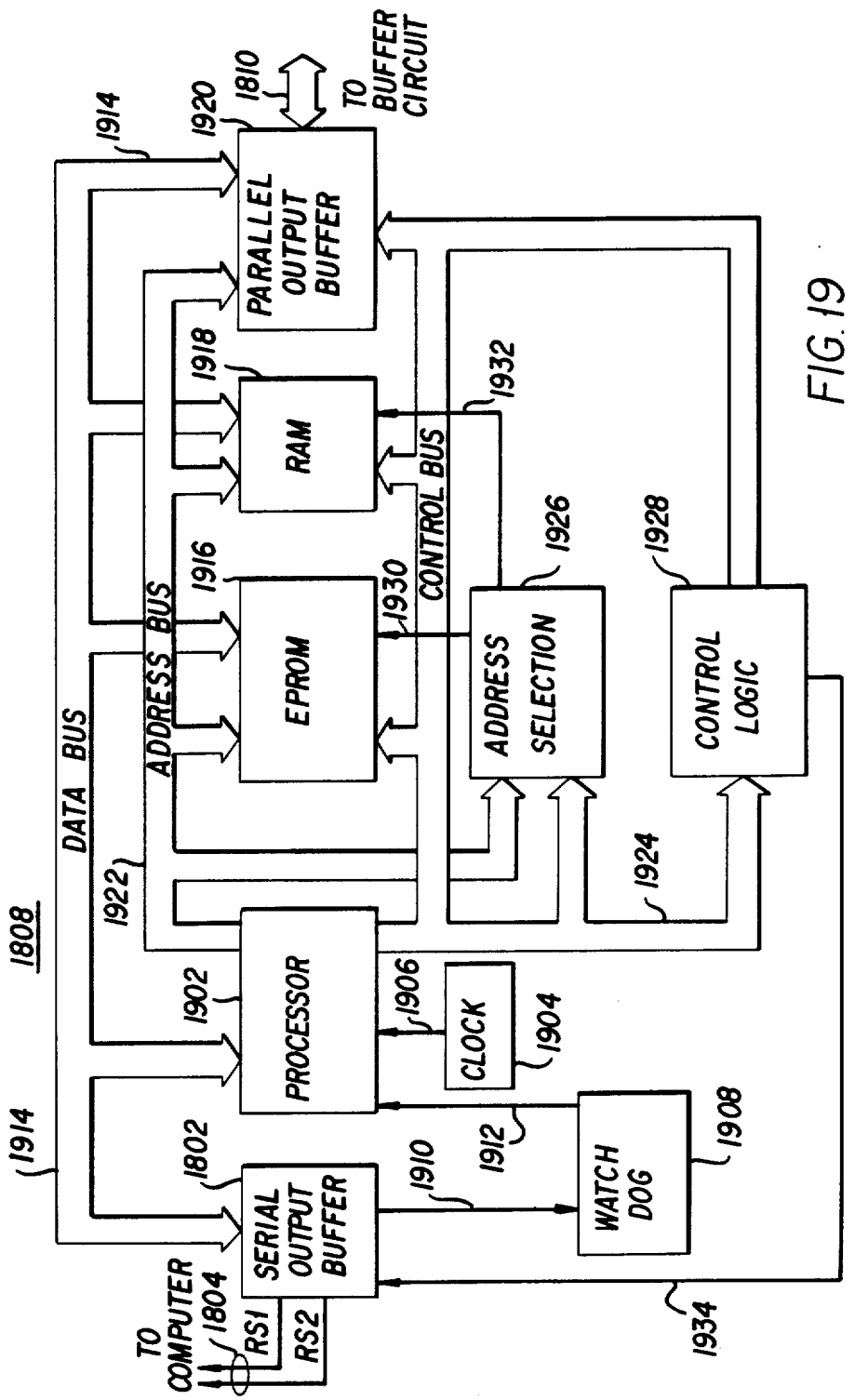
FIG. 19 is a more detailed block diagram of the serial interface buffer and processor of FIG. 18.

FIG. 19 shows a more detailed block diagram of the serial interface buffer 1802 and the processor 1808 of FIG. 18. As shown in FIG. 19, the serial output buffer 1802 is connected to two serial lines designated RS1 and RS2, which comprise the RS232 serial port 1804 of FIG. 18. The serial output buffer 1802 shown in FIG. 19 is the same as that shown in FIG. 18. Processor 1808 comprises all of the additional system components shown in FIG. 19.

Specifically, processor 1808 includes a processor 1902 which acts as the controller. A system clock 1804 provides via a line 1906 clock signals utilized by processor 1902 in its control functions. A watchdog stage 1908 is provided with status information via a line 1910 connected to the serial output buffer 1802. The watchdog stage 1908 in accordance with the status information that is received provides corresponding status information to processor 1902 via a line 1912. This status information allows the processor 1902 to know that it has received input data from the CPU 204 via the serial bus 1804. In this way, processor 1902 can obtain the input data buffered in serial output buffer 1802 via a data bus 1914. In addition, watchdog stage 1908 serves to reinitialize processor 1902 when data is not received from CPU 204 for a preselected amount of time. This insures that interface 248 does not get hung up due to electrical or atmospheric spikes or interference.

Data bus 1914 acts as the data highway for processor 1808. It is connected to the serial output buffer 1802, the processor 1902, an EPROM 1916, a RAM 1918, and a parallel output buffer 1920.

An address bus 1922 is provided. This address bus 1922 allows processor 1902 to provide specific address information to the EPROM 1916, RAM 1918, and the parallel output buffer 1920 so that specific data can be read from or read out to data bus 1808 upon command.

A control bus 1924 is also connected to the processor 1902. Control bus 1924 allows processor 1902 to control the operation of the other various stages which make up the processor 1808. Specifically, processor 1902 is connected via the control bus 1924 to an address selection stage 1926. In addition, processor 1902 is connected via the control bus 1924 to a control logic stage 1928. The address selection stage 1926 is connected via a control line 1930 to the EPROM 1916. Address selection stage 1926 is connected via a control line 1932 to the RAM 1918. The address selection stage 1926 in conjunction with the information provided by the processor on the control bus 1924 allow processor 1902 to control the operation of EPROM 1916, RAM 1918, and parallel output buffer 1920. Control logic 1928 via a control line 1934 connected to the serial output buffer 1802 allows processor 1902 to control the operation of the serial output buffer 1802.

The EPROM 1916 and the RAM 1918 allow the processor 1902 to operate under stored program control so as to produce specific data functions relating to the data received from the input devices so that the processor can provide desired data to the output devices that are present in this embodiment. The specific operation of processor 1902 is described in greater detail with respect to FIGS. 22-28.

The processor system 1808 is connected to the buffer stage 1812 via bus 1810. As shown in FIG. 19, bus 1810 is connected to parallel output buffer 1920. Parallel output buffer 1920 allows for buffering to take place between processor 1902 and buffer stage 1812.

Figure 20:
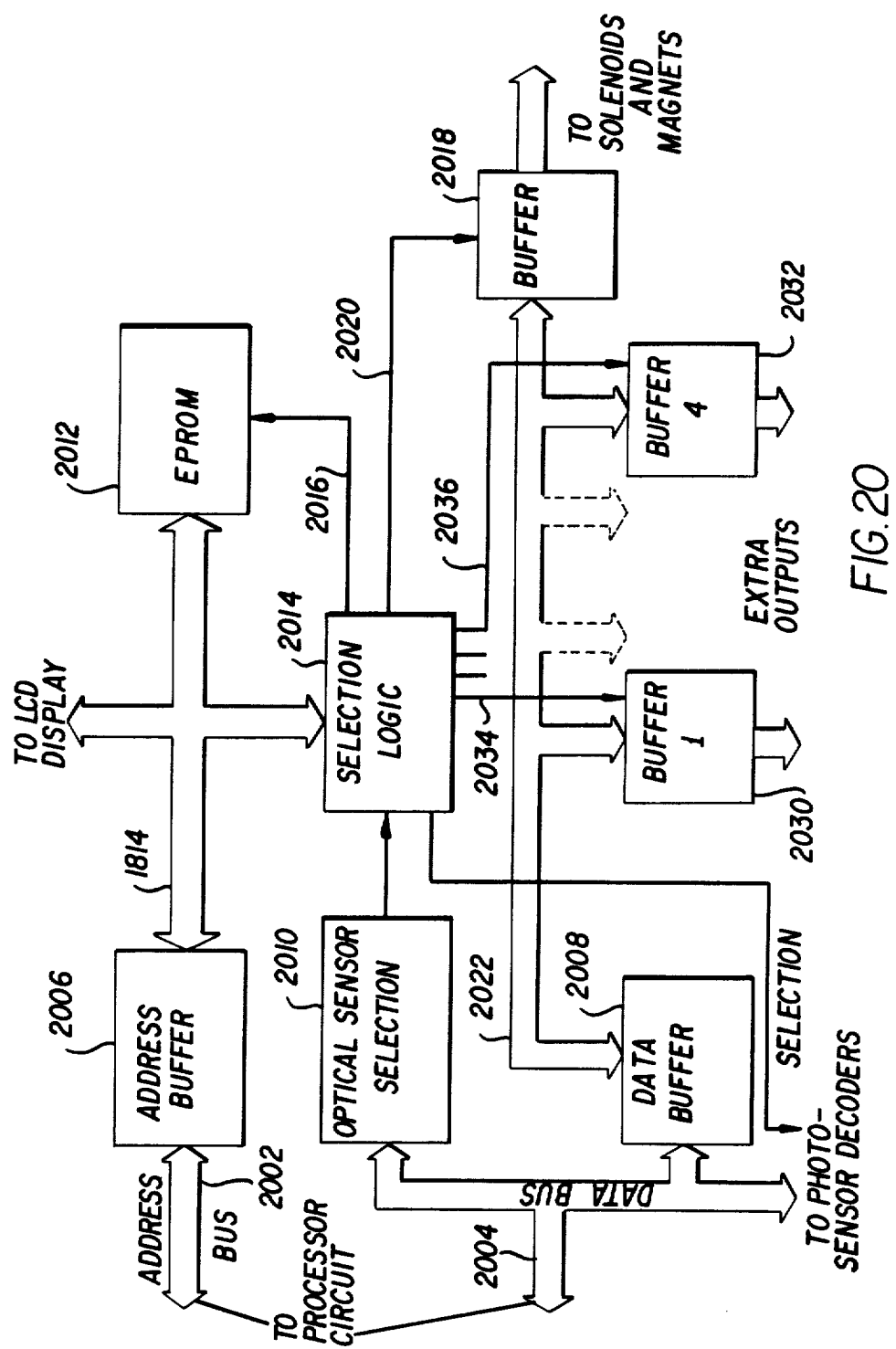
FIG. 20 is a more detailed block diagram of the buffer of FIG. 18.
Figure 21:
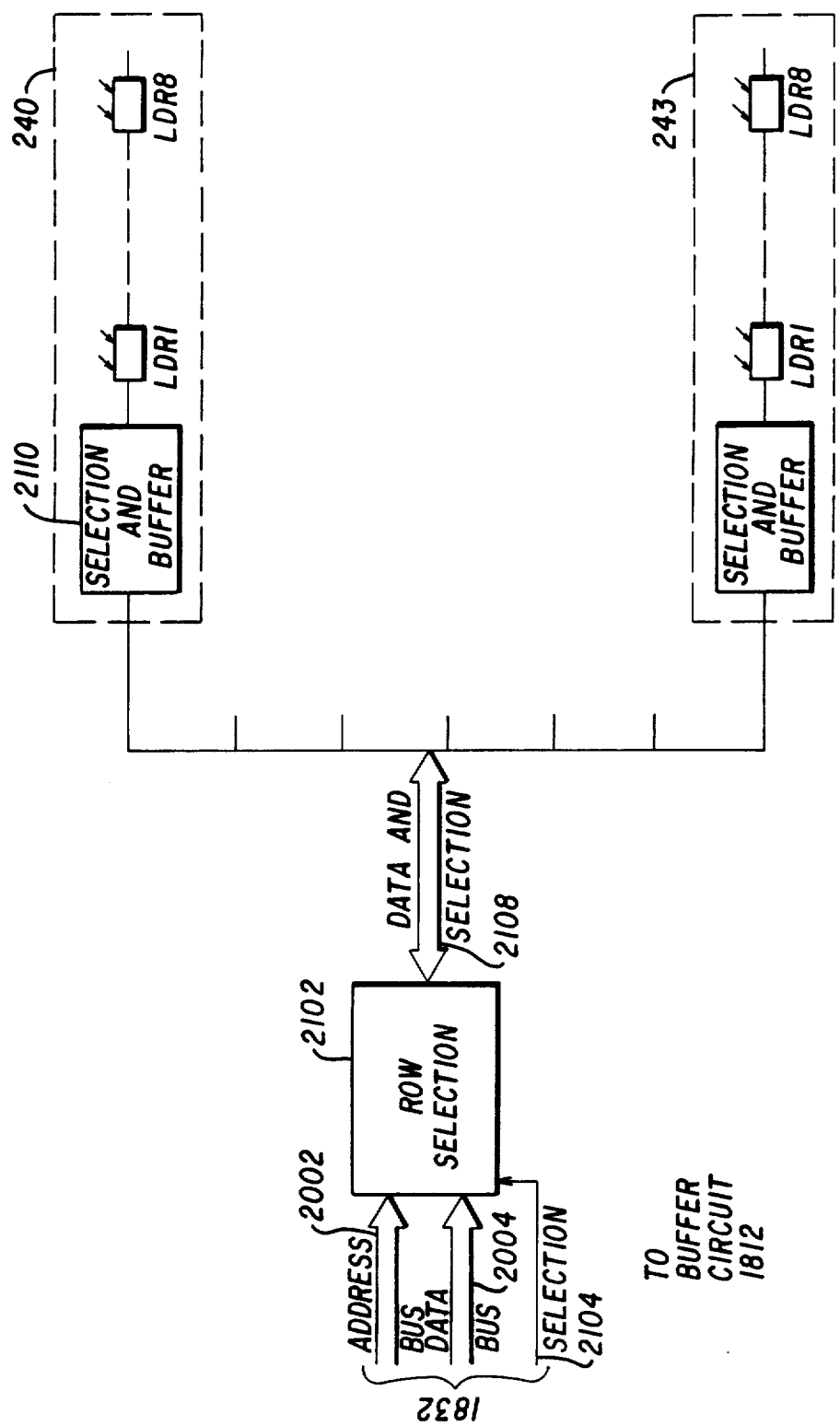
FIG. 21 is a more detailed block diagram of the photo sensor decoder stage of FIG. 18.

Referring now to FIG. 20, a more detailed block diagram of the buffer of FIG. 18 is shown. The selector electronic stage 1818 of FIG. 18 is also comprised in the embodiment shown in FIG. 20. Bus 1810 shown in FIG. 19 comprises an address bus 2002 and a data bus 2004 shown in FIG. 20. Address information is provided by parallel output buffer 1920 via address bus 2002 to an address buffer 2006. Data is provided by parallel output buffer 1920 via the data bus 2004 to a data buffer 2008 and to a print selection stage 2010 of FIG. 20. In this way, processor 1902 via parallel output buffer 1920 can control the various output devices and obtain data from the various input devices that are connected to the buffer 1812 shown in detail in FIG. 20.

Referring first to the LCD display 216, it is connected to bus 1814. As shown in FIG. 20, bus 1814 is connected to the address buffer 2006 for receiving address information from the processor 1902. Bus 1814 is also connected to a EPROM stage 2012. A selection logic stage 2014 is connected to bus 1814. Selection logic stage 2014 provides control or enable signals to the EPROM stage 2012 via a control line 2016. EPROM stage 2012 can store information that can be provided onto bus 1814 upon command.

Selection logic stage 2014 also controls the operation of other input and output devices in this embodiment. Specifically, the solenoids used to lock the cabinets (cassette and player, for example) and to control the hold magnets used to keep the unlocked doors in an open state are controlled by processor 1902 via selection stage 2014 and a buffer stage 2018. Buffer stage 2018 receives selection data from the selection logic stage 2014 via a control line 2020. Data from the processor 1808 is supplied via data bus 2004 to the data buffer 2008. This data is then supplied to the buffer 2018 via a bidirectional bus 2022. Buffer 2018 supplies this to the various solenoids and magnets (over busses 1820, 1822, and 1824, as shown in FIG. 18) under control of the selection logic stage 2014.

In order to allow the present invention to conduct an inventory of the various shelf locations in the cabinets under its control, data bus 2004 is connected to the photosensor decoders 1830 (not shown in FIG. 20). The operation of the photosensor decoders is described above in connection with FIG. 17. Data received from the photosensor decoders indicative of the presence of an object at a given shelf location can be stored in data buffer 2008 for later provision back to processor 1902. The data indicative of the presence of objects at specific shelf locations is provided back to processor 1902 via the data bus 2004.

Processor 1902 also must indicate when it wants to poll the optical sensors in a given cabinet. An optical sensor selection stage 2010 receives polling information from process 1902 indicating the sequence of shelves to be polled. Other outputs can also be connected to the buffer stage 1812 shown in FIG. 20. This is indicated by buffer 1 (denominated by reference numeral 2030) and buffer 4 denominated by reference numeral 2032. These two buffers are connected to bus 2022. Selection logic stage 2014 provides enable data via a line 2034 to buffer stage 1 and selection logic stage 2014 provides enable information via a line 2036 to buffer stage 4. In this way, selection logic stage 2014 can control the outputting of data stored in buffer 1 or buffer 4 to specific devices connected to these buffers (not shown). In addition, any other type of desired output device could be connected. It also should be understood that these buffers could be made bidirectional so that the present invention on a batch basis could receive information from sources external to it.

A more detailed block diagram of the photosensor decoder stage 1830 of FIG. 18 is shown in FIG. 22. Referring to FIG. 22, address bus 2002 and data bus 2004 is connected to a row selection stage 2102. In addition, a selection line 2104 which is part of bus 1832 allows the buffer stage 1812 to control the data inputting and outputting functions.

Row selection stage 2102 is connected to the various shelves 240-243 (shown as representative examples). The row selection stage 2102 allows the processor 1808 to poll the various shelf locations to determine the presence of objects thereat. This polling operation is accomplished on a row-by-row basis. Distributed processing is accomplished for each shelf as follows.

Referring to the representative example for shelf 240, a selection and buffer stage 2110 is connected via a data and selection bus 2108 to the row selection stage 2102. Each of the various optical detectors (designated LDR1 to LDR8) for determining the presence of an object at a given shelf location is connected in serial fashion to the selection and buffer stage 2110. The selection and buffer stage 2110 polls each of these locations in a serial fashion so that the presence or absence of an object at a given shelf location can be determined. This location or presence information is then supplied by the selection and buffer stage 2110 to the row selection stage 2102 upon command.

Each of the shelves in the cabinets being controlled by the present invention have a selection and buffer stage 2110 and associated detectors (LDR1-LDR8). Note that any number of shelf locations can be accommodated by the present invention. Eight are shown only for purposes of illustration.

Note selection stage 2102 therefore polls in a serial fashion each of the shelves in the cabinet. The various shelves have obtained data indicative of the presence or absence of objects at given shelf locations for that shelf. This distributed approach allows the presence information to be provided to the processor 1808 in an ordered fashion that does not tie up processor 1808 during its other processing tasks.

Figure 22A:
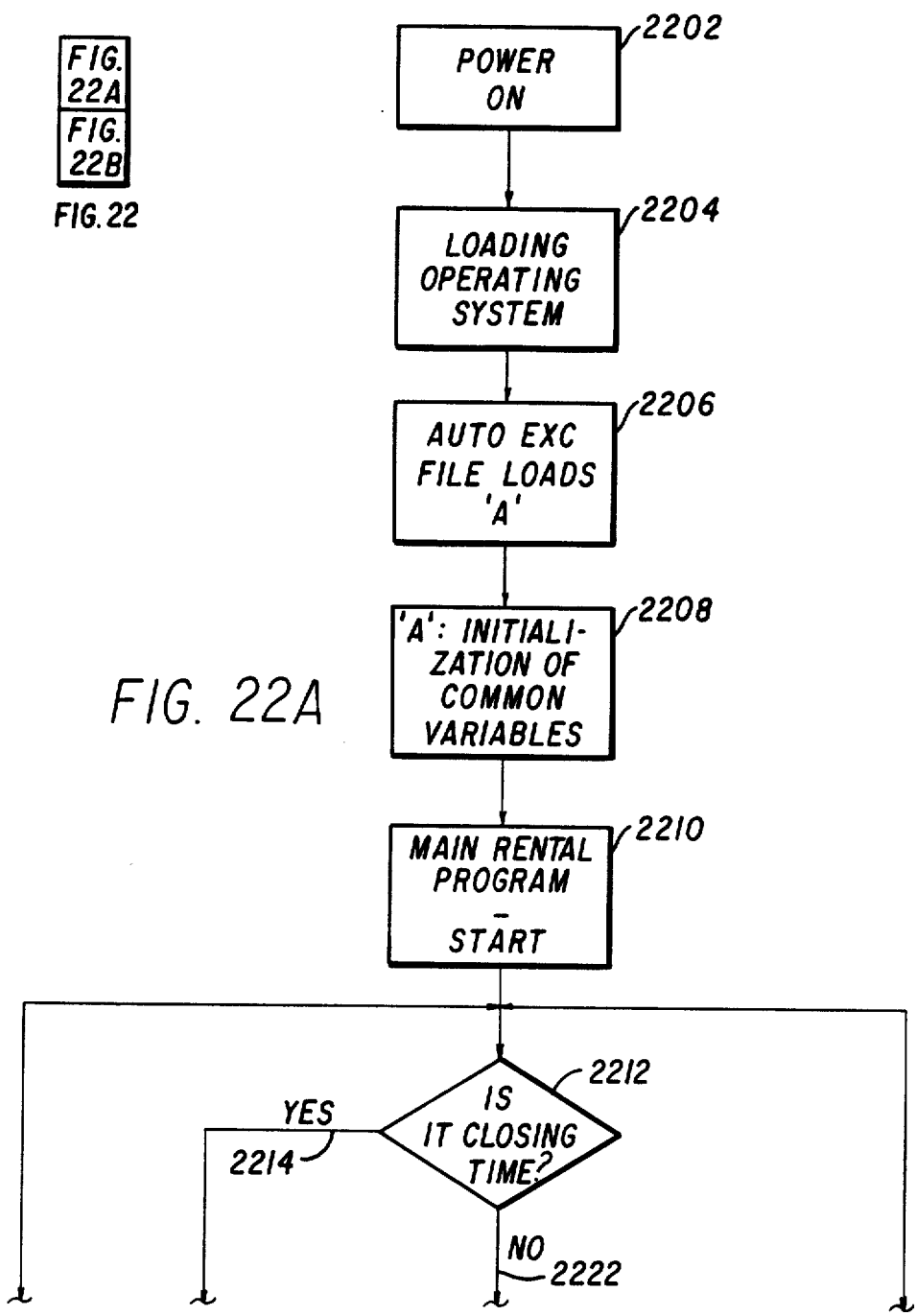
FIG. 22 (comprising FIGS. 22A and 22B) is a flow chart of the system program of a preferred embodiment of the present invention.
Figure 22B:
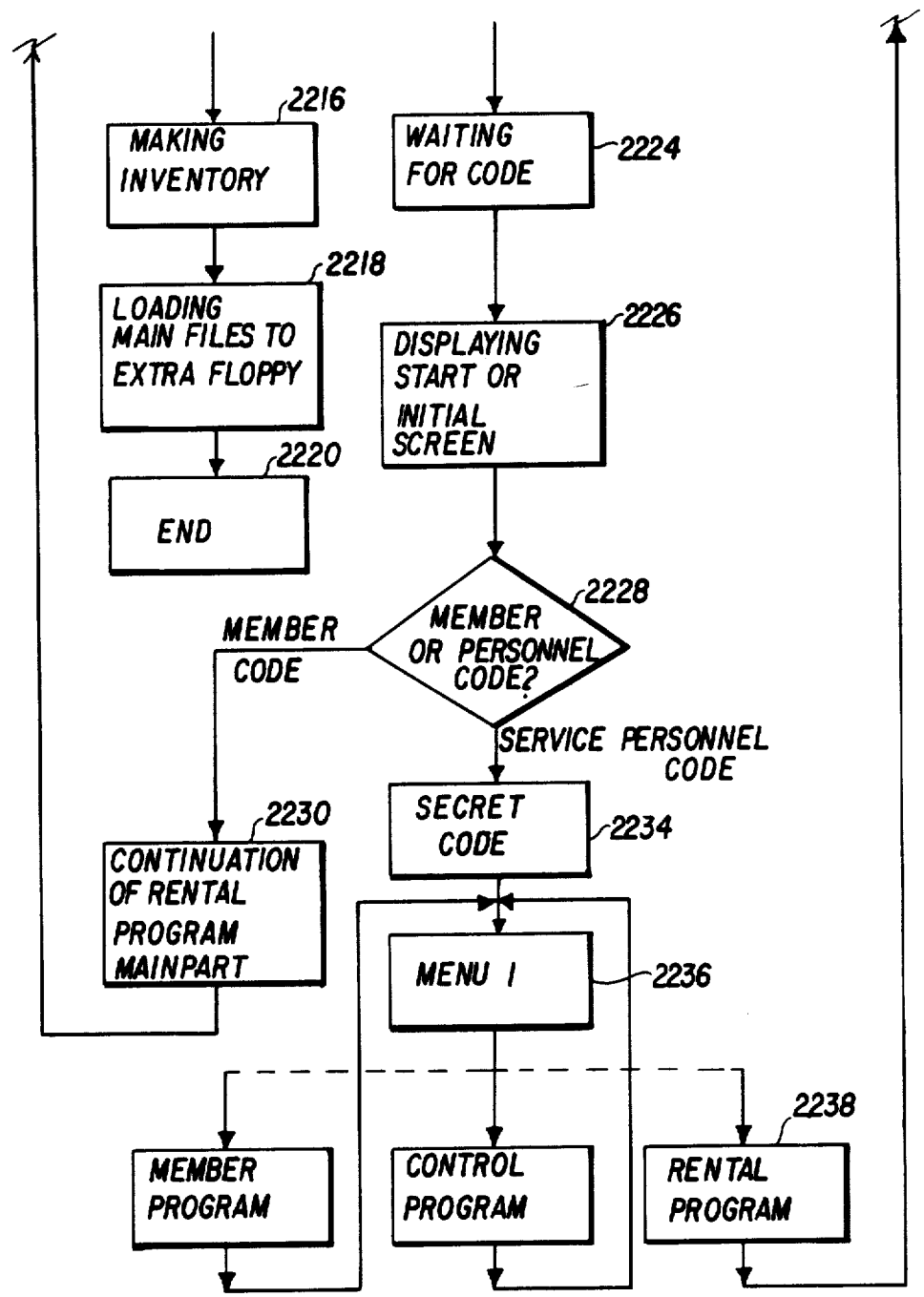

The system program utilized by the main CPU 204 is shown in block diagram form in FIGS. 22A and 22B. Operation begins with the power being turned on, as indicated by a block diagram 2202. Power can be turned on either by a switch connected to the power distribution system of the store or other location where the present invention is located. Alternately, a timing device can be used to automatically turn on the present invention at a given time of day. Such a timing device (not shown) can be programmed so as to turn on the present invention at a given time of day, such as right before the opening of the supermarket in which the present invention is located. In this way, the present invention can be only made to operate during the hours that the supermarket is open to the public or is in the restocking phase.

After the power has been turned on, the CPU 204 is booted by loading the operating system, as indicated by a block 2204. The operating system can be stored on the hard disk 206 or on a floppy disk (not shown) if desired. In this embodiment, the MS-DOS operating system is used. However, it should be understood that other suitable operating systems can be employed.

The file "autoexec.bat." contained on the hard disk automatically loads all of the system parameters needed for the two serial ports, the computer screen, and the keyboard connected to CPU 204. This loading of the "autoexec.bat." file is indicated by a block 2206.

Initialization of the common variables used in all of the other programs is then performed next, as indicated by a block 2208. The "A" is such an initialization program. It loads into memory the common arrays of variables used in all of the other programs. This allows all of the other programs to be executed upon command.

The main rental program is then loaded into memory, as indicated by a block 2210. The main rental program is then started to be run, as indicated by block 2210. The first task to be performed is to determine whether the closing time of the location in which the present invention is located has passed. This is indicated by a decision block 2212. If the closing time is determined to have passed, as indicated by the YES decision line 2214, the main program performs an inventory of the system, as indicated by a block 2216. Note that the computer has its own battery-backed up clock. This allows the computer to determine the actual time of day when the main rental program is loaded into memory. In this way, the computer can determine whether the closing time has occurred.

After the inventory has been completed, as indicated by block 2216, the computer transfers the necessary main files to the extra floppy disk 208 (not shown), as indicated by a block 2218. This backs up the inventory that was taken on a given day. After the main files have been loaded to the extra floppy disk, the main rental program is completed, as indicated by the END block 2220. The system then returns to the operating system.

If decision block 2212, however, indicates that closing time has not passed, the NO line 2222 starts to wait for a barcode input from the customer or service personnel indicating a desired function, as indicated by a block 2224. Two types of barcode inputs can be provided for step 2224. The first is that the code can be that of a customer membership card. The other is that the code can be a special code indicating that the system or service personnel want o instruct the system to leave the main rental program so that specific inventory and other control functions can be performed, as discussed below.

After the barcode of either type has been detected by step 2224, a start or initial screen is displayed on computer screen 214 as indicated by a block 2226. This start or initial screen provides to the user specific information. The main rental program then determines whether the barcode that has been read in in step 2224 is that of a customer membership card or is the special code received from the system personnel. This detection is indicated by the detection block 2228.

Figure 23:
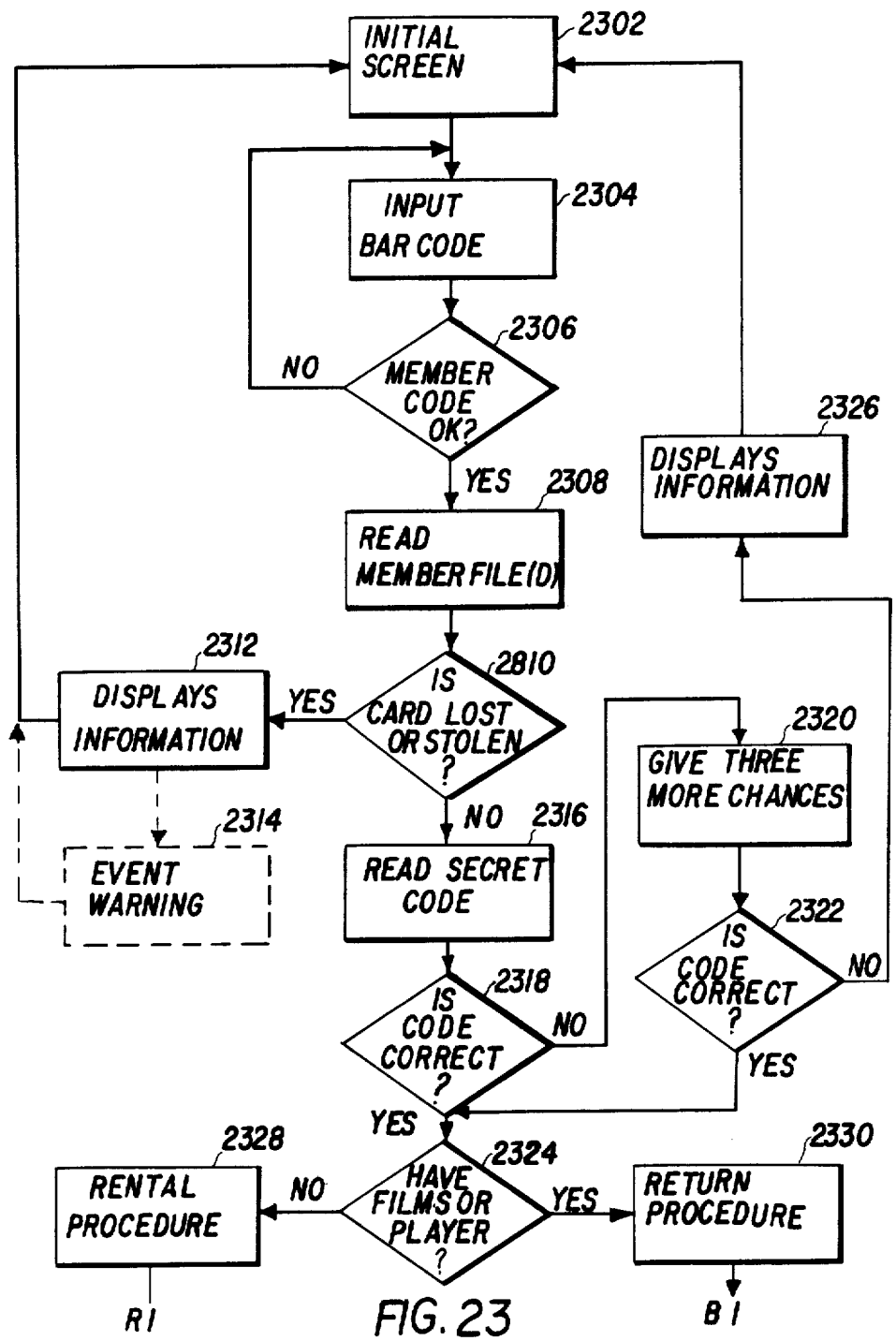
FIG. 23 is a flow chart of the main rental program of a preferred embodiment of the present invention.

If detection block 2228 indicates that a member code has been received, the program then proceeds to the main rental program of FIG. 23, as indicated by a block 2230.

The service personnel have keys which allow access to the operator keyboard 224. To gain control of the system, the service personnel reads in a bar code contained on the operator keyboard 224. As indicated by a block 2232, the service personnel must then read in a secret code. If the secret code is determined to be correct, the program then displays a MENU 1 on the computer screen 214. This MENU 1 allows the system personnel to select from one of the following programs: a MEMBER program which allows new members to be registered on the system; a CONTROL program, which allows the system personnel to check the various aspects of the system, including the display cabinets, the presence detector devices, and the like, and to return to the RENTAL program. The MEMBER and the CONTROL programs will be discussed below with respect to FIGS. 27 and 28, respectively. The RENTAL program option allows the service personnel to return to the main rental program, as indicated by a block 2238.

The main rental program is shown in flow chart form in FIG. 22. The main rental program is called up by step 2230 of the main rental program 2210 of FIGS. 22A and 22B.

Referring now to FIG. 23, the system first displays an initial screen, as indicated by a block 2302. The initial screen invites a potential customer to become a member of the system, or allows a present customer to read in the barcode information contained on his or her membership card. The initial screen also can provide to the potential customer and the present customer hints concerning the use of the input device. This is useful when the input device is a barcode pen or barcode scanner whose operation may not be totally familiar to a potential or present customer.

The customer then inputs barcode information, as indicated by a block 2304. A decision block 2306 then determines whether the barcode information that has been read in in block or step 204 corresponds to a proper membership code. If the answer to this inquiry is NO, decision block 2306 returns the program to block 2304 so that the customer can read in the barcode information again. This allows for the system to accommodate errors that may occur in the reading in given barcode information.

When the barcode information is entered in by the customer, an audio indicator of proper operation can be provided. This typically can be a beep, which indicates to the customer that the barcode information has been read in. The computer receives the entered barcode information which is decoded and transferred through the serial port (not shown). The barcode information on the membership card contains various types of information used by the system. Specifically, it can include district information indicating in which district the machine that the customer is authorized to use is located. In situations where there are many machines in a given city or other geographic entity, districts are needed in order to accommodate the number of machines that could be present utilizing the particular number of pieces of information present on a membership card.

The membership card code also can contain a serial number of the particular machine to which the customer has subscribed. After the serial number of the particular machine, comes the member number (for example a number from 0 to 9999) which is a unique number assigned to a particular customer.

The computer first checks to determine if the district and machine code are proper. If they are not, a message is displayed on the screen, and the system allows the customer to read in barcode information again. After a certain number of tries (not shown) the system resets.

If the district and machine codes are proper, the membership file for the particular membership code is brought up into memory, as indicated by a block 2308. The computer then determines whether the particular membership card is lost or stolen. This is provided by the use of special "flags" in certain fields contained in the member file that is brought up. If these flags are present in certain fields, the computer knows that the card is lost or stolen. This is indicated by the YES path of a decision block 2310. If YES path is followed, the program causes a display to be provided to the customer on computer screen 214. The program then displays on computer screen 214 a message informing the customer of whether the card is lost or stolen, and inviting the customer to deposit the lost o stolen card into the machine mailbox contained in the door of the computer console. The display of the lost or stolen information is indicated by a block 2312.

Optionally, an event warning can be provided by the main rental program. Such an event warning is indicated by the dashed line block 2314. In the case where a card is stolen, for example, the program can cause the event warning to be a flashing light or a sound alarm which can be turned on. Alternately, the customer can be videotaped, with or without his or her knowledge. The event warning can be provided at the checkout counter or in the manager's office so as to allow store personnel to take appropriate action.

After the lost or stolen information is displayed on the computer screen 214, and the optional event warning has occurred, the main rental program returns to the initial screen, as indicated by block 2302.

Referring again to decision block 2310, the computer also can check to determine if the customer had caused excessive damage to the cassettes or cassette players during his or her previous rental transaction. Since the system knows of all of the previous transactions, it can determine whether a particular customer has caused excessive damage to a particular cassette or cassette player. If such damage has occurred, this can be stored in the member file so that the program can require the customer to pay these costs before being allowed to use the system for future rental transactions (not shown). In this way, the present invention can prevent an undesirable customer from being able to take repeated advantage of the system before being required to pay for such damage.

If decision block 2315 determines that the card is neither lost nor stolen, as indicated by path NO, it prompts the customer on the computer screen 214 to read in his or her secret membership code, as indicated by a block 2316. Typically, the customer's secret code or personal identification number (PIN) comprises three figures. The secret code can be read in using the input device (such as the barcode pen or barcode scanner 210) or via the keypad 212. The actual secret code that is read in is not displayed on the computer screen 214. However, XXX or other suitable indication can be provided so as to provide the customer with feedback about whether the proper number of digits have been read in. It is important that the secret code or PIN is not displayed so as to prevent onlookers from being able to obtain the code that would allow them to gain unauthorized access to the system if they could gain possession of the membership card.

A decision block 2318 then determines whether the proper secret code has been inputted by the customer. In the situation where decision block 2318 determines that a secret code is improper, as indicated by the path NO, the customer is given three more chances to read in the proper secret code, as indicated by a block 2320. Three chances are given since many customers have difficulty remembering the proper secret code and must be allowed to try more than one time in order for the necessary consumer satisfaction to result. Each time the customer reads in a new secret code, a decision block 2322 determines whether it is correct. If it is correct, as indicated by the YES path, the program proceeds to a decision block 2324, discussed below. However, if the secret code is not correct, as indicated by the NO path, the program proceeds to a display information block 2326. Block 2326 causes a message to be displayed on computer screen 214 informing the customer that he is not allowed to continue to use the machine and must consult with the system personnel or others at the store. The program then resets so that the initial screen is then put up on the computer screen 214. This path of the program thus prevents a customer from being able to tie up the system if he or she is unable to provide the proper secret code within three tries.

In the situation where a proper secret code is read in within the three try period, the program then proceeds to the decision block 2324. Decision block 2324 determines whether the customer has any outstanding cassettes (films) or cassette players outstanding from previous rental transactions. If the answer to this inquiry is NO, the customer is then allowed to proceed to the rental procedure, as indicated by a block 2328. The rental procedure is described below with respect to FIGS. 25A and 25B.

If decision block 2324 determines that the customer has some outstanding cassettes or cassette players from the previous rental transaction, he or she is not allowed to rent new cassettes or cassette players until the previous cassettes or cassette players have been returned. Moreover, if there are outstanding cassettes or cassette players from the previous rental transaction, the program causes the return procedure, as indicated by a block 2330, to be called up. The return procedure program is described in connection with FIGS. 24A and 24B.

Note that the program is written so that if the customer leaves the system for more than a predescribed amount of time (such as 30 seconds) without inputting required information or performing a required step, the program is caused to reset. This resetting prevents a customer from taking too much time in the use of the system. This results in additional customer satisfaction since the machine is made available to more customers for rental or return procedures.

Figure 24B:
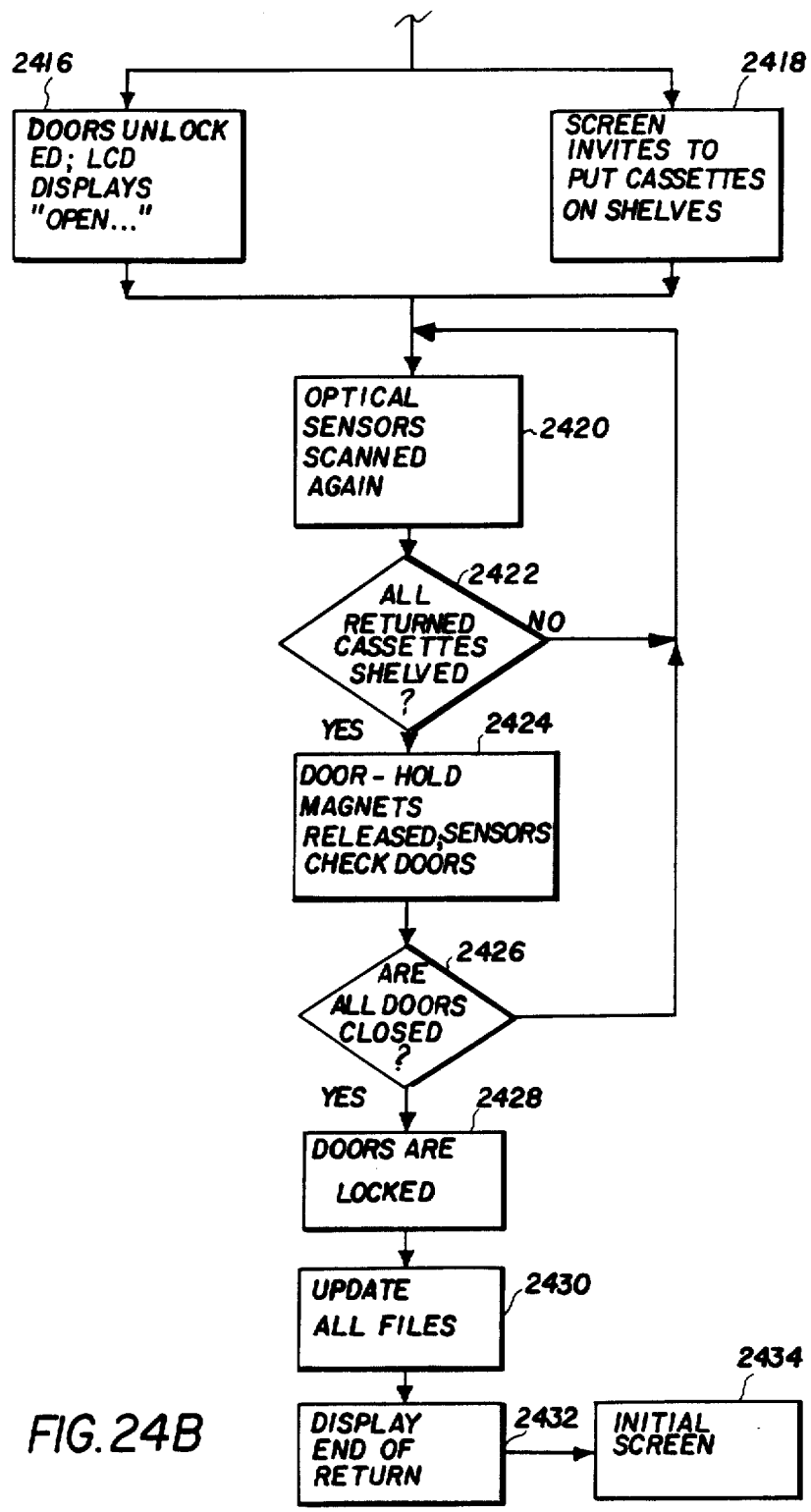
FIG. 24 (comprising FIGS. 24A and 24B) is a flow chart of the return procedure program of the main rental program of FIG. 23.

FIG. 24, comprising FIGS. 24A and 24B, is a flow chart of the return procedure program 2330 of the main rental program 2230 of FIG. 23. Referring now to FIG. 24A, if the customer is returning cassettes, computer screen 214 lists all of the cassettes that the customer had rented in the previous rental transaction, along with the expected return date/hour. This is indicated by a block 2402.

The screen also invites the customer to read in the barcode information contained on all of the cassettes that he or she is returning, as indicated by a block 2404. This reading in step provides the computer with the information relating to the items being returned so that a proper inventory check can be performed and so that the customer records can be updated. As each barcode is read in, the particular cassette title of the returned item is caused to be erased from the screen and to be replaced by the statement "returned" along with an indication of whether the particular rented item was returned on time or was returned late, whereby a late penalty is due. If the barcode information for the same cassette is read in twice by the customer, the program ignores the second barcode information. If the barcode of a cassette other than one that is to be returned is read in by the customer, the program refuses to accept the barcode. The return transactions which are displayed on the computer screen 214 are indicated by a block 2406.

A decision block 2408 then determines whether the customer has returned all of the cassettes that were rented in the previous rental transaction. If the decision block 2408 determines that the customer has not returned all of the cassettes previously rented, the customer is allowed to end the return procedure by inputting a special barcode, as indicated by a block 2410. The provision of this special barcode which allows the customer to terminate the return transaction where less than all of the rented items are returned means that a customer can return various rented items at different times and dates. This provides additional flexibility in the operation of the system and produces additional customer satisfaction. Oftentimes, a customer wishes to return one of the items that was rented in a single rental transaction before returning the other items. The use of the special barcode allows the present invention to accommodate such customer wishes.

After the special barcode has been inputted by the customer, the computer program causes the computer screen 214 to provide to the user a listing of the cassettes that have not been returned. This display is indicated by a block 2412. It provides feedback to the customer so that he or she will know the other cassettes that have not yet been returned.

The program now moves on to block 2414. The optical sensors for the various shelves in the cabinets are scanned by the computer to determine how many films are present at the given shelf locations. If more sophisticated detectors are used which allow the actual barcodes of the cassettes to be read, the computer can also perform a more detailed inventory step (not shown). In either case, at this stage in the program the system takes an inventory to determine where the cassettes are located on the shelves.

Referring now to FIG. 24B, the doors of the particular cabinets in question are unlocked, as indicated by a block 2416. Note that in the example presently being described, only the doors for the cabinets having cassette shelves would be unlocked since the customer would only be returning cassettes. In the situation where the customer is returning a VCR player, the doors for the VCR player cabinets would be unlocked in lieu of the doors for the cassette cabinets.

In addition to unlocking the doors of the particular cabinets in question, the program also in parallel presents to the customer on computer screen 214 an invitation to return the cassettes to open locations on the shelves, as indicated by a block 2418. Note that in block 2416 that is run in parallel with block 2418 the program can also cause the doors of the cabinets which have been unlocked to be maintained in the open position by activating electromagnets which cause the doors to be held open (not shown).

After the doors have been unlocked and the customer has been invited to return the cassettes to the open locations on the shelves, the system again scans the optical sensors to determine the location of all open positions on the shelves, as indicated by a block 2420. This scanning usually can be performed continuously during the return process so that the computer will know when all of the cassettes have been returned and will not require the customer to input a particular instruction indicating that all cassettes have been returned. When the number of cassettes that have been returned corresponds to the number of cassettes that the program knows the customer needs to return, as determined by a decision block 2422, the program proceeds to a block 2424. Block 2424 causes the hold magnets which are keeping the doors open to be released so that the customer can close the doors completely. The sensor constantly monitor whether the doors have been completely closed and whether the number of cassettes on the shelves remains constant. This prevents the customer from taking cassettes off the shelves during this door closing process. After the doors are all closed, as indicated by a decision block 2426 and the number of cassettes on the shelves remains at the proper number, the doors are locked, as indicated by a block 2428. The locking of the doors is also indicated to the user on the LCD display 216 (not shown). All of the files on the hard disk 206 and the floppy disk 208 are now adjusted or updated, as indicated by a block 2430, the customer is then provided on computer screen 214 with a display indicating that the return procedure was successful and thanking the customer for the return transaction, as indicated by a block 2432. The program then returns to the initial screen, as indicated by a block 2434.

Note that if the customer has returned films past the return date, the penalty that is imposed is automatically calculated by the program and put in the customer file. If the customer then moves to the rental mode, this penalty fee is added to the bill placed on the customer slip for this next rental. If the customer only returns cassettes, the penalty fee is stored so that the customer can be billed for the penalty in the next rental transaction.

Figure 25B:
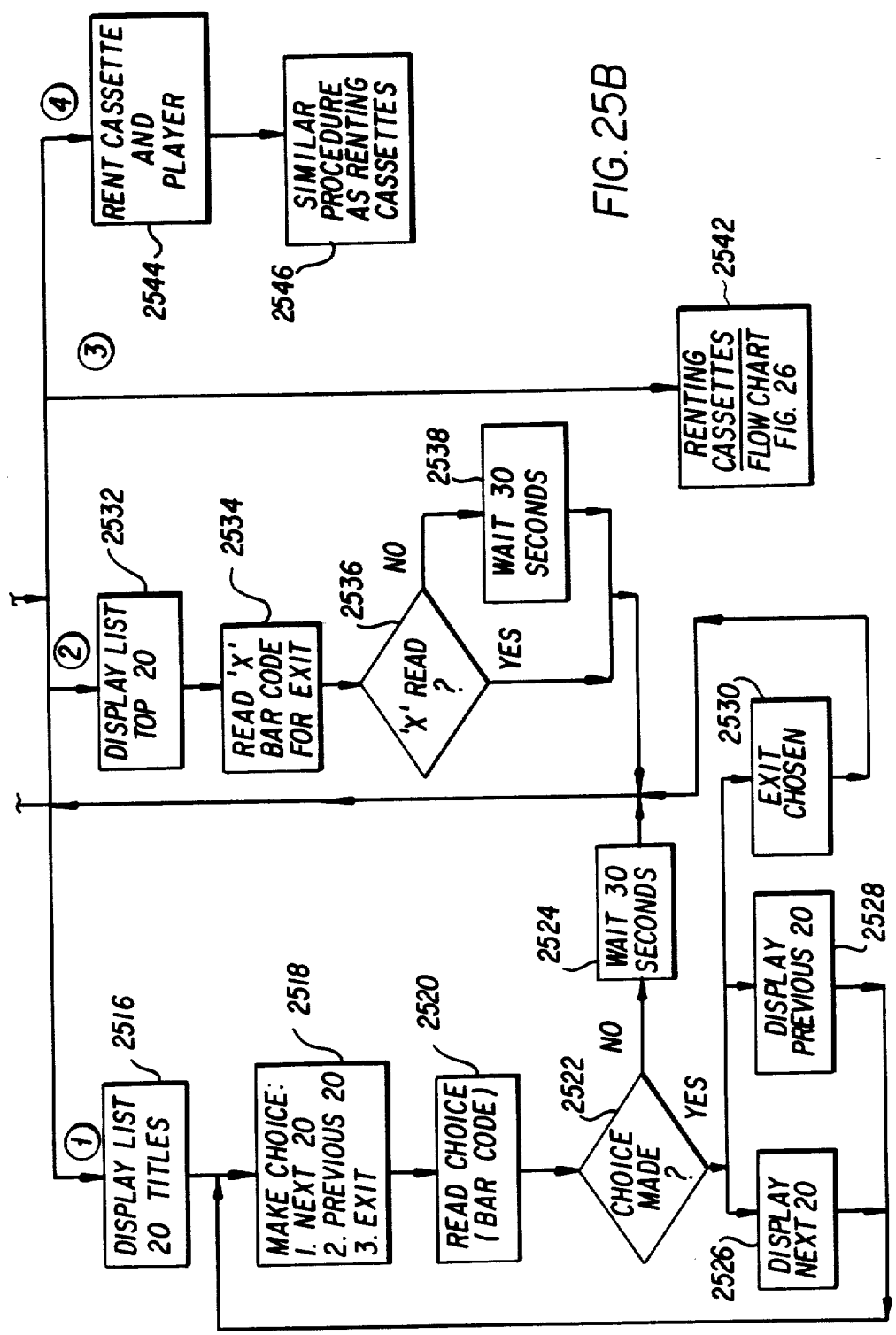
FIG. 25 (comprising FIGS. 25A and 25B) is a flow chart of the rental procedure program of the main rental program of FIG. 23

FIG. 25, comprising FIGS. 25A and 25B, is a flow chart of the rental procedure program 2328 of the main rental program 2230 of FIG. 23. Referring now to FIG. 25A, the customer is provided with a display on computer screen 214 listing showing all the cassettes that have been returned, and any late fees or penalties that will be added to the rental total bill caused by late returns of previously rented cassettes. These penalty fees will be added to the rental sum that will be tabulated at the end of this rental transaction. This is indicated by a block 2502.

The computer screen 214 also displays a menu having four choices, as indicated by a block 2504. The choices are as follows:

1. List of all of the films actually available in the movie machine;
2. List of the top 20 films;
3. Rent cassettes; and
4. Rent cassettes and cassette players.

In order for the customer to make a choice, the corresponding barcode must be read in by the customer indicating which of the four choices has been selected, as indicated by a block 2506.

The customer must make a selection from the menu of block 2504 within a given time period. As indicated, a decision block 2508 determines whether a choice has been made by the customer by inputting a barcode indicating which of the four menus in block 2504 has been selected. If no choice has been made, as indicated by the NO path, a block 2510 times out for a predetermined amount of time, such as 30 seconds. If a choice has been made within the 30 second time period, the program moves to the YES path as indicated by the dashed line. However, if no choice has been made (no action taken) within the preselected time period, the program provides the user with a warning indication, as indicated by a block 2512. The indication can be of any suitable type, such as a warning on the LCD 216 display or a flashing light or the like. The customer must then take action within the time frame specified by block 2512 (for example, 10 seconds). If a choice is made by the customer within the warning time period, the program moves to the YES path, as indicated by the dashed line. However, if no action is taken within the warning time period, the program terminates and returns to the initial display.

The objective of this predetermined time period is to require the user to make a decision within a preselected period of time or lose control of the system. In this way, other customers are not prevented access to the machine by a customer who is not utilizing the machine in a prompt enough manner.

Referring now to FIG. 25B, the first choice on the menu of block 2504 is for the machine to list all of the films that are actually available to the customer in the particular movie machine. Since the machine utilizes a modular approach, it can accommodate a certain minimum number (for example, 188 cassettes) and up to a theoretically unlimited number of films through the use of additional modular cabinets which are controlled by the computer console. When the customer selects this first choice, a subroutine starts by displaying to the customer on the computer screen 214 the first 20 films in the current film inventory in the machine, as indicated by a block 2516. The information presented to the customer with respect to these 20 films can include such items as the title, the main actor(s), the producer, awards presented to the film, etc. In other words, it can provide a very useful source of information to the customer in a very "user friendly" manner. A customer then has a menu presented to him or her which allows for three courses of action to be taken: display of the next 20 titles on the inventory list, display of the previous 20 titles on the inventory list, or exit from the subroutine, as indicated by a block 2518. The user indicates which of these three menu selections is desired by reading in an appropriate bar code indicator, as represented by a block 2520. A decision block 2522 determines whether the choice has been made by the customer. Again, a certain amount of time is programmed into the selection process wherein the user must make a choice, as indicated by a block 2524. If the customer does not make a selection from the menu shown in block 2518 within the preselected time period (such as 30 seconds, as shown within block 2524), the program returns to the main menu of block 2504.

If the user does make a choice within the preselected time period, the program proceeds via the YES path. Based on the choice made, the program displays the next 20 titles as indicated by a block 2526, displays the previous 20 titles as indicated by a block 2528, or exits to the main menu of block 2504 as indicated by a block 2530.

If the user selects a choice of displaying the next 20 titles or the previous 20 titles, the program moves back to block 2518 after these titles have been displayed. Thereafter, the customer can decide whether to exit the program, or to have other titles in the master inventory list presented on the computer screen 214. It can be appreciated, that this inventory capability is extremely usable to the customer, since it provides the customer with a current list of available cassettes that can be rented. The inventory is constantly being updated as previously rented items are returned during the rental process, as discussed above in connection with FIGS. 24A and 24B. This particular aspect of the present invention significantly improves the customer reaction to the embodiment.

The second option available to the customer on the main menu of block 2504 is the display of a list of the top 20 films. When the customer makes this second selection, the list of the top 20 films is displayed on the computer screen 214 as indicated by a block 2532. Certain films can be designated by the system personnel as "top films". This can be based on consumer rental habits on the particular movie machine in question, or can be based on a larger statistical sample, such as the rental habits throughout the entire movie machine system. Alternatively, it can be based on other consumer indicators, such as attendance in movie theaters or the like. What is important here is that the customer can be presented with a list of films which are ranked according to consumer rental or attendance data.

In addition to displaying the selected number of "top films" on the computer screen 214, the list can also include additional data, such as whether the particular film is presently in the movie machine and is available for rental. Optionally, and especially in larger systems employing several cabinets, an additional high-speed printer (not shown) can be provided. The high-speed printer will allow the customer to print out the list of the top 10 movies for later use.

When the user wishes to execute this subroutine, he or she indicates such by reading in a designated character (such as "X") using the barcode reader, as indicated by a block 2534. A decision block 2536 determines whether the appropriate character or indicator has been read in by the customer. If no such character is detected, the program times out for a preselected amount of time (such as 30 seconds), as indicated by a block 2538. This time out period allows the customer a certain amount of time to examine the particular list of movies that is displayed. Once the time out has occurred, or decision block 2536 has detected the proper character, the program returns to the main menu of block 2504, allowing the customer to proceed with another selection.

The third option available to the customer on the main menu of block 2504 is that of being able to rent cassettes. This rental program is described in connection with the flow chart of FIGS. 26A and 26B, discussed below. This renting cassette program, FIGS. 26A and 26B is indicated by a block 2542.

A fourth option available to the customer is that of being able to rent a cassette and a cassette player, as indicated by a block 2544. Here, the customer is also allowed to rent the cassette player that will be used to play the cassette or cassettes that are rented. In many situations, the customer will want to rent a cassette player in addition to the cassette since he or she may not own one or one may not be available for the particular display application involved. The present invention can accommodate such a rental transaction. Note that the rental transaction involving cassettes and cassette players is very similar to that utilized with renting cassettes only, as indicated by a block 2546. For purposes of brevity, only the program relating to the renting of cassettes is discussed in detail. It should be understood that the addition of a cassette player does not depart in concept from that shown with respect to the cassette rental program of block 2542.

Figure 26A:
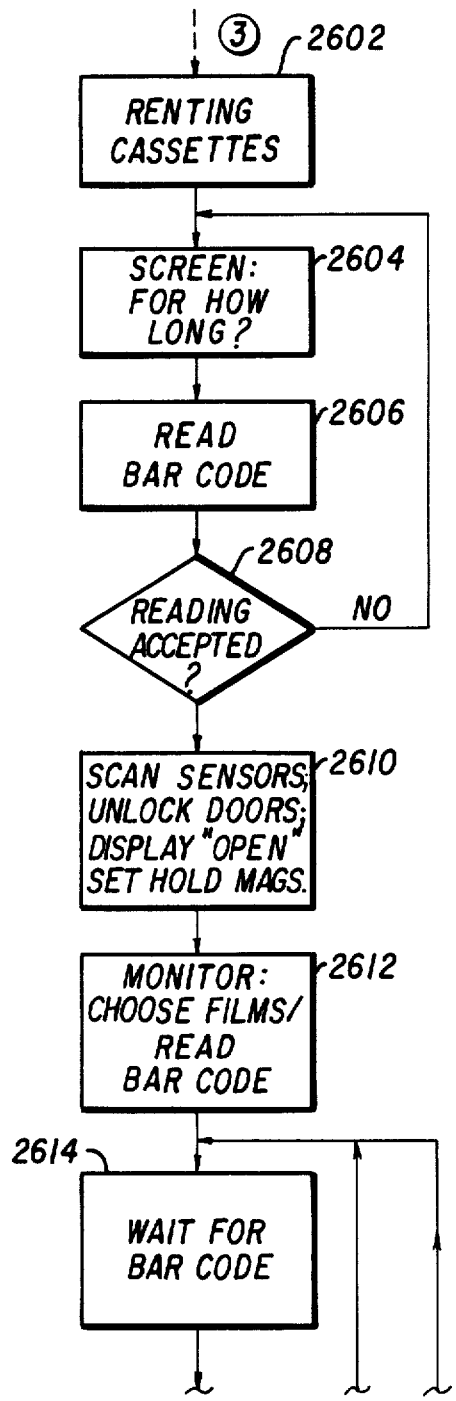
FIG. 26 (comprising FIGS. 26A and 26B) is a flow chart of the renting cassettes program of the rental procedure program of FIG. 25.
Figure 26B:
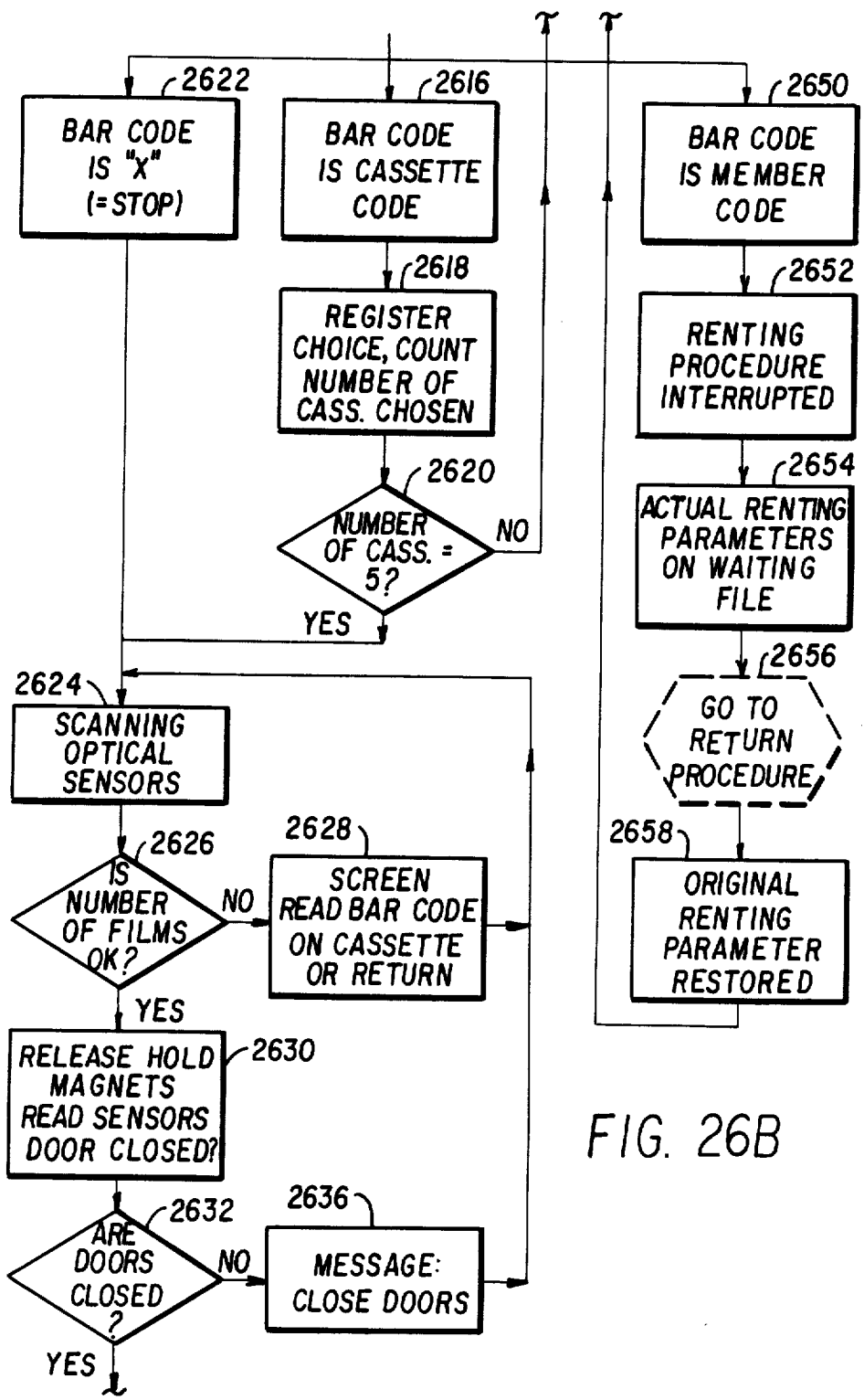
Figure 26C:
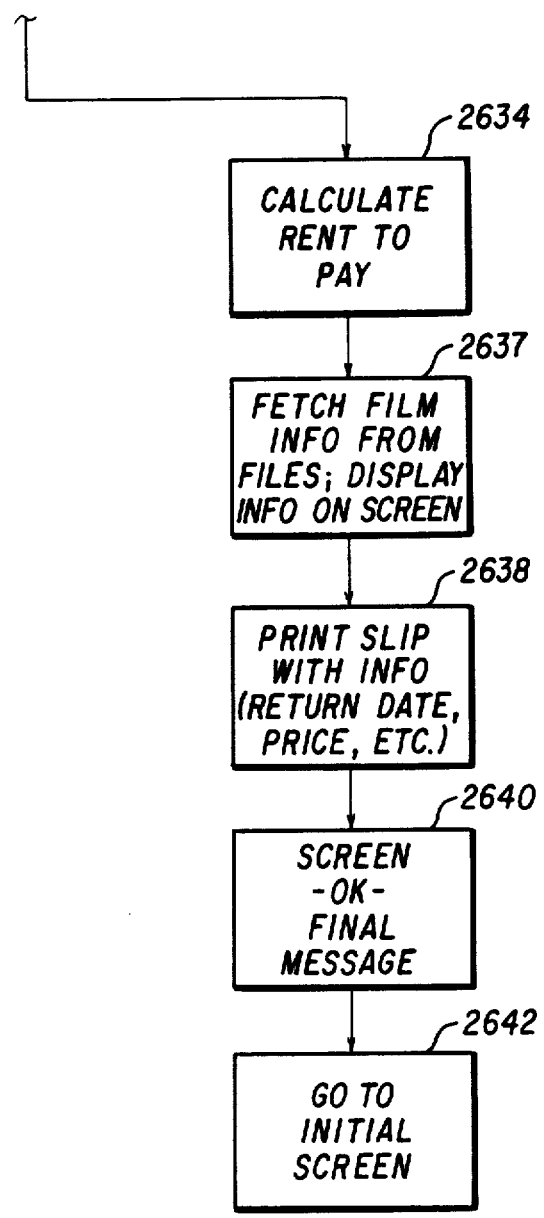

FIG. 26, comprising FIGS. 26A and 26B, is a flow chart of the renting cassette program 2542 of the rental procedure program 2328 of FIGS. 25A and 25B. Referring now to FIG. 26A, when the customer has chosen option 3 of the menu of block 2504, as indicated by a block 2602, the computer causes a message to be displayed to the customer on computer screen 214. This message asks the customer for "how many days" the customer wishes to rent the cassettes to be rented, as indicated by a block 2604. The program can be set so that there is a maximum renting time that the customer can select (not shown). In addition, certain categories can be designated based on holidays and other marketing factors, such as discounts for certain prescribed numbers of days during the week.

The customer then indicates to the system how long he or she wishes to rent the cassette. This is done by inputting a proper barcode into the system, as indicated by a block 2606. A decision block 2608 determines whether a proper barcode has been read in by the customer. If an improper barcode has been selected, for whatever reason, the program via the NO path proceeds back to block 2604 so that the customer can select the number of days again. The program also is set up so that if an acceptable barcode is not read within a preselected amount of time (such as, 30 seconds), the program automatically loops back to block 2604.

If the decision block 2608 determines that an acceptable barcode has been read in by the customer, the procedure begins which allows the customer access to the contents of the locked cabinet, as indicated by a block 2610. Specifically, the first step in this unlocking process is for the computer to scan all of the shelf position sensors to inventory the location of the various items contained in the locked cabinet. This information is provided to the storage devices for record keeping purposes and for later use. Thereafter, as shown in block 2610, the system unlocks the doors of the cabinets that the customer will be provided access to during the rental step. After the doors have been unlocked, the LCD display 216 for the appropriate cabinets displays an appropriate legend or indicator, such as "open", which provides the customer with an indication that he or she can proceed with opening the doors of the cabinet. The use of the LCD display 216 is important since one does not want customers trying to open the doors of the cabinet before they have been unlocked, since damage could result to the doors or to the customer. Since glass doors usually are used so as to allow the customer the ability to visually inspect the items present in the locked cabinet, such damage could be significant.

After the display of the "open" legend has occurred, the system then causes the hold magnets to be energized so that the doors are maintained in the open condition. The use of these hold magnets is important for customer satisfaction, since it allows the customer to inspect the contents of the locked cabinets without having to worry about keeping the doors in the proper open state. Also, the cabinet does not necessarily have to be on a perfectly level surface in order for the doors to be kept open.

After all of these steps have been completed in block 2610, a menu is provided to the customer on computer screen 214. This is indicated by a block 2612. The customer is instructed to choose the desired cassettes (films), and then to read in the barcodes contained on the cassette containers (or alternatively, on the cassettes themselves). Note that it is preferrable to put the barcode on the cassettes themselves to minimize theft. The reading in of these bar codes by the customer allows the system to complete the inventorying process which must be accomplished prior to the relocking of the doors of the cabinet. The customer is legally responsible for the contents of the cabinet during the time period from when the doors are unlocked in block 2610 until they are relocked at the end of the rental procedure.

The program then allows the customer any amount of time that is needed to inspect the contents of the cabinet. Note, however, that the system also can accommodate during this time period the return of other rented items by another customer, as discussed above in connection with the return procedure program of FIG. 24A and FIG. 24B. Even during the return process, however, the customer involved in the rental transaction is legally liable for the contents of the unlocked cabinets. Consequently, it is important that the rental customer make sure that the returning customer does not improperly remove items from the unlocked cabinets, since the rental customer will be legally responsible for these improper removals.

The program then waits for the customer to input the proper barcode, as indicated by a block 2614. The three types of barcodes are: (1) the barcode for a set stored in the cabinets; (2) a proper designator code, such as "X", indicating that the member has completed the selection process and wishes to exit the program; and (3) the member code of another customer wishing to break in and conduct a return transaction.

Assume that the barcode that is detected is a proper barcode for a cassette stored in the cabinet. This is indicated by a block 2616. The program registers the choice of the selection and counts the number of cassettes that have been rented during this particular rental transaction, as indicated by a block 2618. The program is set up so that the customer can only rent up to a preselected number of cassettes during a given rental transaction (for example, 5). Thereafter, the program will not allow the customer to rent any additional cassettes, as indicated by a decision block 2620. If the number of cassettes that have been read in by the customer is less than the preselected maximum amount, the program proceeds via the NO path back up to block 2614, which allows the customer to make an additional rental selection.

In the case where the customer decides to exit the program as indicated by a block 2622, or where the customer has selected a number of cassettes that is equal to the maximum allowed in decision block 2620, the program proceeds to a block 2624. In block 2624, the system conducts an inventory of all of the cassettes in the cabinet by scanning all of the presence detectors. Thereafter, after the inventory has been completed, a decision block 2626 determines whether the number of cassettes that have been read in by the customer during the rental transaction is equal to the number of cassettes that have been removed by the customer during the unlock cabinet access period. If the number of cassettes rented does not equal the number of cassettes that have been removed from the cabinet, as indicated by the NO state, the program proceeds to a block 2628. At this point, the customer is provided with a message on computer screen 214 instructing him or her to read in the barcode of the remaining set(s) that has not been read in. The program then proceeds back to block 2624 where an inventory of the contents of the unlocked cabinet(s) is performed.

On the other hand, if the decision block 2626 indicates that the number of films that have been read in equals the number of films that have been removed from the cabinet, the program proceeds via the YES path to a block 2630. During block 2630, the system releases the hold magnets which are keeping the unlocked doors in the open state. Then, the customer must close the doors. When the doors are closed, as indicated by the proper sensors, a decision block 2632 moves to the YES path and on to a block 2634. However, if the doors are not properly closed by the customer, decision block 2632 causes the program via the NO path to move to block 2636. Block 2636 indicates that the program displays a message to the customer on computer screen 214 indicating that the doors need to be closed. Thereafter, the program returns to block 2624.

After the doors have been closed, as indicated by decision block 2632, the program proceeds to block 2634. At this stage, the program calculates how much of a fee will be charged to the customer for this rental transaction for the given number of days that the customer has indicated that he or she is renting the cassettes for. Note that if the customer has any outstanding payments that are due, these will also be added to the rental fee. The program then fetches from memory, as indicated by a block 2636, the particular film information for the cassettes that have been rented. This information, such as the title of the film, the rental price, the date when the film is to be returned, the penalty for late return, and the like, is displayed on the computer screen 214 for examination by the user. This information is then stored for archival purposes and for later use.

Thereafter, the program proceeds to a step 2638 where the customer has provided to him or her the printed customer slip. The customer slip includes information relating to the amount owed for the rental transaction. This information will be needed in a situation where the customer must pay for the rental transaction at the checkout counter (not shown). Moreover, additional information can be printed on the customer slip, such as the name of the film, the return date, the penalty fee, and the like. Thereafter, the program proceeds to a block 2640, where the customer is provided with a message on computer screen 214. The message essentially thanks the user for the rental transaction and provides any other message that the system has been programmed to provide. Thereafter, the program proceeds to a block 2642, whereby the customer is provided with the initial screen of block 2302.

Referring now to FIG. 26B, as stated above, a return transaction can occur during a rental transaction. The system detects such a return by the reading in of a barcode that is a member code, as indicated by a block 2650. At this stage, the renting procedure is interrupted, as indicated by as block 2652. All of the parameters concerning the rental procedure (the client, the data relating to the items that have been rented so far, are saved on a "waiting list" file, as indicated by a block 2654. This allows the renting party to return to the rental procedure after the return procedure has been completed by the second customer. The computer also requires the customer to input his or her secret code (PIN). This entry of the PIN is not shown in FIG. 26B. The computer then checks to determine whether the inputted PIN from the second customer who wishes to return items is correct. It also determines what items that this second customer had that have not yet been returned.

If the second client does not have any cassettes or cassette players to be returned, this indicates to the program that the second customer also wishes to perform the rental procedure. In this case, the second customer is prevented from doing so. The computer program then provides a message on the computer screen 214 indicating to the second customer that he or she should wait a few minutes until the first customer has completed his or her rental procedure. Thereafter, the program reloads the rental parameters for the first customer, as indicated by a block 2658, and the program returns to block 2614 of FIG. 26A.

If the second customer has cassettes to return, however, the program goes to the return procedure of FIGS. 24A and 24B, as indicated by the dashed box 2656. The system then performs the return procedures in accordance with the flow chart of FIGS. 24A and 24B. Note that the first customer (the renting customer) is legally responsible for the contents of the cabinet during the return procedure utilized by the second customer, as discussed above. The inventory of the contents of the unlocked cabinets will only be done after the first customer has completed the rental transaction. If the number of items is not correct, customer 1 and customer 2s' files will be marked accordingly so that they can be examined later to determine who took the cassette(s). After the return proceedure has been completed by the second customer, the program moves to block 2658, whereby the first customer is returned to the rental transaction.

The member program of the preferred embodiment is shown in FIG. 27. FIG. 27 comprises FIGS. 27A, 27B, 27C, 27D, and 27E. Referring to FIG. 27A, the MEMBERS program can only be run after the system personnel service code and the system personnel secret code have been properly entered and detected by the computer. After this has occurred, an initial menu is presented to the system personnel operator, as indicated by a block 2702. The menu provides the system personnel with six possible options: (1) registration of new members; (2) changes and inquiries; (3) lost or stolen cards; (4) temporary cards (5) removal of "stop" flags; and (6) an exit. Referring first to the first option, the registration of new members, the user indicates this selection by inputting using operator keyboard 224. Thereafter, the program proceeds to the new member registration program, as indicated by the block 2704. This program allows a new member or customer to be logged into the movie machine system. Once logged in, this new customer will be allowed to rent cassettes (and possibly VCRs, if designated).

The first step in the new member registration program is for the computer to fetch a new card number, as indicated by a block 2706. First, the computer fetches an indexing file which contains the last card number assigned by the system to a customer. It then adds one to this number, producing a new card number for the new customer of member.

After the new card number has been determined in step 2706, the program moves to block 2708. A series of questions are presented to the system personnel (and possibly the new customer, if the new customer also is in attendance) on the computer screen 214. The questions are needed by the system in order to register the new customer. Specifically, as shown in FIG. 27A, the following information relating to the new customer must be inputted by the service personnel using the operator keyboard 224: (1) Name; (2) address; (3) city; (4) zip code; (5) telephone number; (6) credit card number; (7) film choice preference —there can be film categories that can be designated (this is particularly useful with children having parents who wish to restrict the type of cassettes that can be rented); (8) the type of video system that the customer has (for example, beta, VHS, or 8 mm); and (9) whether the customer wants to rent a player (VCR).

After this data has been entered for the new customer, a decision block 2710 must determine whether the input data is correct. If it is incorrect, the NO path is taken, and the program returned to block 2702. However, if decision block 2710 indicates that the input is correct, the YES path is taken, causing the program to move to block 2712. Note that in the decision block 2710, the system personnel is asked to confirm whether the data shown on the screen is correct.

If the data is correct, the program generates a secret code (PIN) for the new customer during step 2712. This secret code is generated randomly utilizing a random seed, a reference date and a time element, for example. It should be understood that any suitable type of mechanism can be used to generate the secret code in block 2712.

The secret code that has been generated for the new customer is then displayed on the computer screen 214 for a preselected short amount of time (for example, 5 seconds). The secret code is then provided by the system personnel to the new customer. After that, the secret code displayed on computer screen 214 is erased.

The member file is then updated so that a new record is added for the new customer that has just been logged in, as indicated by block 2716. In addition to the member file, all update and control files are adjusted, as indicated by a block 2718. The control floppy 208 and the hard disk 206 are updated during this step.

If a membership fee has been paid by the new customer, the printer 218 produces a slip with the corresponding amount of money that the new customer has paid. The printing of the slip is indicated by the box 2720. After the slip has been printed, the program returns to the main menu of block 2702.

It should be understood that the system personnel can terminate any of the five programs that can be selected from the menu of block 2702. This provides the system personnel with sufficient control over the operation of the system during the member program.

Figure 27B:
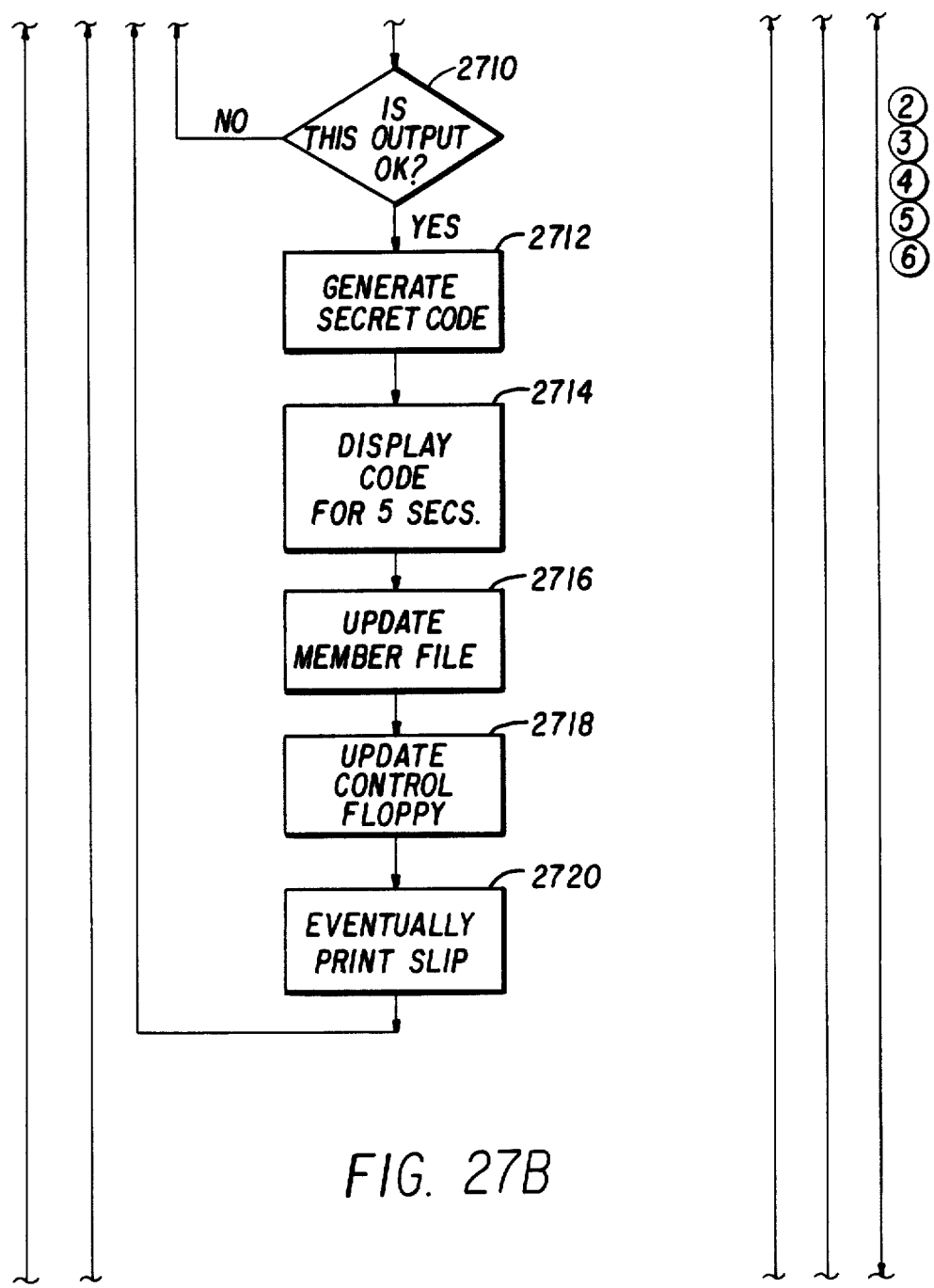
FIG. 27 (comprising FIGS. 27A, 27B, 27C, 27D and 27E) is a flow chart of the member program of a preferred embodiment of the present invention.
Figure 27C:
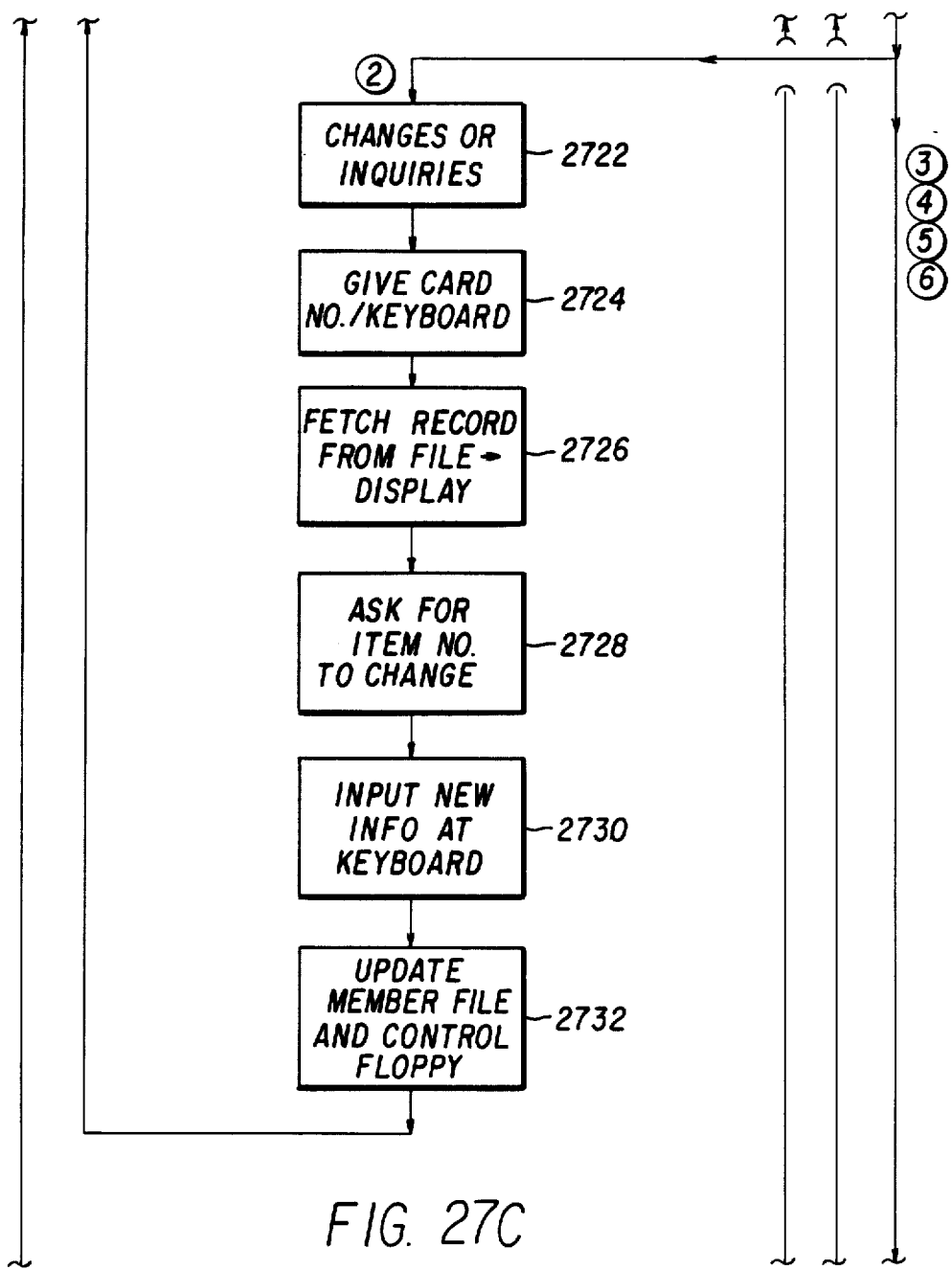

Referring now to the second option available under the member's program, changes and inquiries can be made by the system personnel. Referring now to FIG. 27C, these changes or inquiries are indicated by a block 2722. This program, for example, allows the system personnel to make changes to the member records. Such changes, for instance, may be required when the customer has moved or any other item relating to the particular customer has to be modified. It also allows the system personnel to check if a particular customer has on rental a cassette(s) or a VCR(s), and if so, the return date for the same. It also allows the system personnel to obtain the secret code (PIN) for a customer who has forgotten it.

The first step in the change or inquiry subroutine is for the system personnel to input the card number of the customer file being worked on. This inputting is performed using the operator keyboard 224. This inputting is indicated by block 2724. After the card number has inputted, the particular member record is loaded from the disk (hard disk 206) and displayed on the computer screen 214, as indicated by a block 2726. The system personnel then indicates to the system which items of the file record being displayed must be changed, as indicated by a block 2728. The new data corresponding to the changes that are inputted by the system personnel, as indicated by a block 2730, is supplied via the operator keyboard 224. Each time new data is inputted, the screen 214 reflects this change so that the system personnel can confirm whether the proper changes have be made. After all of the changes or additions have been made, the member file on the hard disk 206 is updated, and similar change is provided on the control floppy of floppy disk 208, as indicated by a block 2732. After this storage step has been completed, the program returns to the menu of block 2702.

If a customer loses his or her card or suspects that it has been stolen, he or she must immediately report this to the system personnel for the particular movie machine involved. The third option on the menu of block 2702 allows the system personnel to "flag" the particular customer or member record corresponding to the particular card that has been lost or stolen. Such "flags" cause the system to prohibit the use of that particular customer card in any later transaction.

Figure 27D:
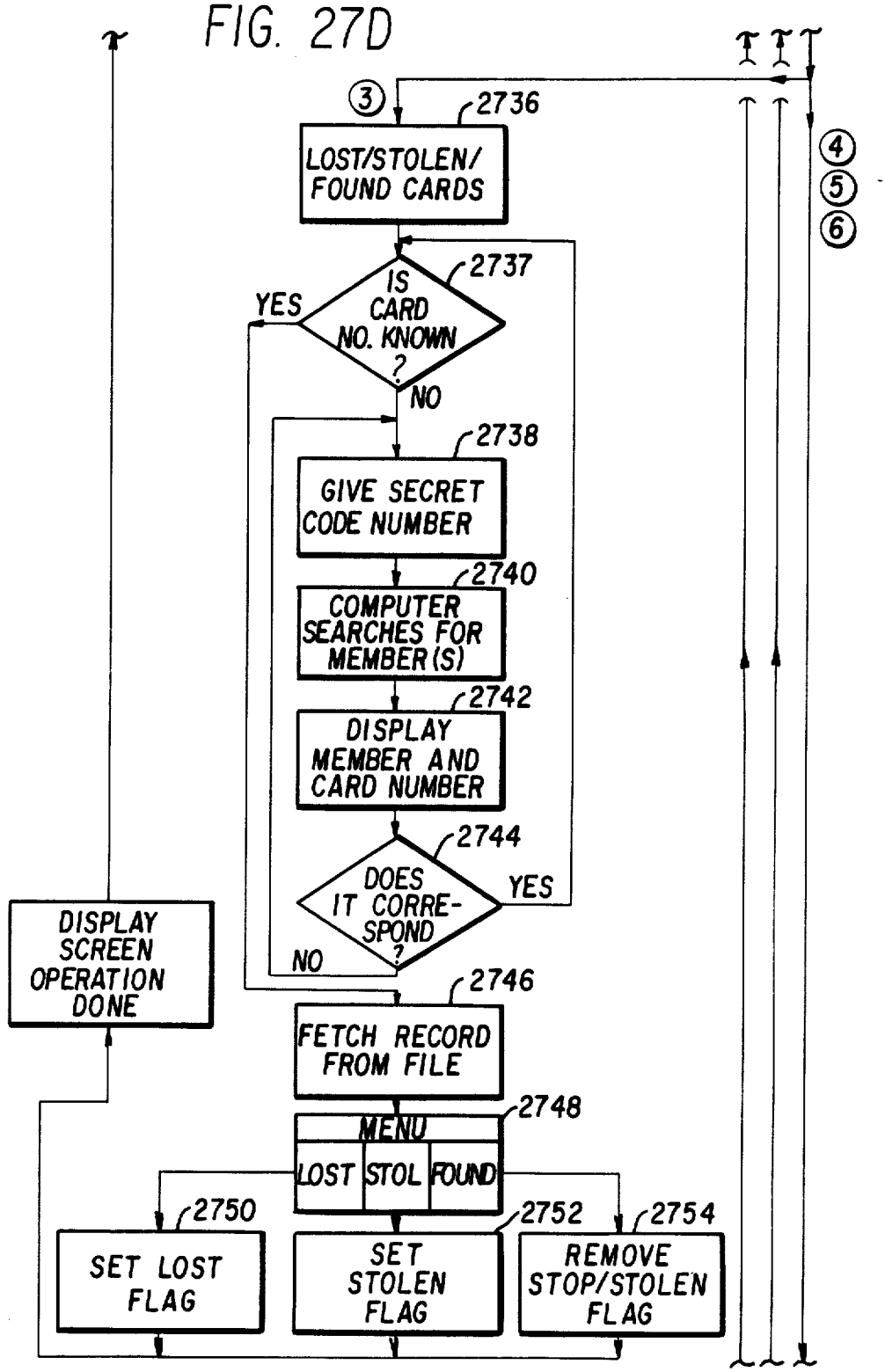

Referring now to FIG. 27D, the lost or stolen card subroutine is indicated by a block 2736. The first step in the program is decision block 2738. Here, the program asks the customer whether he or she remembers his or her card number. If the answer to the inquiry is no, the program then asks the system personnel to provide the secret code (PIN) for the customer. Note that the customer who has lost his or her card or had it stolen oftentimes does not know the card number. The system allows the service personnel to locate this card number as long as the customer can remember his or her secret code. The secret code is inputted into the system by the service personnel, as indicated by a block 2738. After it has been inputted, the computer searches for all member(s) file(s) having that particular secret code. Note that in some larger systems more than one customer may have a particular secret code (PIN). This is no problem since these customers have different card numbers.

After the various member files have been located using the secret code indicia as indicated by block 2740, the computer displays the member information corresponding to the given card number. If more than one file is located, these other files are displayed to the system personnel, as indicated by a block 2742. The service personnel then determines whether the particular file being displayed is the proper one, as indicated by a decision block 2744. This is repeated until the proper file is found.

After the service personnel has determined the proper card number for the lost or stolen card, he or she can fetch the proper record from the computer storage, as indicated by a block 2746. After the proper file has been fetched, a menu is provided to the system personnel, as indicated by a block 2748. This menu allows the system personnel to indicate whether the card is lost, stolen or found. When the system personnel selects the lost option, a lost flag is set in the particular membership record as indicated by block 2750. This lost flag can be an "L".

Similarly, when the service personnel elects the stolen option, a stolen flag is set in the membership file, as indicated by a block 2752. The "S" flag is added to the particular customer file.

These two flags indicate to the system that the particular card has problems, as discussed above. This prevents the customer from utilizing the system when these flags are set.

After the customer has found his or her lost or stolen card, the service personnel can remove the L or S flag from the customer's file. This is done using the found option of the menu of block 2748. The flags are removed from the file, as indicated by a block 2754. Thereafter, the card is not blocked anymore. However, the system personnel still can look at the history of the transactions for that particular card.

Figure 27E:
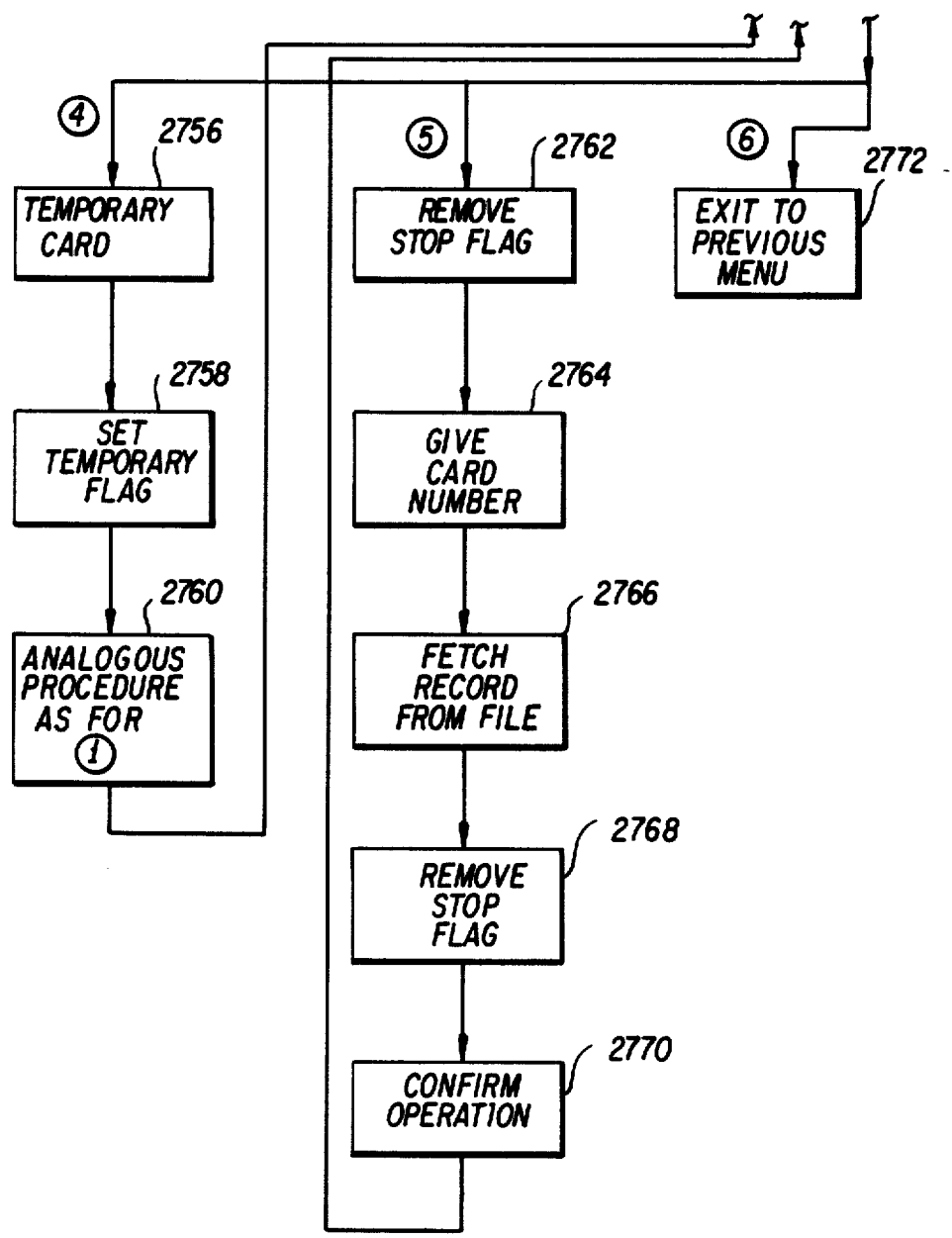

The fourth option available on the menu of block 2702 is that of the provision of a temporary card to a customer. Referring to FIG. 27E, the temporary card subroutine is indicated by a block 2756. The temporary card subroutine allows the system personnel to issue a temporary card to a customer when the original card has been lost or stolen. This temporary card covers the same time period as covered by the original card. It can be issued at a lower cost to the customer, or can be charged entirely as an administrative cost. The procedure utilized in the temporary card subroutine is very similar to that utilized in the register new members subroutine beginning with block 2704. However, the temporary flag byte set is also included in the customer file as indicated by a block 2758, so as to indicate that this is a temporary card. Block 2760 indicates that the procedure thereafter followed in the temporary card subroutine is very similar to that utilized in the register new members subroutine beginning with block 2704.

The fifth option available to the service personnel is to remove a stop flag. Referring again to FIG. 27E, after the service personnel has detected that a customer has seriously damaged a cassette(s) or a player (VCR), a stop flag is set in that particular customer's membership record to prevent future renting from occurring. This stop flag is discussed below in connection with FIG. 28B of the control program.

After the problems relating to the seriously damaged cassette or VCR has been remedied, the stop flag can be removed from the customer membership file utilizing the remove stop flag subroutine beginning with block 2762. The first step is for the system personnel to input the card number of the customer whose membership file contains the stop flag that needs to be removed. This is indicated by a block 2764. After the card number has been inputted, the program fetches the customer's membership record from the hard disk 206 file, as indicated by a block 2766. Thereafter, the customer's name, address and other information is displayed to the system personnel to make sure that the proper file has been retrieved and that the information is correct and is confirmed. If everything is in order, the system personnel then removes the stop flag, as indicated by a block 2768. After the stop flag has been removed, the customer file is confirmed, as indicated by a block 2770. The removed stop flag subroutine then moves back to the main menu of block 2702.

The final option available to the service personnel is the exit option. As indicated by block 2772 of FIG. 27E, the system personnel can exit the member's program by selecting this option. Thereafter, the service personnel can perform other tasks using the system or can revert the system back into its other modes of operation.

Figure 28A:
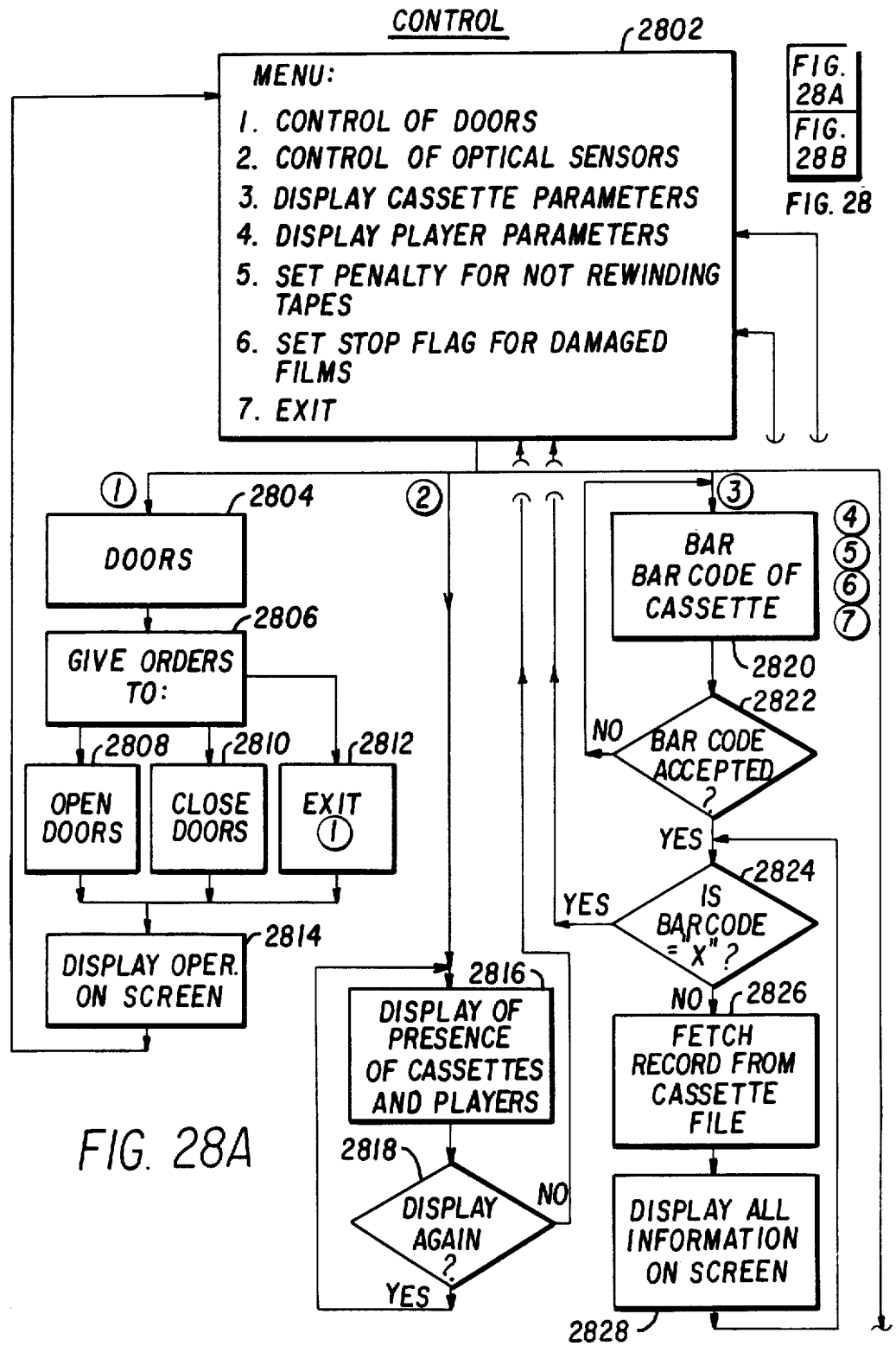
FIG. 28 (comprising FIGS. 28A and 28B) is a flow chart of the control program of a preferred embodiment of the present invention.
Figure 28B:
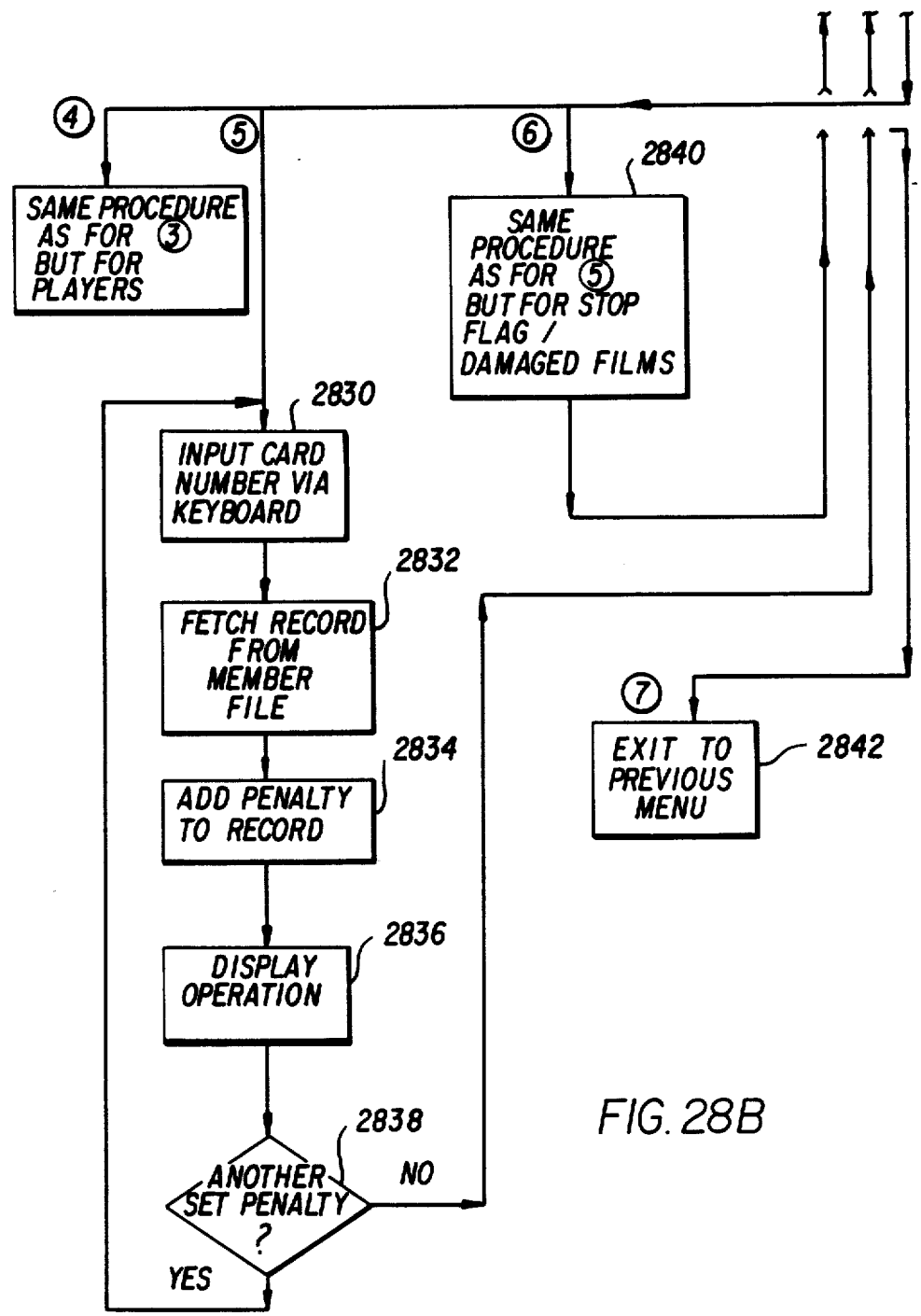

The control program is shown in the flow chart of FIG. 28. FIG. 28 comprises FIGS. 28A and 28B.

The system personnel can gain access to the control program when the proper system personnel code and secret code are inputted into the system. The control program provides the system personnel with the necessary tools to perform particular diagnostic or control functions relating to the system. Specifically, it allows the system personnel to check the cabinets, the optical or other presence sensors that are used to determine the presence of a cassette or player at a given shelf location, the cassettes, the VCRs, and the like.

Referring now to FIG. 28A, the master menu for the control program is indicated by a block 2802. There are seven options available to the system personnel from this menu, as follows: (1) control of the doors of the cabinets; (2) control of the opticals or presence sensors in the cabinets; (3) display of cassette parameters; (4) display of player (VCR) parameters; (5) set of the penalty for the customer not rewinding the tapes; (6) set of the stop flag for damaged cassettes or players for a particular customer; and (7) exit.

Referring to the first option present on the master menu of block 2802, the service personnel can input a command via the operator keyboard 224 to open or close all of the doors for the cabinets being controlled by the computer console. The control of the doors subroutine is begun by block 2804. Thereafter, the system personnel provides the specific instructions relating to what door functions are intended, as indicated by a block 2806. One of the options is that the system personnel can key in a command which causes all of the doors of the cabinets to be opened, as indicated by a block 2808. Alternately, the system personnel can input a command causing all of the doors of the cabinets to be closed, as indicated by a block 2810. The third option is that the system operator can cause the doors programmed to be exited, as indicated by block 2812. After the various options 2808, 2810, and 2812 have been selected, the particular selected item is displayed to the system personnel on the computer screen 214, as indicated by a block 2814. The doors program then returns to the master menu of block 2802.

The control of the optical sensors subroutine is the second option available to the system personnel using the master menu 2802. Referring to FIG. 28A, the first step in this subroutine is the display of the presence of cassettes and players at given shelf locations, as indicated by a block 2816. The control of optical sensors program causes the screen 214 to be cleared. Then, after the sensors have been checked, a series of ones and 0s corresponding to the given shelf locations for each of the shelves in the cabinet is set up in a two-dimensional array on the screen. The one indicates the presence of a cassette or player at a given shelf location, while a 0 indicates tha absence of a cassette or player at a given shelf or location. By scanning the 2-dimensional array set forth on the computer screen 214 with the actual items that are present at the shelf locations, the system personnel is able to determine whether any of the optical sensors (presence detectors) are working improperly. This improper operation will be indicated by an erroneous representation on the display on computer screen 214 as compared to what is actually present at that given shelf location.

In addition, the display indicates the number of cassettes that are present in the cabinets and the number of players that are present in the cabinets. It also indicates whether the doors of the cassette cabinet(s) are closed or opened, and whether the doors of the player cabinet(s) are closed or opened. In this way, the system personnel can also determine whether the sensors for sensing the status of the doors are working properly.

Additional interactive testing can be performed by the system personnel by removing a cassette or cassette player from a given shelf location where problems in the sensor operation are detected. This allows the system personnel to determine the exact problem that exists.

After the system personnel has utilized the display, a decision block 2818 asks the system personnel whether another display is desired. Thereafter, the program exits and returns to the master menu of block 2802.

The display cassette parameters program is the third option available on the master menu of block 2802. Referring now to FIG. 28A, the initial block of the display cassette parameters subroutine is block 2820. The cassette records contained in the cassette file contain significant information which is of use to the system personnel. In addition to containing the film characteristics (such as the title, actors, director, producer, etc.) the cassette file also contains important data relating to the actual rental history of the particular cassette in question. For example, it contains the most recent previous rental operations that have occurred with respect to the given cassette. Each cassette record also contains the card number of the customer who rented this cassette (or is still renting it) along with the date of return of the cassette (or the date that the cassette is scheduled to be returned. In addition, the exact time (in hours and minutes) when the cassette was rented is also stored. The return time is also stored. The location of the cassette prior to a particular rental transaction is stored along with the location of the cassette in a particular shelf location after the cassette is returned. Thus, the entire history relating to the rental of the cassette in question is stored in the cassette file. This information is stored for several previous rental transactions. For example, the information can be stored as far back as three rental transactions if desired.

In order to obtain the cassette record on a given cassette, the system personnel first reads in the bar code of the particular cassette (film) in question, as indicated by a block 2820. A decision block 2822 then determines whether the barcode that has been read in is accepted. If it is not, the program returns to block 2820.

However, if the barcode is accepted by decision block 2822, the program moves to decision block 2824. If the system personnel wishes to exit the program at this stage, he or she inputs the exit symbol (such as an "X"), causing the program to return to the main menu of block 2802. However, if the system personnel wishes to continue to utilize this program, the program moves on to block 2826. Thereafter, all of the retrieved information is displayed to the system personnel on the computer screen 214, as indicated by a block 2828.

The information that is displayed on the computer screen 214 is very useful to the system personnel in two particular situations. The first involves the return of a cassette that has not been properly rewound. As discussed below, a penalty fee is levied against the customer who did not return a cassette properly rewound. The identity of such customer can be determined by the system personnel utilizing this particular program. The other significant use is to determine the identity of a customer who has damaged a cassette in some fashion. This customer is liable for the damaged cassette. Again, the system personnel can determine who this customer is by utilizing this program.

The fourth option available to the system personnel on the master menu of block 2802 is the display of player (VCR) parameters. The steps taken in this program are the same as taken in the previous program used to display the set parameters. Consequently, for purposes of brevity, this particular program is not set out in detail.

The fifth option available to the system personnel from the master menu of block 2802 is that of the penalty imposed on a customer who returns a cassette that is not rewound. The system personnel checks all of the returned cassettes from the previous day. He or she then determines which of them is not rewound properly. Ones that were not rewound properly are then used to impose a monetary penalty on the customer(s) who last rented the particular cassettes in question. This can be determined by visual inspection of the cassette itself.

The reason why a penalty needs to be imposed is that the future customer renting the cassette will be annoyed by the fact it has not been completely rewound. For marketing purposes, it has become customary to impose such a penalty on the previous renter.

The first step in the penalty subroutine is that of block 2830. The card number of the customer who last rented the film not properly rewound is inputted by the system personnel using the operator keyboard 224. The computer then fetches the customer record from the member file, as indicated by a block 2832. After the member file has been brought up on the computer screen 214, the system personnel adds the penalty flag to the member file, as indicated by a block 2834. The addition of the flag is then displayed to the system personnel, as indicated by a block 2836. Thereafter, a decision block 2838 queries the user as to whether another penalty needs to be set. If the answer to the query is yes, the program returns to block 2830. However, if the answer to the query is no, the program returns to the master menu of block 2802.

The stop flag program is the sixth option available from the master menu of block 2802. As discussed above in connection with the member's program of FIG. 27, the stop flag can be added to a member's file by the system personnel when the member returns an excessively damaged cassette or cassette player. The stop flag prevents the customer from being able to rent cassettes or cassette players until a satisfactory resolution relating to the damaged items has been achieved.

The stop flag for damaged films o players subroutine is indicated by a block 2840. The steps of this subroutine are the same as that used with the set penalty for not rewinding tapes subroutine beginning with block 2830. Consequently, for purposes of brevity, the steps of this program are not set out here.

The remaining option available to the system personnel is to exit from the control program. This is indicated by a block 2842.

Thus, it is seen that this present embodiment of the system and method of the present invention allows for video tapes and video tape players to be automatically rented to customers without the need for interaction with store personnel. The entire operation is under computer program control. Accurate records of all transactions are maintained in order to prevent cheating or theft from the system. Automatic inventory control is provided at all times. The system data is collected on a real time basis which can be used for control and analysis purposes. A rental transaction can be taking place at the same time that items are being returned. Various controls are imposed to prevent the cheating of the system. In this way, the embodiment that is shown produces a very high rate of return for a given business investment.

In block 2826, the particular stored record for that cassette is retrieved from the cassette file.

The present invention has been described in its various aspects and embodiments. As can be appreciated, there are many versions of it that can be utilized that are within its spirit and scope. Consequently, the present invention should not be limited except by the claims which follow.

I claim:

1. A computer-controlled system for distributing items to an authorized customer upon demand, the system comprising:
   (a) customer identification means for determining if a customer is an authorized customer, whereby said authorized customer may utilize the system;
   (b) access means, responsive to said customer identification means, for providing the authorized customer with access during an access time period to the items contained within a locked cabinet, whereby the authorized customer may remove and/or replace any of the items contained within the accessed cabinet;
   (c) item monitoring means, associated with the accessed cabinet, for producing inventory information indicative of the removal and/or replacement of each item within said accessed cabinet during the access time period;
   (d) selection declaration means, associated with said item monitoring means, for producing selection information indicative of the identity of each item which the authorized customer declares for distribution; and
   (e) access termination means, responsive to said item monitoring means and to said selection declaration means, for terminating access to said accessed cabinet when a comparison of said selection information and inventory information indicated that the authorized customer has declared for distribution a number of items equal to the number of items said inventory information indicates have been removed during the access time period.

2. The computer controlled system of claim 1, wherein said selection declaration means comprises means for reading a bar cod located on an item for identifying said item.

3. The computer-controlled system of claim 1, wherein said access means allows said authorized customer to inspect and/or examine any of the items contained within the accessed cabinet during the access time period.

4. The computer-controlled system according to claim 1, further comprising a display means for displaying visual data and/or images.

5. The computer-controlled system of claim I wherein the access time period is as long as the authorized customer wants access to the accessed cabinet.

6. A computer-controlled system for receiving items from an authorized customer, the system having a cabinet that is normally locked, the system comprising:
   (a) customer identification means for determining if a customer is an authorized customer, whereby said authorized customer may utilize the system;
   (b) return declaration means for producing return information indicative of the identity of an item which the authorized customer intends for the system to receive;
   (c) access means for providing said authorized customer with access during an access time period to an accessed cabinet that is normally locked so that the authorized customer may replace the item which he desires to return to the system into any slot of the accessed cabinet;
   (d) item monitoring means for producing inventory information indicative of the replacement of items into any slot of the accessed cabinet during the access time period; and
   (e) access termination means, responsive to the item monitoring means and the return declaration means, for terminating access to the accessed cabinet so as to lock the cabinet when a comparison of the inventory information and the return information indicates that the authorized customer has returned a number of items equal to the number of items the return information indicates have been returned.

7. A computer-controlled system for distributing and receiving items to and from an authorized customer, the system having a cabinet that is normally locked, the system comprising:
   (a) customer identification means for determining if a customer is an authorized customer, whereby said authorized customer may utilize the system;
   (b) access initiation means, associated with said customer identification means, for providing said authorized customer with access during an access time period to an accessed cabinet that is normally locked so that the authorized customer may remove and/or replace any of the items contained within said accessed cabinet;
   (c) declaration means for producing selection information indicative of the identity of each item which the authorized customer declares for distribution, and for producing return information indicative of the identity of an item which the authorized customer intends for the system to receive;
   (d) item monitoring means for producing inventory information indicative of the removal and/or replacement of each item within said accessed cabinet during the accessed time period; and
   (e) access termination means, responsive to said item monitoring means and said access imitation means, for terminating access of said accessed cabinet so as to lock the cabinet when either,
      (1) a comparison of the inventory information and the selection information indicates that the authorized customer has declared for distribution a number of items equal to the number of items said inventory information indicates have been removed during the access period, or
      (2) a comparison of the inventory information and the return information indicates that the authorized customer has returned a number of items equal to the number of items the return information indicates have been returned.

8. The computer-controlled system according to claim 7, wherein the items comprise:
   video cassettes; or
   tape players.

9. The computer-controlled system of claim 7, wherein said customer identification means comprises,
   a magnetic card with an associated personal identification number (PIN) and,
   a keyboard on which said authorized customer may enter said personal identification number (PIN).

10. The computer-controlled system of claim 7, wherein said access initiation means comprises a lock on the doors of said cabinet for allowing said doors to be opened during said access time period.

11. The computer-controlled system according to claim 7, wherein said cabinet has at least one transparent door and a lock for allowing said door to be opened during said access time period.

12. The computer-controlled system of claim 7, wherein said item monitoring means comprises at least one sensor located on a shelf within said cabinet for sensing the presence of absence of said item upon said shelf.

13. The computer-controlled system of claim 12, wherein said sensor utilizes light.

14. The computer-controlled system according to claim 7, wherein said item monitoring means comprises,
   means for detecting the identity of said item to allow for recognition of the physical location and/or identity of said item within said cabinet.

15. The computer-controlled system of claim 7, wherein said access termination means comprises:
   locks on doors of said cabinet for locking said doors except during said access time period.

16. The computer-controlled system according to claim 7, further comprising:
   customer monitoring means for monitoring the activities of said authorized customer during the accessed time period.

17. The computer-controlled system according to claim 16, wherein said customer monitoring means compresses a video recording system.

18. The computer-controlled system according to claim 7, further comprising computer memory means for storing:
   the identity of said authorized customer; or
   the activation of said access initiation means; or
   said inventory information; or
   said selection information; and/or
   said return information.

19. The computer-controlled system according to claim 18, wherein said computer memory means comprises:
   a hard disk; and/or
   a floppy disk.

20. The computer-controlled system according to claim 7, further comprising information entry means which is adapted to allow a system personnel on command to perform an inventory function.

21. The computer-controlled system according to claim 7, further comprising a communications link for communicating information related of the functioning of said system to a remote utilization device.

22. The computer-controlled system of claim 7, wherein said includes a means for allowing said system to determine the identify of said item when it is in said cabinet.

23. The computer-controlled system of claim 7, wherein said terminating access means comprises electrical locking means.

24. A computer-controlled method for distributing items to an authorized customer, which method comprises the steps of:
   (a) identifying an authorized customer;
   (b) granting access to said authorized customer during an access time period to the items contained within a locked cabinet, whereby said authorized customer may remove and/or replace said items;
   (c) monitoring the removal of items from said cabinet and the replacement of items to said cabinet during said access time period so as to produce inventory information;
   (d) inputting a selection declaration from said authorized customer for producing selection information indicative of the identity of each item which said authorized customer declares for distribution; and
   (e) terminating access to said accessed cabinet when a comparison of said selection information and said inventory information indicates that he authorized customer has declared for distribution a number of items equal to the number of items said inventory information indicates have been removed during the access time period.

25. The computer-controlled method of claim 24, wherein said step (b) comprises the step of unlocking at least one transparent door of said cabinet during said access time period.

26. The computer-controlled method of claim 24, further comprising the step of displaying text or pictorial information to said authorized customer.

27. A computer-controlled method for receiving items from an authorized customer into a cabinet which is normally locked the method comprising the steps of:
   (a) identifying an authorized customer;
   (b) granting access to the authorized customer during an access time period to an accessed cabinet that normally locked so that the authorized customer may replace the item being returned;
   (c) inputting a return declaration from the authorized customer indicative of the item being returned so as to produce return information; and
   (d) monitoring the replacement of items to said accessed cabinet during said access time period so as to produce inventory information; and
   (e) terminating access by said authorized customer to said accessed cabinet in accordance with a comparison of said return information and said inventory information.

28. The computer-controlled method according to claim 27, said method further comprising the steps of:
   (a) calculating the amount of time said authorized customer has had said item prior to its replacement in accordance with step (c) in order to calculate a rental fee for such amount of time; and
   (b) printing a customer slip indicating said rental fee.

29. A computer-controlled method for distributing items to, and receiving items from, an authorized customer utilizing a cabinet that is normally locked, which method comprises the steps of:
   (a) identifying an authorized customer;
   (b) granting access to said authorized customer during an access time period to an accessed cabinet so that said authorized customer may replace and/or remove an item into or out of said accessed cabinet;
   (c) monitoring the removal and/or replacement of items from said accessed cabinet during said access time period so as to produce inventory information;
   (d) inputting a return declaration if said authorized customer desires to return a previously dispensed item so as to produce return information;
   (e) inputting a selection declaration if said authorized customer desires to receive an item from said accessed cabinet so as to produce selection information; and
   (f) terminating access of said authorized customer to said accessed cabinet if said inventory information corresponds in a predetermined manner with said selection information or said return information.

30. The computer-controlled method of claim 29, further comprising the step of communicating information related to step (f) to a remote utilization device.

31. The method of claim 29, wherein step (c) monitors the removal and/or replacement of cassette tapes and/or tape players from said accessed cabinet.

32. The computer-controlled method of claim 29, wherein step (a) comprises the steps of
   (1) reading a magnetic card with an associated personal identification number (PIN) and
   (2) entering on an input device by said authorized customer said personal identification number (PIN).

33. The computer-controlled method of claim 29, wherein step (d) comprises the step of reading a bar code located on said item and thereby identifying said item.

34. The computer-controlled method of claim 29, wherein step (b) comprises the step of unlocking at least one door of said normally locked cabinet containing said items.

35. The computer-controlled method of claim 29, wherein step (c) comprises the step of sensing using light the presence or absence of the items located on a shelf within said normally-locked cabinet.

36. The computer-controlled method of claim 29, further comprising the step of storing in computer memory:
   the identity of said authorized customer; or
   the inventory information; or
   the selection information; and/or
   the return information.

37. The computer-controlled method of claim 36, wherein the storing step comprises the step of storing using a hard disk or a floppy disk.

* * * * *